(12) United States Patent
Ellis et al.

(10) Patent No.: US 7,739,709 B2
(45) Date of Patent: Jun. 15, 2010

(54) CLIENT-SERVER BASED INTERACTIVE TELEVISION PROGRAM GUIDE SYSTEM WITH REMOTE SERVER RECORDING

(75) Inventors: Michael D. Ellis, Boulder, CO (US); William L. Thomas, Bixby, OK (US); Thomas R. Lemmons, Sand Springs, OK (US)

(73) Assignee: United Video Properties, Inc., Tulsa, OK (US)

( * ) Notice: Subject to any disclaimer, the term of this patent is extended or adjusted under 35 U.S.C. 154(b) by 420 days.

(21) Appl. No.: 11/788,259

(22) Filed: Apr. 18, 2007

(65) Prior Publication Data

US 2007/0199030 A1    Aug. 23, 2007

Related U.S. Application Data

(63) Continuation of application No. 09/332,244, filed on Jun. 11, 1999, now abandoned.

(60) Provisional application No. 60/092,807, filed on Jul. 14, 1998.

(51) Int. Cl.
*H04N 5/445* (2006.01)
*H04N 7/173* (2006.01)
*G06F 13/00* (2006.01)
*G06F 3/00* (2006.01)

(52) U.S. Cl. .................. 725/39; 725/93; 725/95; 386/86

(58) Field of Classification Search ............ 725/37–41, 725/93–95; 386/86
See application file for complete search history.

(56) References Cited

U.S. PATENT DOCUMENTS

| 4,355,415 A | 10/1982 | George et al. |
| 4,605,964 A | 8/1986 | Chard |
| 4,694,490 A | 9/1987 | Harvey et al. |
| 4,718,107 A | 1/1988 | Hayes |
| 4,857,999 A | 8/1989 | Welsh |
| 4,908,707 A | 3/1990 | Kinghorn |
| 4,930,158 A | 5/1990 | Vogel |
| 4,959,720 A | 9/1990 | Duffield et al. |
| 4,977,455 A | 12/1990 | Young |

(Continued)

FOREIGN PATENT DOCUMENTS

CN    ROC 247388    10/1994

(Continued)

OTHER PUBLICATIONS

Hofmann, Neumann, Oberlies, and Schadwinkel, "Videotext Programmiert Videorecorder," Rundfunktechnische Mitteilungen, Nov.-Dec. 1982, pp. 254-257.

(Continued)

*Primary Examiner*—Hunter B. Lonsberry
(74) *Attorney, Agent, or Firm*—Ropes & Gray LLP.

(57) ABSTRACT

An interactive television program guide system is provided. An interactive television program guide provides users with an opportunity to select programs for recording on a remote media server. Programs may also be recorded on a local media server. The program guide provides users with VCR-like control over programs that are played back from the media servers and over real-time cached copies of the programs. The program guide also provides users with an opportunity to designate gift recipients for whom programs may be recorded.

4 Claims, 50 Drawing Sheets

U.S. PATENT DOCUMENTS

| | | |
|---|---|---|
| 5,047,867 A | 9/1991 | Strubbe et al. |
| 5,109,279 A | 4/1992 | Ando |
| 5,134,719 A | 7/1992 | Mankovitz |
| 5,172,413 A | 12/1992 | Bradley et al. |
| 5,187,589 A | 2/1993 | Kono et al. |
| 5,200,822 A | 4/1993 | Bronfin et al. |
| 5,253,066 A | 10/1993 | Vogel |
| 5,335,277 A | 8/1994 | Harvey et al. |
| 5,353,121 A * | 10/1994 | Young et al. .................. 725/52 |
| 5,412,720 A | 5/1995 | Hoarty |
| 5,442,389 A | 8/1995 | Blahut et al. |
| 5,461,415 A | 10/1995 | Wolf et al. |
| 5,479,266 A | 12/1995 | Young et al. |
| 5,479,268 A | 12/1995 | Young et al. |
| 5,479,302 A | 12/1995 | Haines |
| 5,485,197 A | 1/1996 | Hoarty |
| 5,517,254 A | 5/1996 | Monta et al. |
| 5,517,257 A | 5/1996 | Dunn et al. |
| 5,524,195 A | 6/1996 | Clanton, III et al. |
| 5,534,911 A | 7/1996 | Levitan |
| 5,539,449 A | 7/1996 | Blahut et al. |
| 5,550,576 A | 8/1996 | Klosterman |
| 5,583,561 A | 12/1996 | Baker et al. |
| 5,583,563 A | 12/1996 | Wanderscheid et al. |
| 5,585,838 A | 12/1996 | Lawler et al. |
| 5,585,858 A | 12/1996 | Harper et al. |
| 5,585,866 A | 12/1996 | Miller et al. |
| 5,589,892 A | 12/1996 | Knee et al. |
| 5,592,551 A | 1/1997 | Lett et al. |
| 5,602,582 A | 2/1997 | Wanderscheid et al. |
| 5,630,119 A | 5/1997 | Aristides et al. |
| 5,648,824 A | 7/1997 | Dunn et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,666,645 A | 9/1997 | Thomas et al. |
| 5,684,525 A | 11/1997 | Klosterman |
| 5,694,163 A | 12/1997 | Harrison |
| 5,699,107 A * | 12/1997 | Lawler et al. .................. 725/58 |
| 5,717,452 A | 2/1998 | Janin et al. |
| 5,732,216 A | 3/1998 | Logan et al. |
| 5,745,710 A | 4/1998 | Clanton, III et al. |
| 5,751,282 A * | 5/1998 | Girard et al. ................. 715/721 |
| 5,752,159 A | 5/1998 | Faust et al. |
| 5,754,771 A | 5/1998 | Epperson et al. |
| 5,760,821 A | 6/1998 | Ellis et al. |
| 5,761,607 A | 6/1998 | Gudesen |
| 5,768,528 A | 6/1998 | Stumm |
| 5,771,354 A | 6/1998 | Crawford |
| 5,778,181 A | 7/1998 | Hidary et al. |
| 5,778,182 A | 7/1998 | Cathey et al. |
| 5,781,226 A | 7/1998 | Sheehan |
| 5,781,228 A | 7/1998 | Sposato |
| 5,796,952 A | 8/1998 | Davis et al. |
| 5,801,787 A | 9/1998 | Schein et al. |
| 5,802,284 A | 9/1998 | Karlton et al. |
| 5,805,763 A | 9/1998 | Lawler et al. |
| 5,805,804 A | 9/1998 | Laursen et al. |
| 5,809,204 A | 9/1998 | Young et al. |
| 5,812,123 A | 9/1998 | Rowe et al. |
| 5,818,438 A | 10/1998 | Howe et al. |
| 5,819,019 A | 10/1998 | Nelson |
| 5,828,945 A | 10/1998 | Klosterman |
| 5,850,218 A | 12/1998 | LaJoie et al. |
| 5,949,954 A | 9/1999 | Young et al. |
| 6,006,257 A | 12/1999 | Slezak |
| 6,052,145 A | 4/2000 | Macrae et al. |
| 6,091,883 A | 7/2000 | Artigalas et al. |
| 6,125,230 A | 9/2000 | Yaginuma |
| 6,147,715 A | 11/2000 | Yuen et al. |
| 6,167,188 A | 12/2000 | Young et al. |
| 6,177,931 B1 | 1/2001 | Alexander et al. |
| 6,208,335 B1 | 3/2001 | Gordon et al. |
| 6,219,839 B1 | 4/2001 | Sampsell |
| 6,324,338 B1 | 11/2001 | Wood et al. |
| 6,334,022 B1 | 12/2001 | Ohba et al. |
| 6,441,832 B1 | 8/2002 | Tao et al. |
| RE37,881 E | 10/2002 | Haines |
| 6,473,559 B1 | 10/2002 | Knudson et al. |
| 6,487,362 B1 | 11/2002 | Yuen et al. |
| 6,498,895 B2 | 12/2002 | Young et al. |
| 6,788,882 B1 | 9/2004 | Geer et al. |
| 6,820,278 B1 | 11/2004 | Ellis |
| 6,850,693 B2 | 2/2005 | Young et al. |
| 6,934,964 B1 | 8/2005 | Schaffer et al. |
| 2001/0043795 A1 | 11/2001 | Wood et al. |
| 2004/0008971 A1 | 1/2004 | Young et al. |
| 2004/0128686 A1 | 7/2004 | Boyer et al. |
| 2004/0181814 A1 | 9/2004 | Ellis et al. |
| 2005/0044567 A1 | 2/2005 | Young et al. |
| 2005/0204388 A1 | 9/2005 | Knudson et al. |

FOREIGN PATENT DOCUMENTS

| | | |
|---|---|---|
| EP | 0753964 | 1/1997 |
| EP | 0762756 | 3/1997 |
| EP | 0843468 | 5/1998 |
| EP | 0940985 | 9/1999 |
| JP | 06111413 | 4/1994 |
| JP | 06303541 | 10/1994 |
| JP | 9-289630 | 11/1997 |
| WO | WO 88/04507 | 6/1988 |
| WO | WO 95/04431 | 2/1995 |
| WO | WO 96/31980 | 10/1996 |
| WO | WO 96/34491 | 10/1996 |
| WO | WO 96/41478 | 12/1996 |
| WO | WO 97/13368 | 4/1997 |
| WO | WO 97/34413 | 9/1997 |
| WO | WO 97/40623 | 10/1997 |
| WO | WO 97/46943 | 12/1997 |
| WO | WO 97/47124 | 12/1997 |
| WO | WO 98/17064 | 4/1998 |
| WO | WO 98/47283 | 10/1998 |
| WO | WO 98/10589 | 12/1998 |
| WO | WO 99/03267 | 1/1999 |
| WO | WO 99/57839 | 11/1999 |
| WO | WO 99/60790 | 11/1999 |
| WO | WO 00/16548 | 3/2000 |

OTHER PUBLICATIONS

"Electronic Programme Guide (EPG); Protocol for a TV Guide using electronic data transmission" by European Telecommunication Standards Institute, May 1997, Valbonne, France, publication No. ETS 300 707.

"Windows 98 Feature Combines TV, Terminal and the Internet," *New York Times*, Aug. 18, 1998.

"Digital Video Broadcasting (DVB); DVB specification for data broadcasting", European Telecommunications Standards Institute, Draft EN 301 192 V1.2.1 (Jan. 1999).

Rewind, replay and unwind with new high-tech TV devices, by Lawrence J. Magid, *LA Times*. This document was printed from the Internet on Jun. 6, 1999 and bears a date of May 19, 1999.

Saito, Takeshi, et al., "Homenetwork Architecture Considering Digital Home Appliance," Technical Committee meeting of The Institute of Electronics, Information and Communication Engineers (IEICE), Japan, Nov. 6, 1997, vol. 97, No. 368, p. 57-64.

* cited by examiner

VIDEO FOR CURRENT
PROGRAM
(LIVING IN OBLIVION)

PAUSING LIVING IN OBLIVION WILL COST $4.95.
DO YOU STILL WISH TO PAUSE THE SHOW?

YES    NO

*FIG. 23*

CLIENT-SERVER BASED INTERACTIVE TELEVISION PROGRAM GUIDE SYSTEM WITH REMOTE SERVER RECORDING

This application claims the benefit of U.S. patent application Ser. No. 09/332,244, filed Jun. 11, 1999, which is a nonprovisional of U.S. Provisional Patent Application No. 60/092,807, filed Jul. 14, 1998. All of these prior applications are hereby incorporated by reference in their entireties.

BACKGROUND OF THE INVENTION

This invention relates to interactive television program guide systems, and more particularly, to interactive television program guide systems that allow users to record programs and program guide data on a media server.

Cable, satellite, and broadcast television systems provide viewers with a large number of television channels. Viewers have traditionally consulted printed television program schedules to determine the programs being broadcast at a particular time. More recently, interactive television program guides have been developed that allow television program information to be displayed on a user's television. Interactive television program guides allow the user to navigate through television program listings using a remote control. In a typical program guide, various groups of television program listings are displayed in predefined or user-defined categories. Listings are typically displayed in a list, grid, or table.

Program listings and other program guide data are typically provided by a satellite uplink facility to a number of cable system headends. Each headend distributes the program guide data to a number of users. Interactive television program guides are typically implemented on the users' set-top boxes. A typical set-top box is connected to a user's television and videocassette recorder. Program guide systems that allow users to record programs are described, for example, in Ellis et al. U.S. patent application Ser. No. 08/924,239, filed Sep. 5, 1997, which is hereby incorporated by reference herein in its entirety.

Such systems are deficient in a number of respects. The processing and storage capabilities of the set-top box and videocassette recorder are generally limited. This, in turn, may limit the functionality of the guide. Videocassette recorders may add significantly to the cost of in-home television equipment. They are mechanical systems, prone to failure, and their proper operation relies in part on users setting them properly (i.e., remembering to put a tape in). Setting up a VCR to work cooperatively with a program guide may be a complex process in some systems and may frustrate users. In addition, users cannot record multiple programs simultaneously without having multiple VCRs, and recording one program while watching another typically requires additional hardware or an enhanced set-top box. Systems in which program guides allow users to record one program while watching another are described, for example, in Lemmons et al. U.S. patent application Ser. No. 60/089,487, filed Jun. 16, 1998 which is hereby incorporated by reference herein in its entirety.

Systems that use hard disk technology to store programs have also been developed. Interactive television program guide systems that have digital storage devices are described, for example, in Hassell et al. U.S. patent application Ser. No. 09/157,256, filed Sep. 17, 1998. Hard-disk based products have also been developed by TiVo, Inc. of Sunnyvale, Calif., and Replay Networks, Inc. of Mountainview, Calif. These systems are deficient in that they require additional hardware in the user's home that may significantly increase the cost of the user's home television equipment. Such systems also do not allow users to record multiple programs simultaneously without having multiple devices in the home.

Some current television platforms support a return path between the set-top boxes and the headends. Client-server based program guides have been developed in which set-top boxes act as clients that communicate with servers located at headends via return paths. The servers typically provide program listings information (e.g., program titles and broadcast times) to the set-top boxes in response to requests that are generated by the set-top boxes.

Video-on-demand (VOD) systems have also been developed. Such systems typically record all programs that are distributed by a headend, or only a chosen subset of programs. In the former approach, vast amounts of storage is required at the server to ensure that all possible videos desired by users will be available. In the latter approach, users are limited to viewing only those programs that the headend operator decided to record.

In one cable television system known as "The Box," viewers can call a cable operator to request the airing of a particular music video from an archive of music videos. The requested videos are broadcast on a dedicated channel for all viewers to see. This approach suffers from a number of deficiencies. First, users do not have the convenience of ordering programs using their television equipment. In addition, viewers must wait for the airing of other viewers' selections before theirs are aired. Also, viewers are limited to selecting videos from only those archived. Some viewers may desire music videos that are not shared in the archive. These viewers have no way of selecting a video for archiving or viewing other videos.

In a cable television system known as "Your Choice TV," television programs that have previously aired are repeated on a dedicated set of television channels. Viewers may order a repeat of a program for a small fee. However, the repeats are aired at scheduled times, which may not be convenient for the viewer. Also, desired programs may not be available to viewers because the cable system operator decides which programs to record.

It is therefore an object of the present invention to provide a program guide system that allows users to direct a server to record certain programs that later may be played back to the user on demand.

SUMMARY OF THE INVENTION

This and other objects of the present invention are accomplished in accordance with the principles of the present invention by providing a program guide system that records programs at a remote media server in response to user requests. A main facility provides program guide data to a number of television distribution facilities. The television distribution facilities distribute the program guide data to a number of interactive television program guides using any suitable approach (e.g., continuously, periodically, in response to requests or commands, etc.) The interactive television program guides may be implemented wholly on the users' television equipment. Alternatively, the program guides may be implemented partially on the users' television equipment and partially implemented on a server using a suitable client-server based or distributed approach.

The remote media server may be located at a program guide distribution facility or other suitable distribution facility (e.g., a cable system headend, a broadcast distribution facility, a satellite television distribution facility, or any other suitable type of television distribution facility). The remote media server may record programs and, if desired, program guide data. The remote media server may also record data associated with programs, such as data carried in a vertical blanking interval (VBI) or in a digital data track. The programs, program associated data, program guide data or any suitable combination thereof, may be recorded in response to requests generated by the interactive television program guide. Programs recorded by the remote media server may be distributed to users using any suitable video-on-demand or near-video-on-demand approach. Users may also have local media servers (e.g., personal computers) in their homes for recording programs and, if desired, program guide data.

Further features of the invention, its nature and various advantages will be more apparent from the accompanying drawings and the following detailed description of the preferred embodiments.

BRIEF DESCRIPTION OF THE DRAWINGS

FIG. 23 shows an illustrative overlay that the program guide may display when a user indicates a desire to real-time cache a program on the remote media server of FIGS. 2a-2e or the local media server of FIG. 7.

DETAILED DESCRIPTION OF THE PREFERRED EMBODIMENTS

Figure 1:
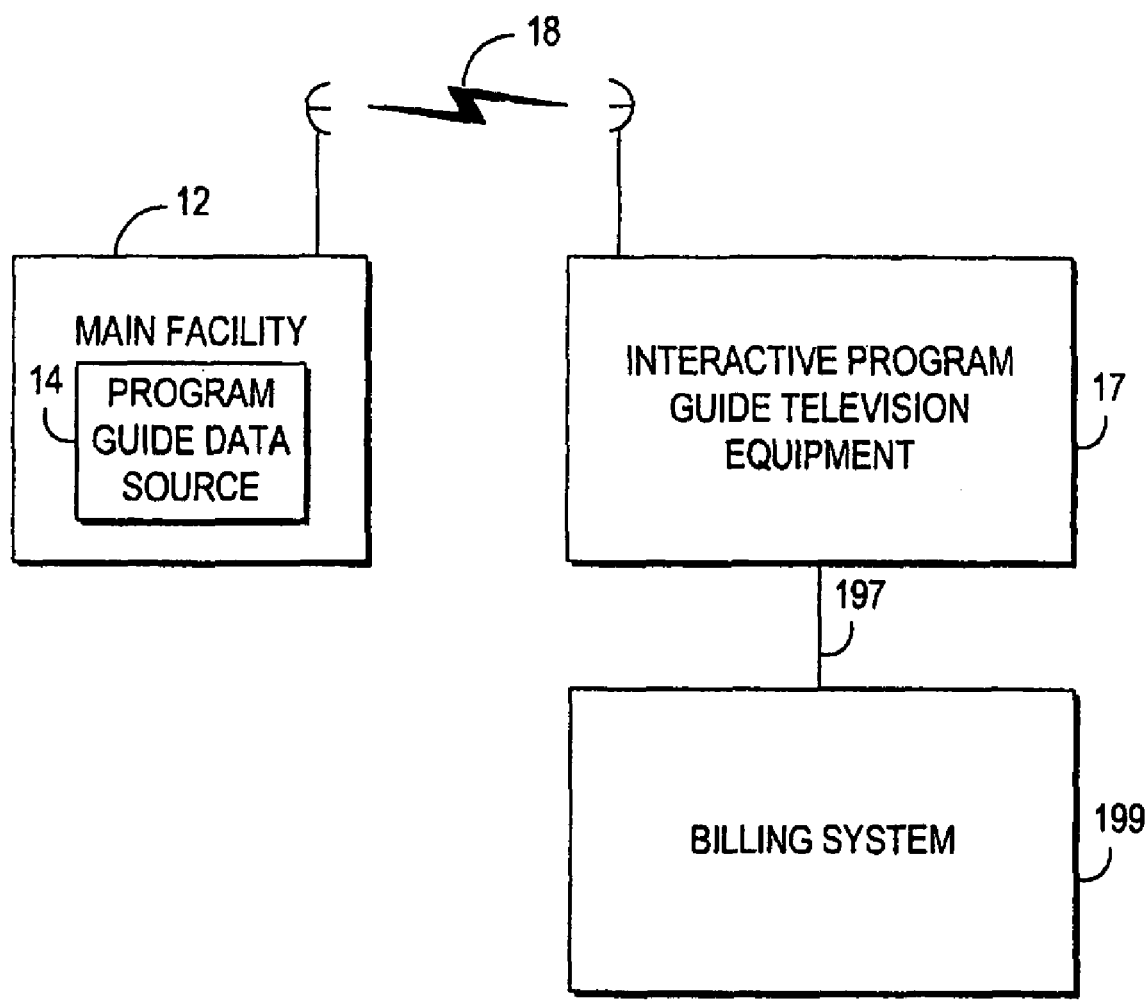
FIG. 1 is a schematic block diagram of an illustrative system in accordance with the present invention.

An illustrative system 10 in accordance with the principles of the present invention is shown in FIG. 1. Main facility 12 provides program guide data from program guide data source 14 to interactive program guide television equipment 17 via communications link 18. There are preferably numerous pieces or installations of interactive program guide television equipment 17, each linked to main facility 12 by a respective communications link 18 although only one such piece or installation of interactive program guide television equipment 17 is shown in FIG. 1 to avoid overcomplicating the drawing.

Link 18 may be a satellite link, a telephone network link, a cable or fiber optic link, a microwave link, an Internet link, a combination of such links, or any other suitable communications link. If it is desired to transmit video signals over link 18 in addition to data signals, a relatively high bandwidth link such as a satellite link may generally be preferred to a relatively low bandwidth link such as a telephone line.

The program guide data transmitted by main facility 12 to interactive program guide television equipment 17 may include television programming data (e.g., program identifiers, times, channels, titles, and descriptions) and other data for services other than television program listings (e.g., help text, pay-per-view information, weather information, sports information, music channel information, associated Internet web links, associated software, etc.). The program guide data may also include unique identifiers for each showing of each program, identifiers for program groupings (e.g., series, miniseries, orderable packages of programs, etc.), or any other suitable identifier. As used herein television "program" and "programming" are intended to mean any type of show or advertisement carried on a regular, premium, pay-per-view, music, or other type of television channel, and may include movies, pay-per-view programs, sporting events, music programs, commercials and any other suitable type of television program.

Interactive program guide television equipment 17 may be connected to billing system 199 via communications link 197. Communications link 197 may be any suitable communications link, such as a serial connection, parallel connection, universal serial bus (USB) connection, a telephone link, computer network link, Internet link, or any other suitable communications link. Billing system 199 receives information from interactive program guide television equipment 17 regarding programs that are ordered, recorded, or played back on interactive program guide television equipment 17. Billing system 199 may be any computer based system suitable for generating bills for users or crediting and debiting accounts of users based on the information received from interactive program guide television equipment 17.

An interactive television program guide is implemented on interactive program guide television equipment 17. Five illustrative arrangements for interactive program guide television equipment 17 are shown in FIGS. 2a-2e. As shown, interactive program guide television equipment 17 may include program guide distribution equipment 21 located at program guide distribution facility 16, and user television equipment 22.

Figure 2A:
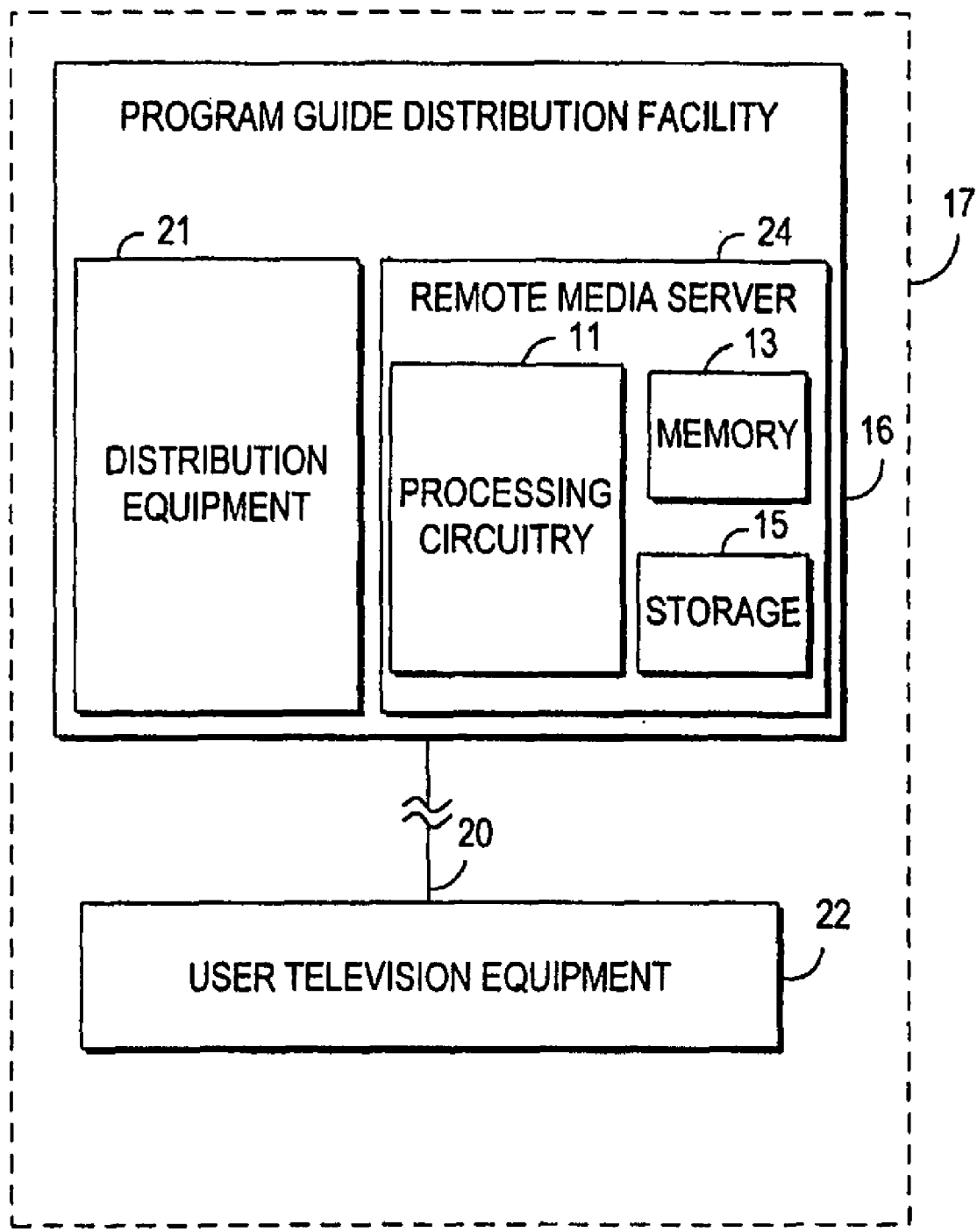
FIGS. 2a-2e are schematic diagrams showing illustrative arrangements for the interactive program guide equipment of FIG. 1 in accordance with the present invention.
Figure 2B:
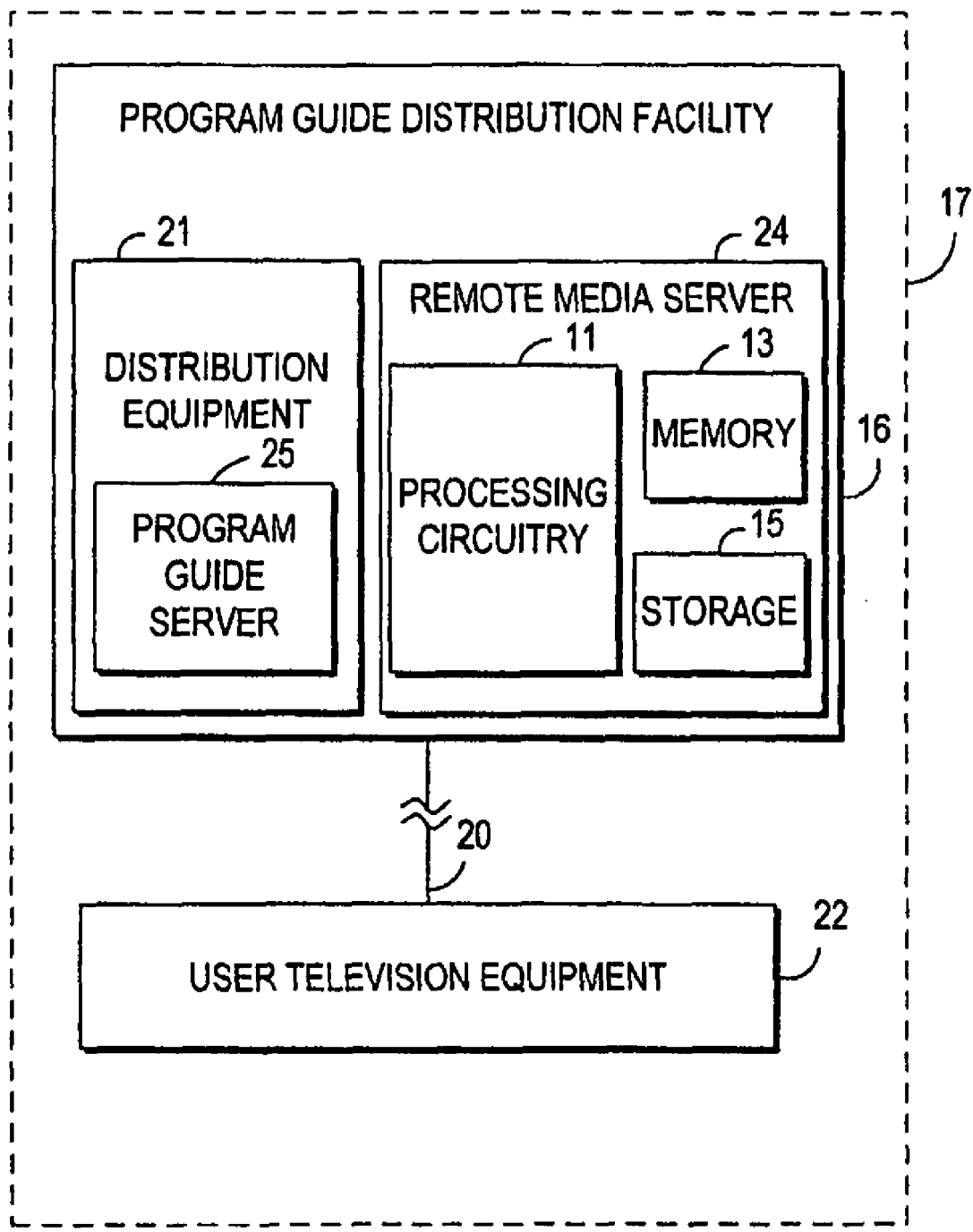
Figure 2C:
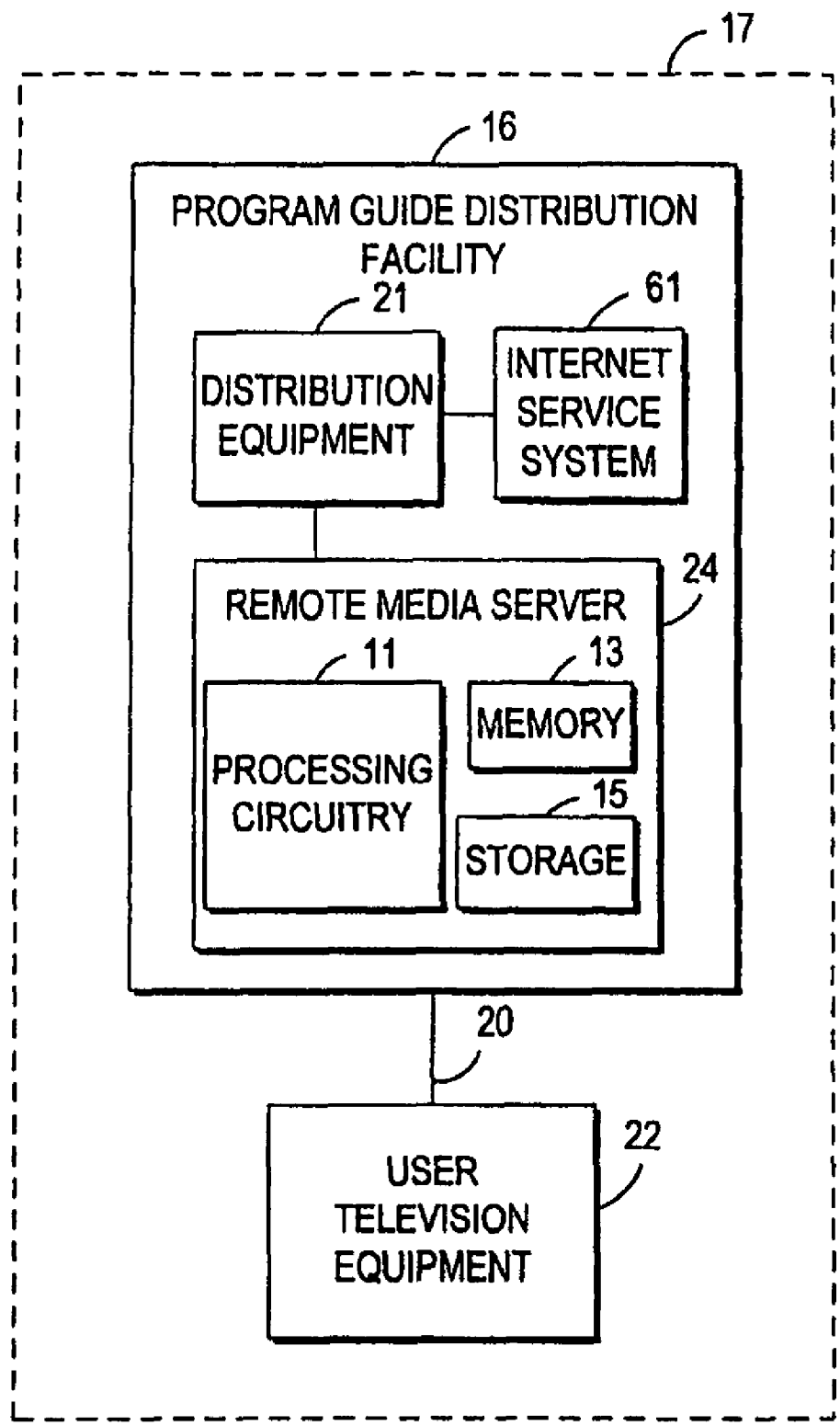
Figure 2D:
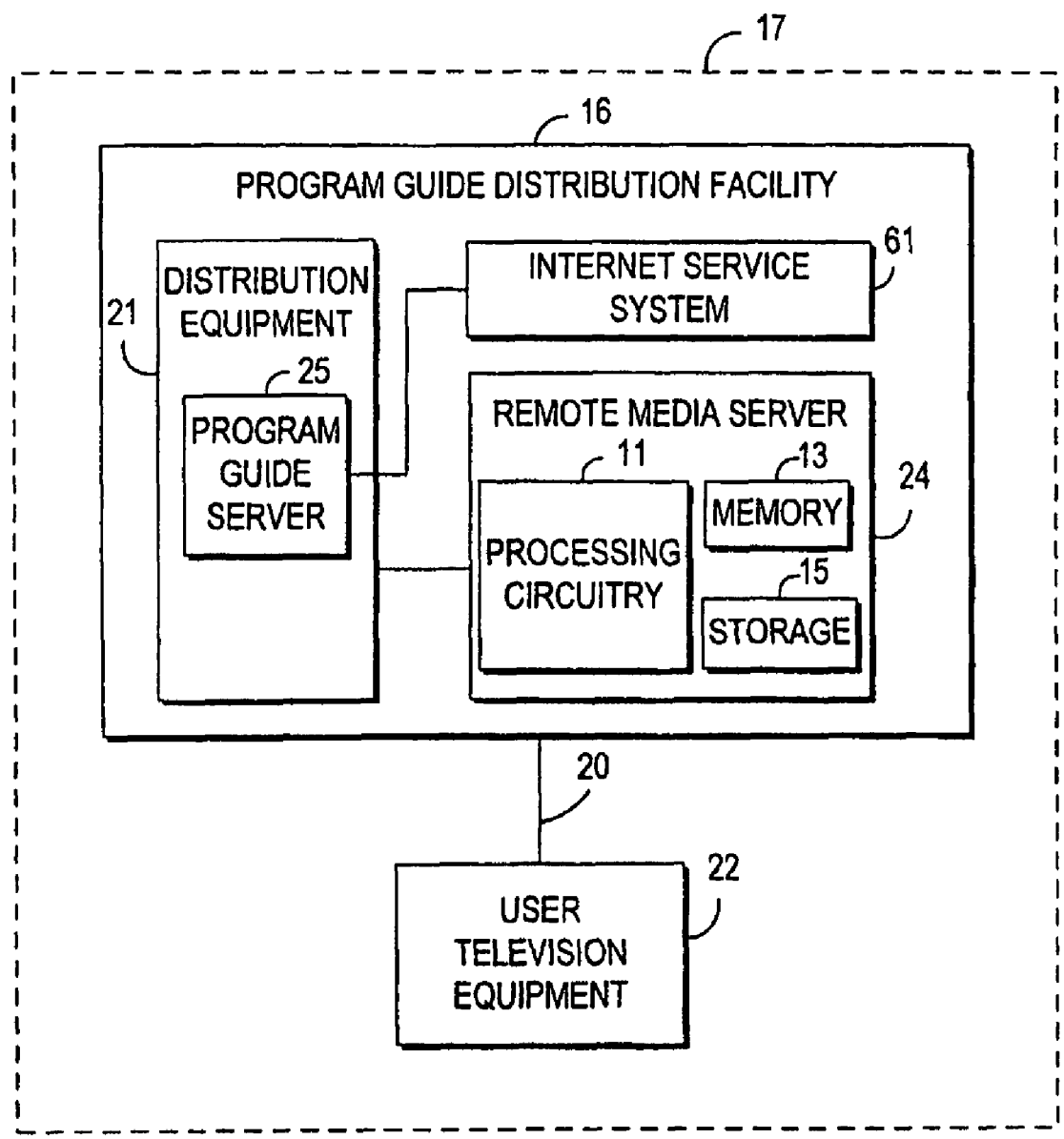

The interactive television program guide may run totally on user television equipment 22 using the arrangements of FIGS. 2a and 2c, or may run partially on user television equipment 22 and partially on interactive program guide television equipment 17 using a suitable client-server or distributed processing arrangement such as those shown in FIGS. 2b and 2d. Program guide distribution facility 16 may be any suitable distribution facility, and may have distribution equipment 21.

Distribution equipment 21 of FIGS. 2a, 2b, 2c, and 2d is equipment suitable for providing program guide data to user television equipment 22 over communications path 20. Distribution equipment 21 may include, for example, suitable transmission hardware for distributing program guide data on a television channel sideband, in the vertical blanking interval of a television channel, using an in-band digital signal, using an out-of-band digital signal, or by any other suitable data transmission technique. Analog or digital video signals (e.g., television programs) may also be distributed by distribution equipment 21 to user television equipment 22 over communications paths 20 on multiple television channels. Alternatively, videos may be distributed to user television equipment 22 from some other suitable distribution facility, such as a cable system headend, a broadcast distribution facility, a satellite television distribution facility, or any other suitable type of television distribution facility.

Communications paths 20 may be any communications paths suitable for distributing program guide data. Communications paths 20 may include, for example, a satellite link, a telephone network link, a cable or fiber optic link, a microwave link, an Internet link, a data-over-cable service interface specification (DOCSIS) link, a combination of such links, or any other suitable communications link. Communications paths 20 preferably have sufficient bandwidth to allow program guide distribution facility 16 or another distribution facility to distribute television programming to user television equipment 22. There are typically multiple pieces of user television equipment 22 and multiple associated communications paths 20, although only one piece of user television equipment 22 and communications path 20 are shown in FIGS. 2a-2d to avoid overcomplicating the drawings. If desired, television programming and program guide data may be provided over separate communications paths.

FIG. 2b shows an illustrative arrangement for interactive program guide television equipment 17 in a client-server based or distributed interactive program guide system. As shown in FIG. 2b, distribution equipment 21 may include program guide server 25. Program guide server 25 may use any suitable combination of hardware and software to provide a client-server based program guide. Program guide server 25 may, for example, run a suitable database engine (e.g., SQL Server by Microsoft) and provide program guide data in response to queries generated by a program guide client implemented on user television equipment 22. If desired, program guide server 25 may be located at main facility 12, or other location, such as a cable system headend, a broadcast distribution facility, a satellite television distribution facility, or any other suitable type of television distribution facility.

The program guide may retrieve program guide data from program guide server 25 using any suitable client-server based approach. The program guide may, for example, pass SQL requests as messages to program guide server 25. In another suitable approach, the program guide may invoke remote procedures that reside on program guide server 25 using one or more remote procedure calls. Program guide server 25 may execute SQL statements for such invoked remote procedures. In still another suitable approach, client objects executed by the program guide may communicate with server objects executed by program guide server 25 using, for example, an object request broker (ORB). This may involve using, for example, Microsoft's Distributed Component Object Model (DCOM) approach.

The program guide implemented on interactive program guide television equipment 17 may communicate with program guide server 25 over communications path 20 using any suitable network and transport layer protocols, if desired. They may communicate, for example, using a protocol stack which includes Sequenced Packet Exchange/Internetwork Packet Exchange (SPX/IPX) layers, Transmission Control Protocol/Internet Protocol (TCP/IP) layers, Appletalk Transaction Protocol/Datagram Delivery Protocol (ATP/DDP) layers, DOCSIS or any other suitable network and transport layer protocols.

FIGS. 2c and 2d show illustrative Internet based interactive television program guide systems. Television distribution facility 16 may, for example, include Internet service system 61. Internet service system 61 may use any suitable combination of hardware and software capable of providing program guide data to the guide using an Internet based approach (e.g., the HyperText Transfer Protocol (HTTP)). If desired, Internet service system 61 may be located at a facility that is separate from program guide distribution facility 16.

If the program guide is implemented on user television equipment 22 of interactive program guide television equipment 17 as shown in FIG. 2c, Internet service system 61 (or other suitable equipment at program guide distribution facility 16 that is connected to Internet service system 61) may provide program guide data to user television equipment 22 via the internet, or via program guide distribution equipment 21 using any suitable Internet-based approach (e.g., using the HyperText Transfer Protocol (HTTP) over a Transmission Control Protocol/Internet Protocol (TCP/IP) type link). If the program guide implemented on interactive program guide television equipment 17 is a client-server guide as shown in FIG. 2d, program guide server 25 may obtain program guide data from Internet service system 61. The program guide may also, however, obtain program guide data from Internet service system 61 via an Internet connection.

In another suitable arrangement, distribution equipment 21 may include computer equipment or other suitable hardware on which a first portion or version of the interactive television program guide is implemented. A second portion or version of the program guide may be implemented on user television equipment 22. The two versions or portions of the interactive program guide may communicate using any suitable peer-to-peer communications scheme (e.g., messaging, remote procedure calls, etc.) and perform interactive program guide functions distributively between television distribution facility 16 and user television equipment 22.

Figure 2E:
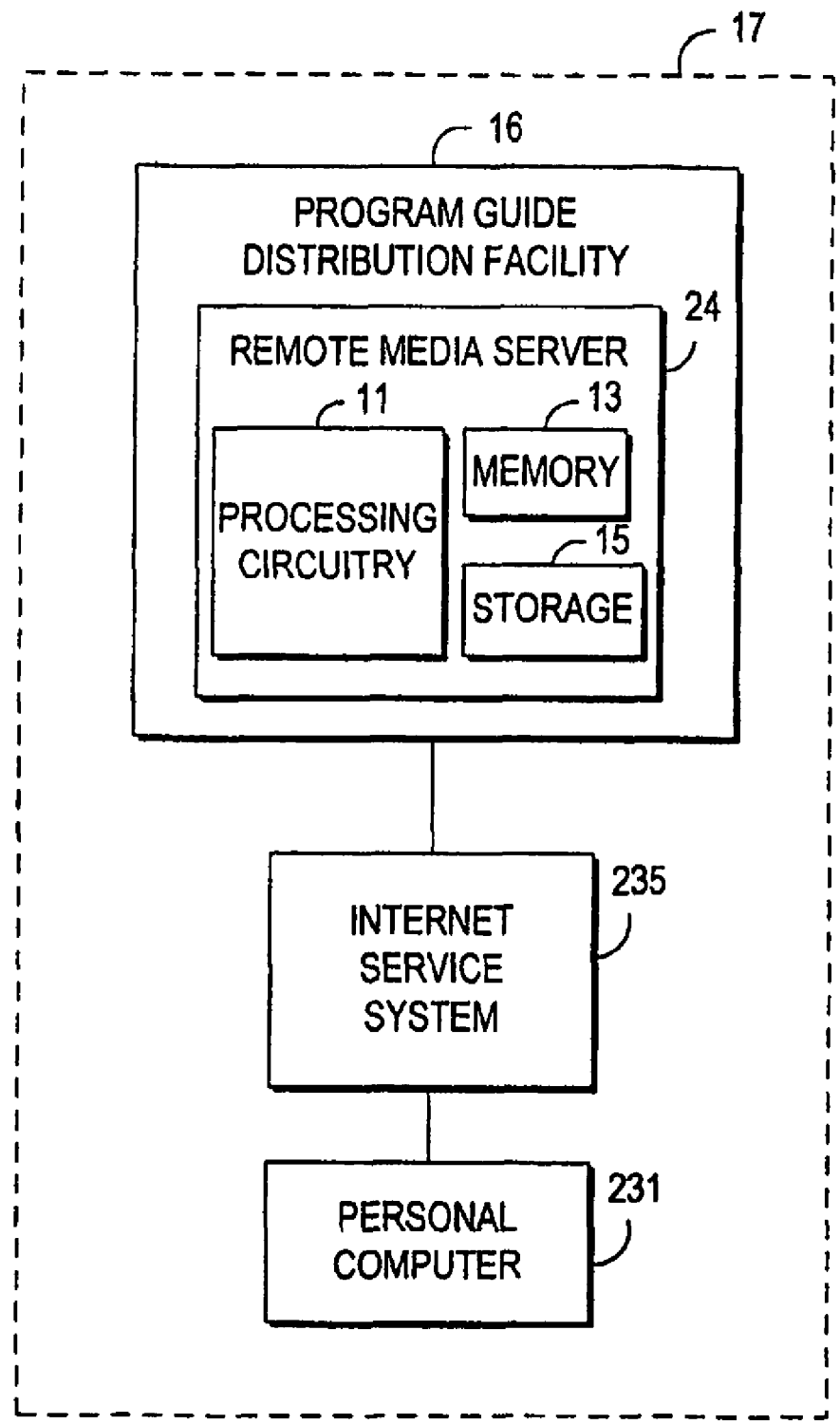

Another suitable arrangement in which an on-line program guide is implemented on interactive program guide television equipment 17 is shown in FIG. 2e. On-line program guide systems are described, for example, in Boyer et al. U.S. patent application Ser. No. 08/938,028, filed Sep. 18, 1997, which is hereby incorporated by reference herein in its entirety. The user may have personal computer (PC) 231 on which a program guide client or web browser is implemented. Personal computer 231 may be connected to Internet service system 235 via Internet link 233. Internet service system 233 may use any suitable combination of computer hardware and software capable of providing an on-line program guide server application or web site.

Internet service system 235 may be connected to remote media server 24 of program guide distribution facility 16. In other suitable arrangements, the recording and playback functionality of remote media server 24 may be incorporated into Internet service system 235 if Internet service system 235 has suitable processing circuitry, memory, and storage.

Programs and program guide data may be recorded and played back on-demand by remote media server 24 in response to record and playback requests. Record and playback requests may be generated by a program guide server application or web application implemented on Internet service system 235. Record and playback requests may also be generated by an interactive program guide client implemented on personal computer 231 and may be provided to remote media server 24 by Internet service system 235. Programs and program guide data maybe provided by Internet service system 235 to personal computer 231 using a suitable real-time Internet video approach (e.g., using the M-Bone), or may be downloaded and stored by personal computer 231 for playback.

Remote media server 24 of FIGS. 2a, 2b, 2c, 2d, and 2e records programs, program guide data, or any suitable combination thereof and supplies either or both to user television equipment 22 in response to requests generated by the program guide. Remote media server 24 may also record program associated data, such as data carried in the vertical blanking interval (VBI) of an analog television channel or in a digital data track on a digital television channel. Examples of program associated data are subtitles, text tracks, music information tracks, additional video formats, additional languages, or other additional data. As used herein, recording and playing back "programming" or "programs" may include, but does not require, recording and playing back program associated data. Remote media server 24 is shown as being located at program guide distribution facility 16, but may be located at a separate distribution facility (e.g., a cable system headend, a broadcast distribution facility, a satellite television distribution facility, or any other suitable type of television distribution facility).

Remote media server 24 may be based on any suitable combination of hardware and software suitable for recording and playing back programs or program guide data on demand. As defined herein, the phrase "recording on-demand" refers to recording a program or program guide data in response to a user's selection of a program for recording. The actual recording of a program need not take place at the same time that such a selection is made. For example, a program may be selected for recording before its scheduled broadcast time and may be recorded when the selected program is aired.

Remote media server 24 may include processing circuitry 11, memory 13, and storage 15. Processing circuitry 11 may include any suitable processor, such as a microprocessor or group of microprocessors, and other processing circuitry such as caching circuitry, direct memory access (DMA) circuitry, digitizing circuitry, and input/output (I/O) circuitry. Processing circuitry 11 may also include circuitry suitable for decoding program and data files stored on storage 15 and converting them to suitable video signals for distribution by distribution equipment 21. If programming is stored as Moving Pictures Experts Group (MPEG) MPEG-2 files, processing circuitry 11 may include, for example, an MPEG-2 decoder for decoding the files and converting them to National Television Standards Committee (NTSC) video. In another suitable approach, processing circuitry passes the MPEG-2 files to distribution equipment 21 for distribution to users as an MPEG-2 data stream. The MPEG-2 data stream may be decoded and displayed by user television equipment 22.

Memory 13 may be any memory suitable for caching and storing computer code for performing the functions of processing circuitry 11. Memory 13 may be used to cache video programs, portions of video programs, or program guide data for processing circuitry 11 while programs are being played back or recorded.

Figure 3:
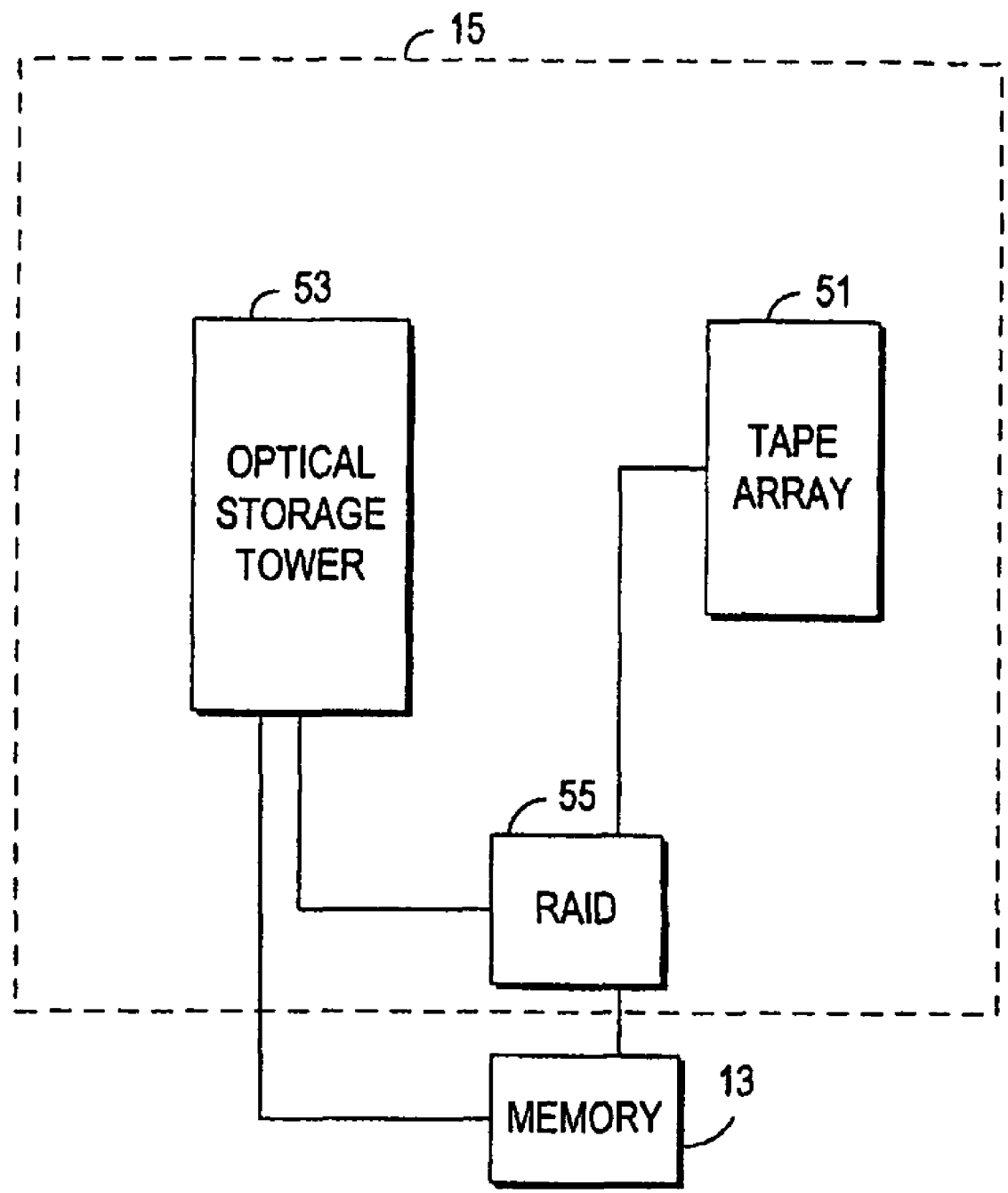
FIG. 3 is a schematic diagram showing an illustrative arrangement for the storage of FIGS. 2a-2e in accordance with the present invention.

Storage 15 may be any storage suitable for recording programming files and associated program guide data. One suitable arrangement for storage 15 is shown in FIG. 3. The storage arrangement of FIG. 3 is only illustrative. Storage 15 may include any suitable recordable storage system and medium. Storage 15 may include, for example, tape array 51, optical storage tower 53, redundant arrays of independent disks (RAID) 55, any other suitable mass storage system, or any suitable combination thereof. Tape array 51 may include any suitable high-speed mass storage tape array, such as an 8 mm tape array. Tape array 51 may back-up or archive programs stored on optical storage tower 53 or RAID 55.

Optical storage tower 53 may be any suitable recordable optical storage system. Optical storage tower 53 may, for example, record programs on recordable compact disks (CDs) or digital versatile disks (DVDs). During playback, programs and data stored on optical storage tower 53 may be temporarily stored in virtual memory (e.g., swap files) on RAID 55 for use by memory 13, or may be provided directly to memory 13 (e.g., by suitable DMA circuitry in processing circuitry 11) for decoding.

Storage 15 may be measured on the order of hundreds of gigabytes, terabytes, or more. While this may involve a considerable amount of resources, storage 15 may still require less storage than a system that recorded every program (or a large subset of them) distributed by headends for every programming time slot. Because the present system typically needs to record only those programs that are selected by users, less popular programs need not be routinely recorded, which reduces the overall storage requirements of the system.

Storage 15 may also be less than the total storage that would be maintained by all users at their homes if each user recorded his or her own copies of programs individually. Remote media server 24 may allocate a specific amount of storage for each user if desired. This amount may be fixed or may be configurable.

Figure 4:
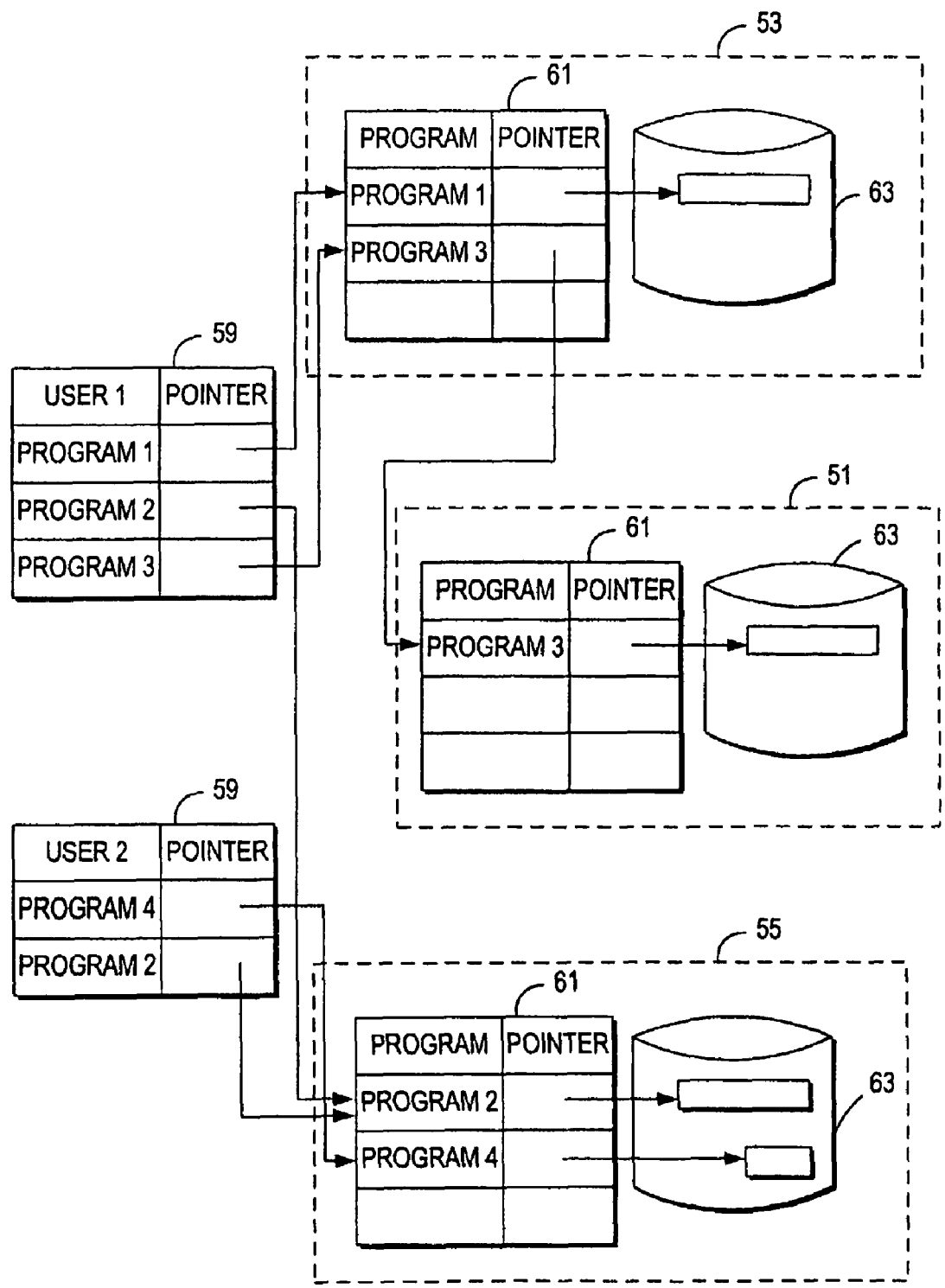
FIG. 4 is a schematic diagram showing an illustrative arrangement of media directories maintained by the storage devices of FIG. 3.

Recorded programs may be referenced by pointers that are maintained in one or more directories. A directory of pointers for each user, for example, may be stored in memory 13 or RAID 55. User directories may also be maintained locally by the program guides. An illustrative arrangement for user directories and other directories is shown in FIG. 4. Each user directory 59 may include an identifier for each program that has been recorded for the user and a pointer to the storage device on which the program was originally recorded. In this example, programs 1 and 3 were originally recorded on optical storage tower 53. Programs 4 and 2 were originally recorded on RAID 55. Programs may also be recorded on tape array 51 and different parts of a single program may be recorded on different storage devices if desired but these aspects of the invention are not shown in FIG. 4 to avoid overcomplicating the drawing.

Each storage device may maintain a media directory 61 and a media store 63. As used herein, a media store is any physical or virtual partition of a storage device or storage medium that is used to store programs, program guide data, or any suitable combination thereof, and may also include an entire storage device or storage medium having one or no partitions. Each media directory 61 may include a list of programs recorded by the storage device. Each media directory 61 may also include pointers to where the programs are stored in media store 63. If desired, tape array 51 may be used to archive programs that are stored on optional storage tower 53 or RAID 55 for a predefined period of time (e.g., one month). In addition, programs may be archived by optical storage tower 53 for RAID 55 (not shown). PROGRAM 3 is an example of a program that has been archived by tape array 51. A media directory 61 entry may reflect the archiving by pointing to a media directory 61 entry on tape array 51, if desired.

Remote media server 24 records programs and associated program guide data on storage 15 in response to record requests generated by the program guide implemented on interactive program guide television equipment 17. As defined herein, a "record request" is any command, request, message, remote procedure call, object based communication, or any other type of interprocess or inter-object based communication that allows the program guide to communicate information on the program that the user wishes to record to the media server.

Figure 5:
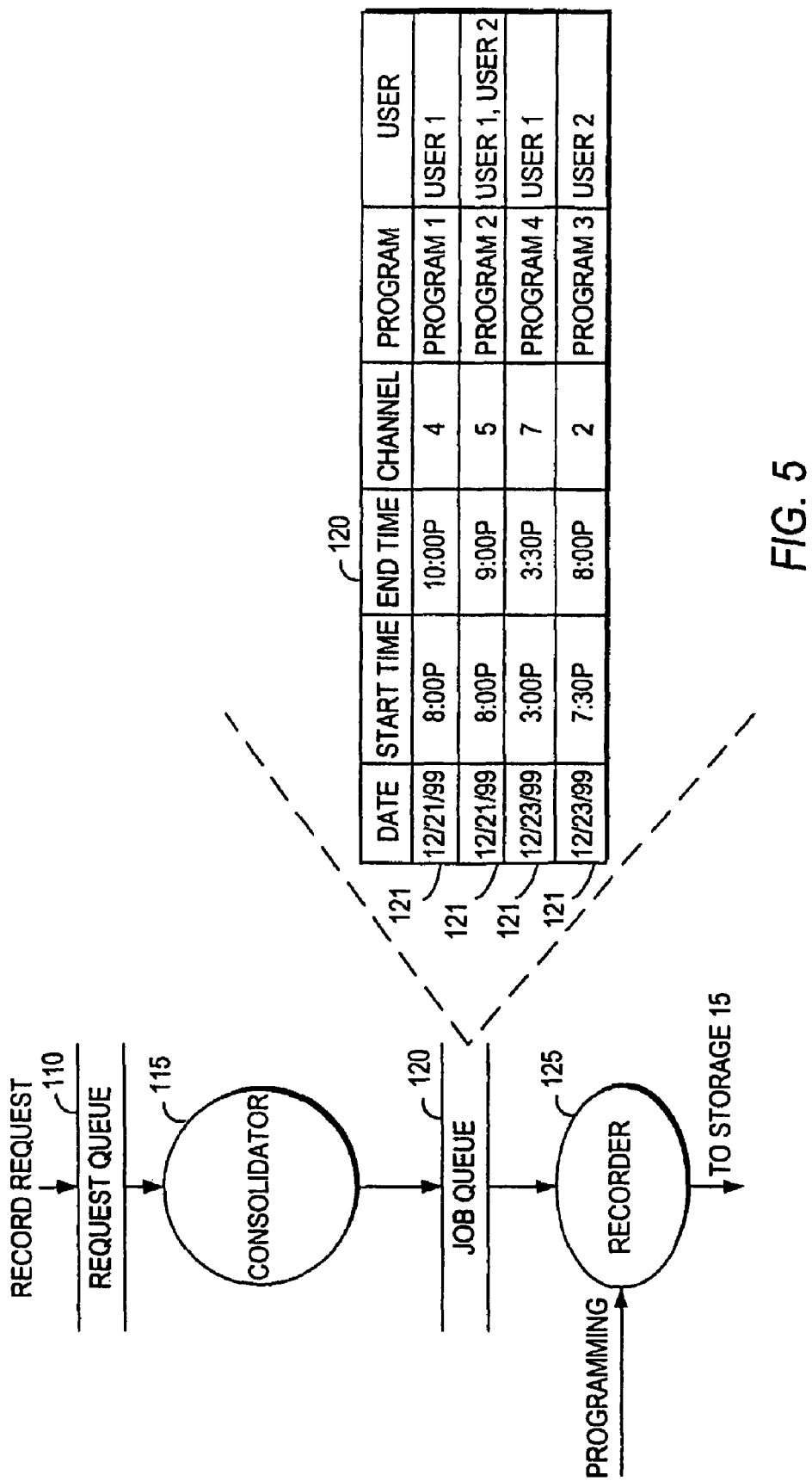
FIG. 5 is an illustrative data flow diagram showing how programs may be recorded.

An illustrative data flow diagram showing how programs may be recorded by remote media server 24 is shown in FIG. 5. Record requests generated by program guides implemented on interactive program guide television equipment 17 may be queued in request queue 110 for consolidation. Consolidator 115 may be a process running on remote media server 24. Consolidator 115 consolidates multiple record requests for the same programs and places individual and group record jobs on job queue 120.

In practice, it may not be desirable to record a program unless a certain number of users have requested it. At a predefined period of time before the requested program airs, consolidator 115 may check job queue 120 to see if enough users have requested the program. If there are not enough users, consolidator 115 may generate a message that is distributed back to the requesting user or users by distribution equipment 21. When the program guide receives such a message, the program guide may notify the user that the program is not being recorded. Alternatively, the program guide may request that the program be recorded by a local media server, such as local media server 29 of FIG. 6, or may record the program itself on a storage device.

Illustrative entries 121 in job queue 120 are also shown in FIG. 5. The entries 121 may include, for example, the dates, start times, end times (or durations), channels, and program identifiers for the programs that have been selected for recording on remote media server 24. The entries may also include lists of the users who have selected each program for recording. FIG. 5 shows, for example, that PROGRAM 2 has been selected for recording by user 1 and user 2. If a program is popular, numerous users may request that it be recorded.

Recorder 125 may be a process running on processing circuitry 11 of remote media server 24 that is suitable for monitoring job queue 120 and recording programs on storage 15. Processing circuitry 11 of remote media server 24 may include, for example, one or more tuners, digital encoders, or digital decoders for tuning to or otherwise selecting programming provided by distribution equipment 21 and formatting the programs for recording by remote media server 24. Any suitable combination of analog and digital tuners and decoders are hereinafter referred to as tuners to simplify the discussion. Recorder 125 may direct the one or more tuners to particular channels (analog or digital) at particular times based on entries in job queue 120. In this example, recorder 125 may direct a first tuner to tune to channel 4 on Dec. 21, 1999 to record PROGRAM 1 for user 1. Recorder 125 may also direct a second tuner to tune to channel 5 at the same time to record PROGRAM 2 for user 1 and user 2. The upper limit on the number of tuners needed for remote media server 24 may be the number of channels distributed by distribution equipment 21. Such tuners may be based on tuning and decoding circuitry implemented using one or more integrated circuits.

If desired, recorder 125 may direct processing circuitry 11 to encode programming and program guide data as digital files (e.g., MPEG-2 files) or as a digital data stream (e.g., an MPEG-2 data stream). Storage 15 may record the files or data stream using, for example, suitable DMA techniques. Processing circuitry 11 may compress the digital files or data stream using any suitable digital compression algorithm, if desired.

The storage device on which a program has been recorded may supply recorder 125 with a pointer to the entry in the media directory 61 for the recorded program. This may be done automatically or in response to a query generated by recorder 125. If user directories 59 (FIG. 4) are maintained by remote media server 24, recorder 125 may place entries in the user directories 59 of the users who selected the program for recording. If copies of user directories 59 are maintained locally by the program guides, the program guides may, for example, download the user directories via program guide server 25 or using any other suitable approach. Alternatively, the program guide may just download pointers to the media directory entries. If user directories 59 are maintained exclusively by the program guides, the program guides may receive the pointer to the media directory 61 in which the program is listed automatically in response to the record request, after issuing a suitable request for the pointer, or using any other suitable approach.

Remote media server 24 retrieves programs from storage 15 in response to retrieval requests generated by the program guides implemented on interactive program guide television equipment 17. Processing circuitry 11 may process the requests by searching a user's user directory 59 for the requested programs and then issuing a suitable retrieval command (or request) to storage 15 based on the pointer in the directory. For example, when user 1 requests the playing of PROGRAM 1, processing circuitry 11 issues an appropriate retrieval command to optical storage tower 53. The program is retrieved from media store 63 and may be passed to memory 13 (e.g., via DMA circuitry in processing circuitry 11) for decoding by processing circuitry 11 and distribution to user television equipment 22. If desired, processing circuitry may pass a requested program in its digital form to distribution equipment 21 for distribution to user television equipment 22.

If a requested program has been archived (e.g., stored on a storage device other than the one on which the program was originally stored), the original storage device may issue a suitable retrieval command to the archiving storage device in response to commands (or requests) generated by processing circuitry 11. For example, when user 1 requests the retrieval of PROGRAM 3 for playback, processing circuitry 11 may issue a retrieval command to optical storage tower 53. Optical storage tower 53 in turn examines its media directory 61, determines that PROGRAM 3 has been archived, and issues a retrieval request to tape array 51. Tape array 51 retrieves the program from its media store 63, and transmits it to optical storage tower 53 using any suitable interconnection (e.g., a parallel connection, a small computer systems interface (SCSI) connection (e.g., wide SCSI-2, fast wide SCSI-2, ultra SCSI-3, etc.), a universal serial bus (USB) connection, or any other suitable connection). Alternatively, the archiving device, in this example tape array 51, may transfer the program directly to memory 13 (e.g., via DMA circuitry in processing circuitry 11). If desired, processing circuitry 11 may determine whether a program has been archived, and may issue a retrieval request to tape array 51.

During system operation, multiple users may request the playback of a single program such that the playback of the program for one user overlaps the playback of the program for another user. Remote media server 24 may simultaneously play back the same program for a number of users by, for example, assigning a pointer to each user that points to the user's current viewing position within the program. One suitable approach may involve caching the entire program or portions of it in digital form in memory 13.

Figure 6A:
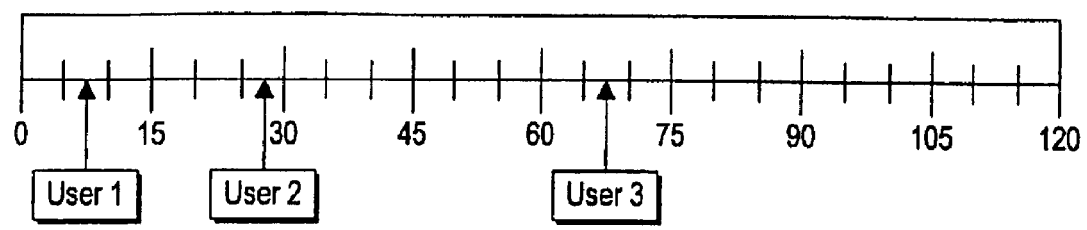
FIGS. 6a and 6b are diagrams illustrating the use of user pointers to play back a single program for multiple users in accordance with the present invention.
Figure 6B:
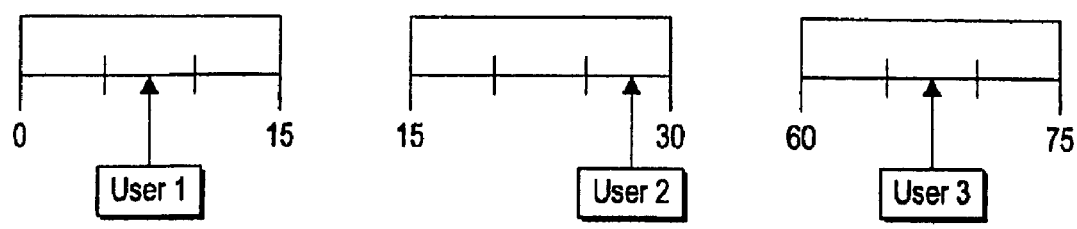

FIGS. 6a and 6b illustrate how pointers may be used to simultaneously play the same program for multiple users. After remote media server 24 receives a request for a program, remote media server 24 assigns a pointer to the requesting user and retrieves all or a portion of the requested program. FIG. 6a illustrates remote media server 24 caching an entire two-hour movie that is being simultaneously played for three users. FIG. 5b illustrates remote media server 24 caching a predetermined amount (e.g., 15 minutes) of a requested movie for each of three users.

As a movie progresses, remote media server 24 may increment each user's pointer. Remote media server 24 may also pre-decode a predetermined amount of time (e.g., the next 5 minutes) of the program so that as a user's pointer advances, the video is ready for distribution by distribution equipment 21. If a user rewinds a movie, remote media server 24 may regress the user's pointer (i.e., move it to the left) and pre-decode a previous portion of the movie.

If remote media server 24 caches only portions of a program as shown in FIG. 6b, it may only cache a single copy of each portion in memory 13. As user 1 advances the movie toward minute 15, for example, remote media server 24 may check to see if minutes 15 to 30 are already cached. In this example they are, and the copy (to which user 2 points) may be used for user one. If minutes 15 to 30 were not already cached, media server 25 may prefetch them and pre-decode a suitable amount (e.g., 5 minutes) so that the video stream for user 1 is not interrupted. If desired, media server 25 may continually prefetch the next 15 minutes (or less) of data.

Program guide data and recorded videos may be distributed by distribution equipment 21 to user television equipment 22 as a suitable analog video signal (e.g., NTSC video), or in a suitable digital format (e.g., as MPEG-2 files or as an MPEG-2 data stream) using any suitable approach. For example, programs and program guide data may be played back by media server 24 and distributed to user television equipment 22 for viewing in real-time. If programs and program guide data are distributed as digital data stream, user television equipment 22 may decode the data stream in real time. Such on-demand programs and program guide data may be played back according to preferences that were set up by the user. In a second suitable approach, programs and program guide data are distributed as one or more digital files or as a digital data stream, and are stored by user television equipment 22 for playback. In a third suitable approach, programs and program guide data are played back by remote media server 24 and distributed according to a schedule over an analog or digital channel using a suitable near-video-on-demand (NVOD) approach. In still another suitable approach, remote media server 24 may record programs and program guide data on physical media, such as a DVD or videocassette, that are sent to the user. Any combination of these approaches, or any other suitable approach, may also be used.

Figure 7:
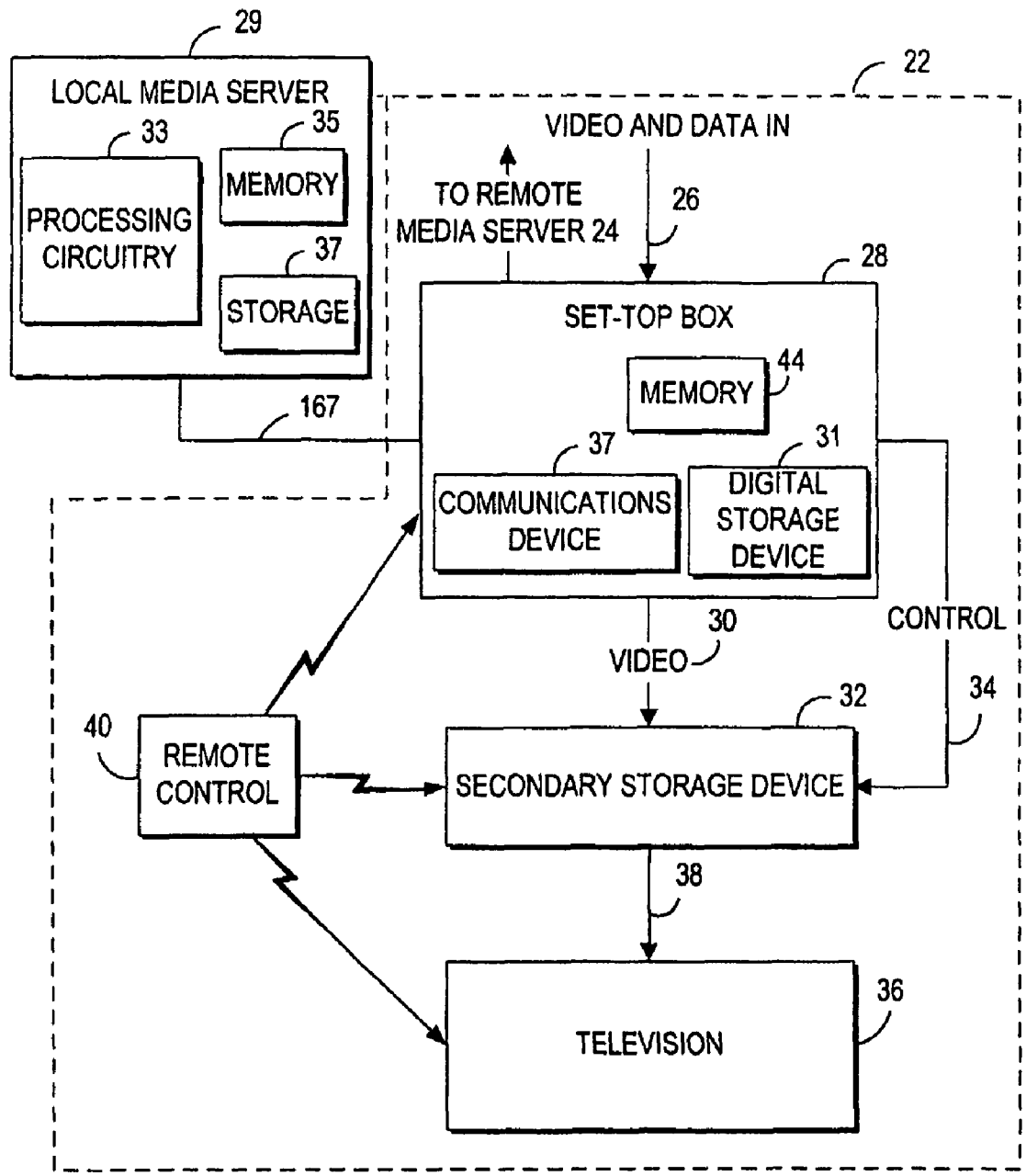
FIG. 7 is a schematic block diagram of an illustrative arrangement for the user television equipment of FIGS. 2a-2e in accordance with the present invention.

An illustrative arrangement for user television equipment 22 is shown in FIG. 7. User television equipment 22 of FIG. 7 receives analog video or a digital video stream from a distribution facility at input 26. Data from program guide distribution facility 16 is also received at input 26. During normal television viewing, the user tunes set-top box 28 to a desired television channel (analog or digital). The signal for that television channel is then provided at video output 30. The signal supplied at output 30 is typically either a radio-frequency (RF) signal on a predefined channel (e.g., channel 3 or 4), or a analog demodulated video signal, but may also be a digital signal provided to television 36 on an appropriate digital bus (e.g., a bus using the Institute of Electrical and Electronics Engineers (IEEE) 1394 standard, (not shown)). The video signal at output 30 is received by optional secondary storage device 32.

The interactive television program guide or program guide client may run on set-top box 28, on television 36, on optional digital storage device 31 (if television 36 or optional digital storage device 31 has suitable processing circuitry and memory), or on a suitable analog or digital receiver connected to television 36. The interactive television program guide may also run cooperatively on both television 36 and set-top box 28. Interactive television application systems in which a cooperative interactive television program guide application runs on multiple devices are described, for example, in Ellis U.S. patent application Ser. No. 09/186,598, filed Nov. 5, 1998, which is hereby incorporated by reference herein in its entirety.

Secondary storage device 32 can be any suitable type of analog or digital program storage device or player (e.g., a videocassette recorder, a digital video disc (DVD) player, etc.). Program recording and other features may be controlled by set-top box 28 using control path 34. If secondary storage device 32 is a videocassette recorder, for example, a typical control path 34 involves the use of an infrared transmitter coupled to the infrared receiver in the videocassette recorder that normally accepts commands from a remote control such as remote control 40. Remote control 40 may be used to control set-top box 28, secondary storage device 32, and television 36.

If desired, the user may record programs, program guide data, or a combination thereof in digital form on optional digital storage device 31. Digital storage device 31 may be a writable optical storage device (such as a DVD player capable of handling recordable DVD discs), a magnetic storage device (such as a disk drive or digital tape), or any other digital storage device. Interactive television program guide systems that have digital storage devices are described, for example, in Hassell et al. U.S. patent application Ser. No. 09/157,256, filed Sep. 17, 1998, which is hereby incorporated by reference herein in its entirety.

Digital storage device 31 can be contained in set-top box 28 or it can be an external device connected to set-top box 28 via an output port and appropriate interface. Digital storage device 31 may, for example, be contained in local media server 29. If necessary, processing circuitry in set-top box 28 formats the received video, audio and data signals into a digital file format. Preferably, the file format is an open file format such as the Moving Pictures Expert Group (MPEG) MPEG-2 standard or the Moving Joint Photographic Experts Group (MJPEG) standard. The resulting data is streamed to digital storage device 31 via an appropriate bus (e.g., a bus using the Institute Electrical and Electronics Engineers (IEEE) 1394 standard), and is stored on digital storage device 31. In another suitable approach, an MPEG-2 data stream or series of files may be received from distribution equipment 21 and stored in digital storage device 31. For example, files from television distribution facility 16 for programs recorded by the user using remote media server 24 may be stored. Such digital files may be played back to the user when desired.

In typical program guide systems, secondary storage device 32 or digital storage device 31 are necessary to provide users with the ability to record programs. Such storage devices are unnecessary when practicing the current invention because users may record programs on remote media server 24. In practice, such storage devices may be omitted from user television equipment 22 with minimal or no effect on program guide functionality, while also tending to minimize the cost of user television equipment 22.

Television 36 receives video signals from secondary storage device 32 via communications path 38. The video signals on communications path 38 may either be generated by secondary storage device 32 when playing back a prerecorded storage medium (e.g., a videocassette or a recordable digital video disc), by digital storage device 31 when playing back a pre-recorded digital video (e.g., a video for a program that was recorded by the user at remote media server 24 or local media server 29), may be passed through from set-top box 28, may be provided directly to television 36 via set-top box 28 if secondary storage device 32 is not included in user television equipment 22, or may be received directly by television 36. During normal television viewing, the video signals provided to television 36 correspond to the desired channel to which the user has tuned with set-top box 28. Video signals may also be provided to television 36 by set-top box 28 when set-top box 28 is used to play back information stored on digital storage device 31, or when set-top box 28 is used to decode a digital video stream, or digital files transmitted from television distribution facility 16.

Set-top box 28 may have communications device 37 for communicating directly with program guide server 25, remote media server 24, or Internet service system 61 over communications path 20. Communications device 37 may also support communications between user television equipment 22 and local media server 29 via communications path 167 if desired. Communications path 167 may be any suitable link, such as a serial or parallel link, network link, an Internet link, DOCSIS link, radio link, infrared link or any other suitable wired or wireless digital or analog link.

Communications device 37 may be a modem (e.g., any suitable analog or digital standard, cellular, or cable modem), network interface card (e.g., an Ethernet card, token ring card, etc.), or other suitable communications device. Communications device 37 may also be a personal computer with an Internet connection such as with the arrangements shown in FIGS. 2c and 2d. Television 36 may also have such a suitable communications device if desired. In an alternative approach, user television equipment 22 may communicate with remote media server 24 or Internet service system 61 via distribution equipment 21 using a suitable return path or communications path 20.

The program guide may communicate with program guide server 25, remote media server 24, or Internet service system 61 over communications path 20 using any suitable network and transport layer protocols, if desired. A protocol stack may be used which includes, for example, Sequenced Packet Exchange/Internetwork Packet Exchange (SPX/IPX) layers, Transmission Control Protocol/Internet Protocol (TCP/IP) layers, Appletalk Transaction Protocol/Datagram Delivery Protocol (ATP/DDP) layers, or any other suitable network and transport layer protocols. If desired DOCSIS may also be used. These protocols may also be used for communicating with local media server 29, but in practice other suitable protocols may be used to communicate with server 29, such as the Jini networking protocol by Sun Microsystems.

Local media server 29 may be a device in the home of the user that is suitable for storing and playing back programs on demand. Local media server 29 may be, for example, a personal computer connected to set-top box 28 via an Ethernet connection, standard serial or parallel port, universal serial bus, an IEEE 1394 bus, etc.

Local media server 29 may have processing circuitry 33, memory 35, and storage 37. Processing circuitry 33 may include any suitable processor, such as a microprocessor or group of microprocessors, and other processing circuitry such as caching circuitry, direct memory access (DMA) circuitry, and input/output (I/O) circuitry. Processing circuitry 33 may also include circuitry suitable for recording programs on demand. Processing circuitry 33 may also include circuitry suitable for decoding program and data files stored on storage 37 and converting them to suitable video signals for playback by user television equipment 22. If programming is stored as MPEG-2 files, processing circuitry 33 may include, for example, an MPEG-2 decoder for decoding the files and converting them to National Television Standards Committee (NTSC) Video.

Memory 35 may be any memory suitable for caching and storing computer code for performing the functions of processing circuitry 33. Memory 35 may also be used to cache video programs or portions of video programs for processing circuitry 33 while the programs are being played for users. Storage 37 may be any storage suitable for recording programming files and associated program guide data. Storage 37 may, for example, be a suitable hard disk having a capacity measured in gigabytes or more. User directories, such as user directory 59 of FIG. 4, may be maintained by processing circuitry 33 and stored in memory 35, storage 37, or both.

Figure 8:
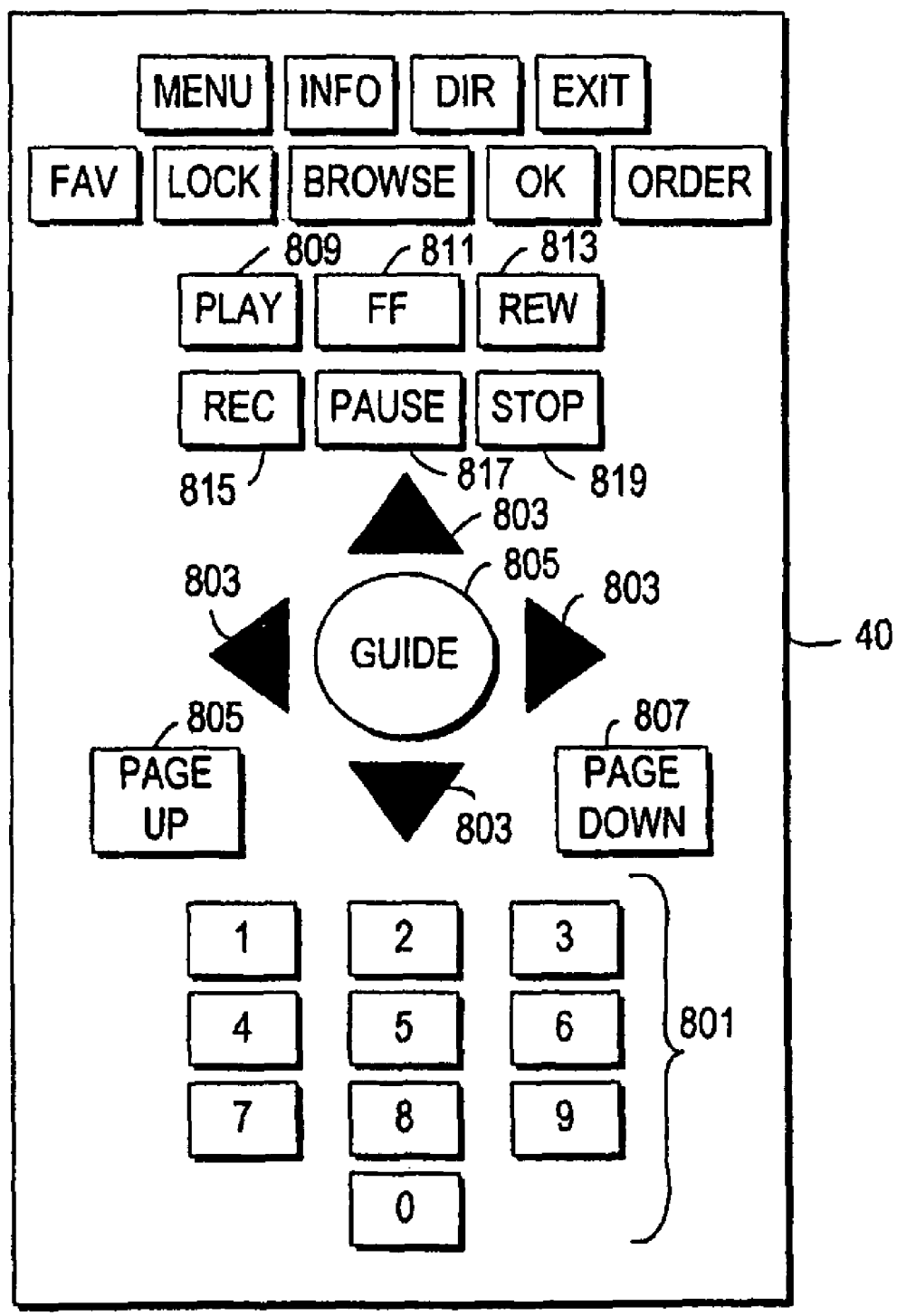
FIG. 8 shows an illustrative arrangement for the remote control of FIG. 7 in accordance with the present invention.

An illustrative arrangement for remote control 40 is shown in FIG. 8. Remote control 40 may have any suitable buttons or keys for providing a user with an opportunity to change channels, navigate within the program guide, access program guide functions, control a storage device or media server, or any other suitable keys. More specifically, the user may depress number keys 801 to enter channel numbers, parental control codes, purchase codes, etc. The user may depress "Guide" key 805 to, for example, access the program guide, and depress arrow keys 803, page up key 805, and page down key 807 to navigate within the guide. The user may depress the "PLAY" key 809, "FF" key 811, "REW" key 813, "REC" key 815, "STOP" key 819 and "PAUSE" key 817 to play, fast-forward, rewind, record, stop and pause programs on a media server or stage device.

Figure 9:
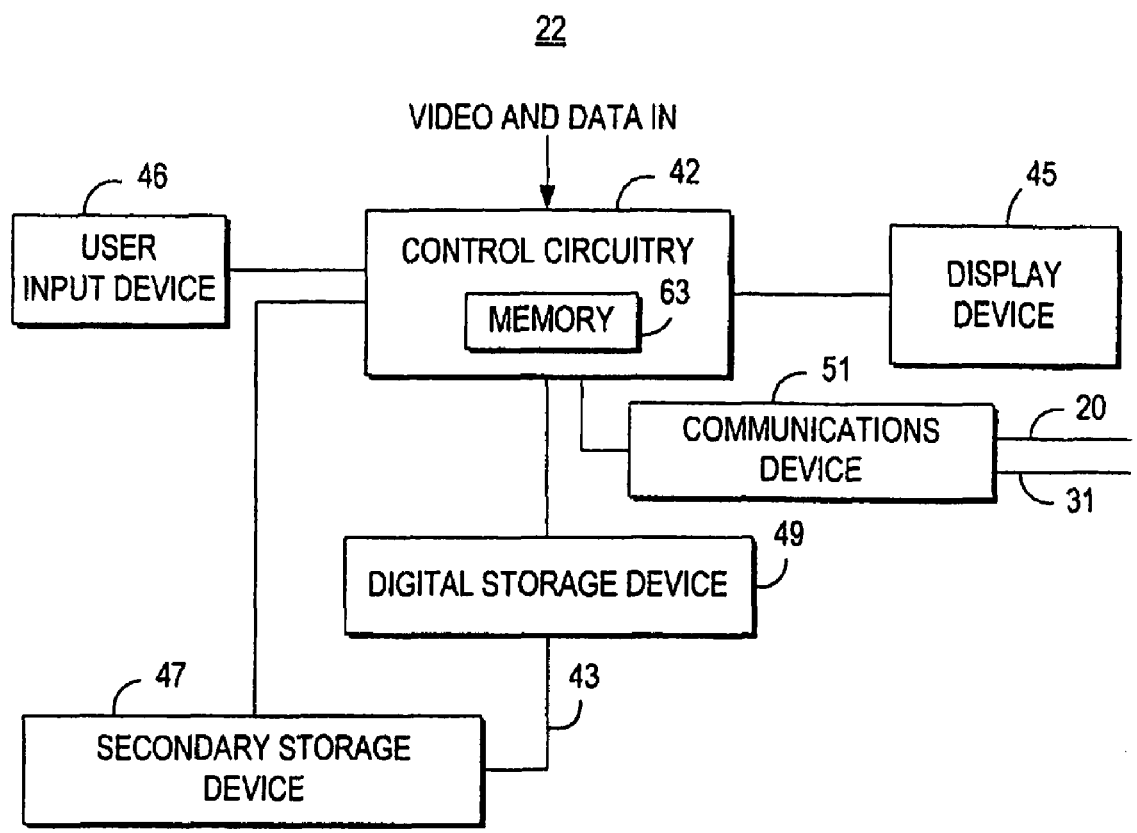
FIG. 9 is a generalized schematic block diagram of portions of the illustrative user television equipment of FIG. 7 in accordance with the present invention.

A more generalized embodiment of user television equipment 22 of FIG. 7 is shown in FIG. 9. As shown in FIG. 9, program guide data from program guide distribution facility 16 (FIG. 1) is received by control circuitry 42 of user television equipment 22. The functions of control circuitry 42 may be provided using the set-top box arrangement of FIG. 7. Alternatively, these functions may be integrated into an advanced television receiver (e.g., a digital television receiver or high definition television (HDTV) receiver), personal computer television (PC/TV), or any other suitable arrangement. If desired, a combination of such arrangements may be used.

User television equipment 22 of FIG. 9 may have secondary storage device 47, digital storage device 49, or any suitable combination thereof for recording programming. Secondary storage device 47 and digital storage device 49 may be omitted if desired. Secondary storage device 47 can be any suitable type of analog or digital program storage device (e.g., a videocassette recorder, a digital versatile disc (DVD), etc.). Program recording and other features may be controlled by control circuitry 42. Digital storage device 49 may be, for example, a writable optical storage device (such as a DVD player capable of handling recordable DVD discs), a magnetic storage device (such as a disk drive or digital tape), or any other digital storage device.

Memory 63 may be any memory or other storage device, such as a random access memory (RAM), read only memory (ROM), flash memory, a hard disk drive, a combination of such devices, etc., that is suitable for storing program guide application instructions and program guide data for use by control circuitry 42. Memory 63 may also be used for caching videos. The program guide may also store a copy of the user directory 59 maintained by remote media server 24 in memory 63. The program guide may, for example, receive copies of user directory 59 as part of the program guide data stream. In one suitable approach, user directory 59 may be automatically downloaded to the program guide whenever directory 59 is entered, such as when the user records a program, deletes a program, or remote media server 24 automatically deletes a program because it has been stored for too long. Alternatively, the program guide may obtain copies of user directory 59 from program guide server 25 or remote media server 24. With another suitable approach, the program guide may maintain user directory 59 in memory 63. The program guide may include pointers to media directories 61 in retrieval requests transmitted to remote media server 24.

User television equipment 22 of FIG. 9 may have communications device 51 for supporting communications between user television equipment 22 and remote media server 24 or Internet service system 61 via communications path 20. Communications device 51 may also support communications between user television equipment 22 and local media server 29. Communications device 51 may be a modem (e.g., any suitable analog or digital standard, cellular, or cable modem), network interface card (e.g., an Ethernet card, Token ring card, etc.), or other suitable communications device.

The user controls the operation of user television equipment 22 with user input device 46. User input device 46 may be a pointing device, wireless remote control, keyboard, touch-pad, voice recognition system, pen-based computer device or any other suitable user input device. To watch television, the user instructs control circuitry 42 to display a desired television channel on display device 45. To access the functions of the program guide, the user instructs the program guide implemented on interactive program guide television equipment 17 to generate a main menu or other desired program guide display screen for display on display device 45.

When a user indicates a desire to access the interactive television program guide (e.g., by using a "MENU" key on remote control 40), the program guide generates an appropriate program guide display screen for display on display device 45. A main menu screen such as illustrative main menu screen 100 of FIG. 10 may be generated that provides the user with access to various program guide functions. Main menu screens may contain various advertisements, logos, etc.

Figure 10:
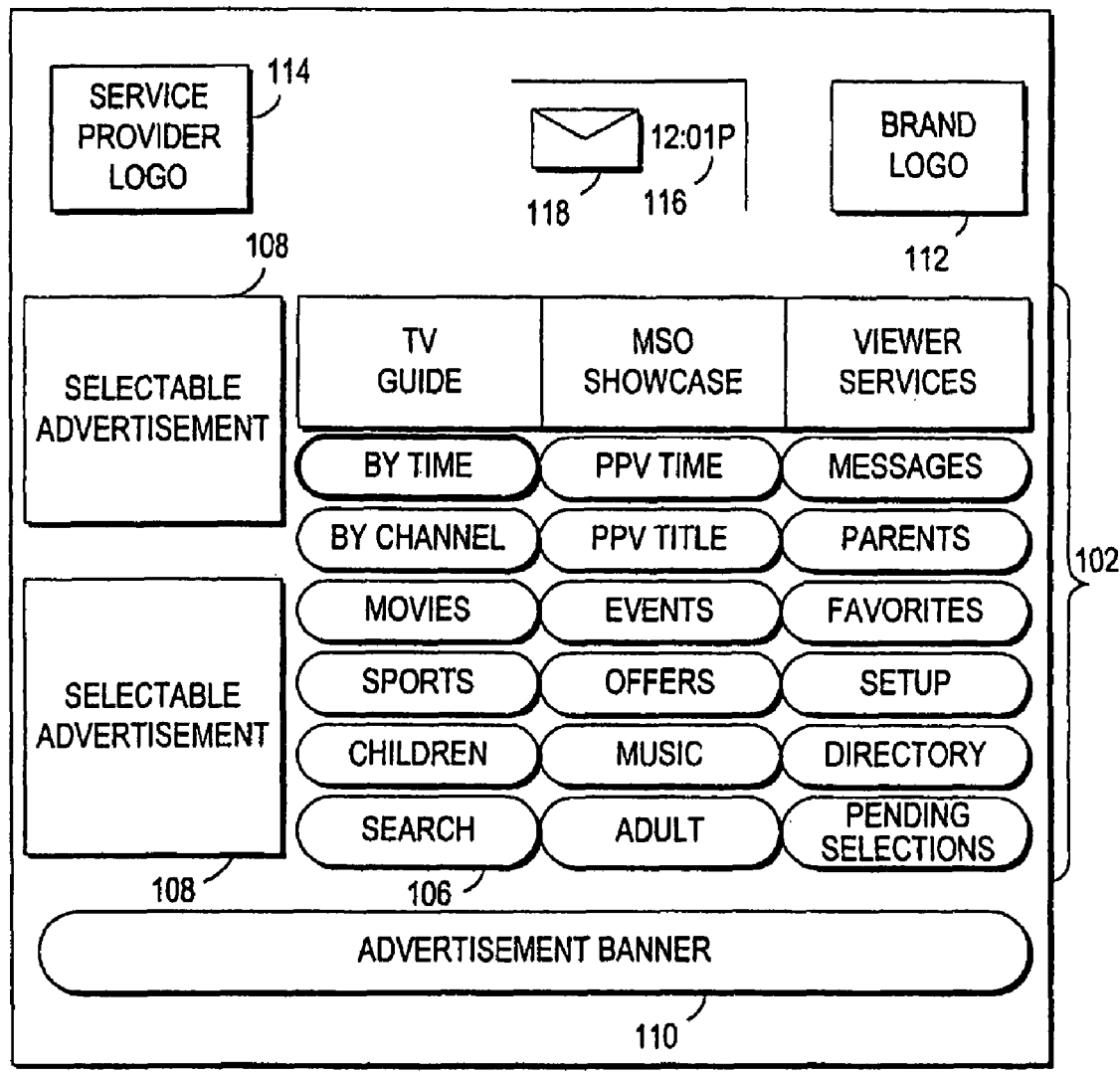
FIG. 10 shows an illustrative main menu screen that may be displayed by the program guide to provide users with access to various program guide functions in accordance with the present invention.

Illustrative main menu screen 100 of FIG. 10 includes a menu 102 of selectable program guide features 106. If desired, selectable features 106 may be organized according to feature type. In menu 102, for example, program guide options 106 have been organized into three columns. The column labeled "TV GUIDE" is for listings-related features, the column labeled "MSO SHOWCASE" is for multiple system operator (MSO) related features, and the column labeled "VIEWER SERVICES" is for viewer-related features. The interactive television program guide may generate a display screen for a particular program guide feature when the user selects that feature from menu 102.

Main menu screen 100 may include one or more selectable advertisements 108. Selectable advertisements 108 may, for example, include text and graphics advertising for pay-per-view programs. When the user selects a selectable advertisement 108, the program guide may display information (e.g., pay-per-view information) or take other actions related to the content of the advertisement. Pure text advertisements may be presented, if desired, as illustrated by selectable advertisement banner 110.

Main menu screen 100 may also include other screen elements. The brand of the program guide product may be indicated, for example, using a product brand logo graphic such as product brand logo graphic 112. The identity of the television service provider may be presented, for example, using a service provider logo graphic such as service provider logo graphic 114. The current time may be displayed in clock display region 116. In addition, a suitable indicator such as indicator graphic 118 may be used to indicate to the user that mail from a cable operator is waiting for the user if the program guide supports messaging functions.

One function of the interactive television program guide may be to provide the user with the opportunity to view television program listings. A user may indicate a desire to view program listings by, for example, positioning highlight region 120 over a desired program guide option related to program listings (e.g., the "movies" option). The program guide may also present program listings when the user presses a suitable key (e.g., a "GUIDE" key) on remote control 40. When the user indicates a desire to view television program listings, the program guide may obtain program listings data from a data stream provided by program guide distribution facility 16, from server 25, or from memory 63 and may generate an appropriate program listings screen for display on monitor 45. A program listings screen may contain one or more groups or lists of program listings organized according to one or more organization criteria (e.g., by program category).

The program listings screen may be fully or partially overlaid over a program being viewed by the user. Listings may also be overlaid over or otherwise placed on the same screen as the program in a "browse" mode. The program guide may, for example, provide the user with the opportunity to view listings by time, by channel, according to a number of categories (e.g., movies, sports, children, etc.), or may allow the user to search for a listing by title. Program listings may be displayed using any suitable list, table, grid, or other suitable display arrangement. If desired, program listings display screens may include selectable advertisements, product brand logo graphics, service provider brand graphics, clocks, or any other suitable indicator or graphic.

Figure 11A:
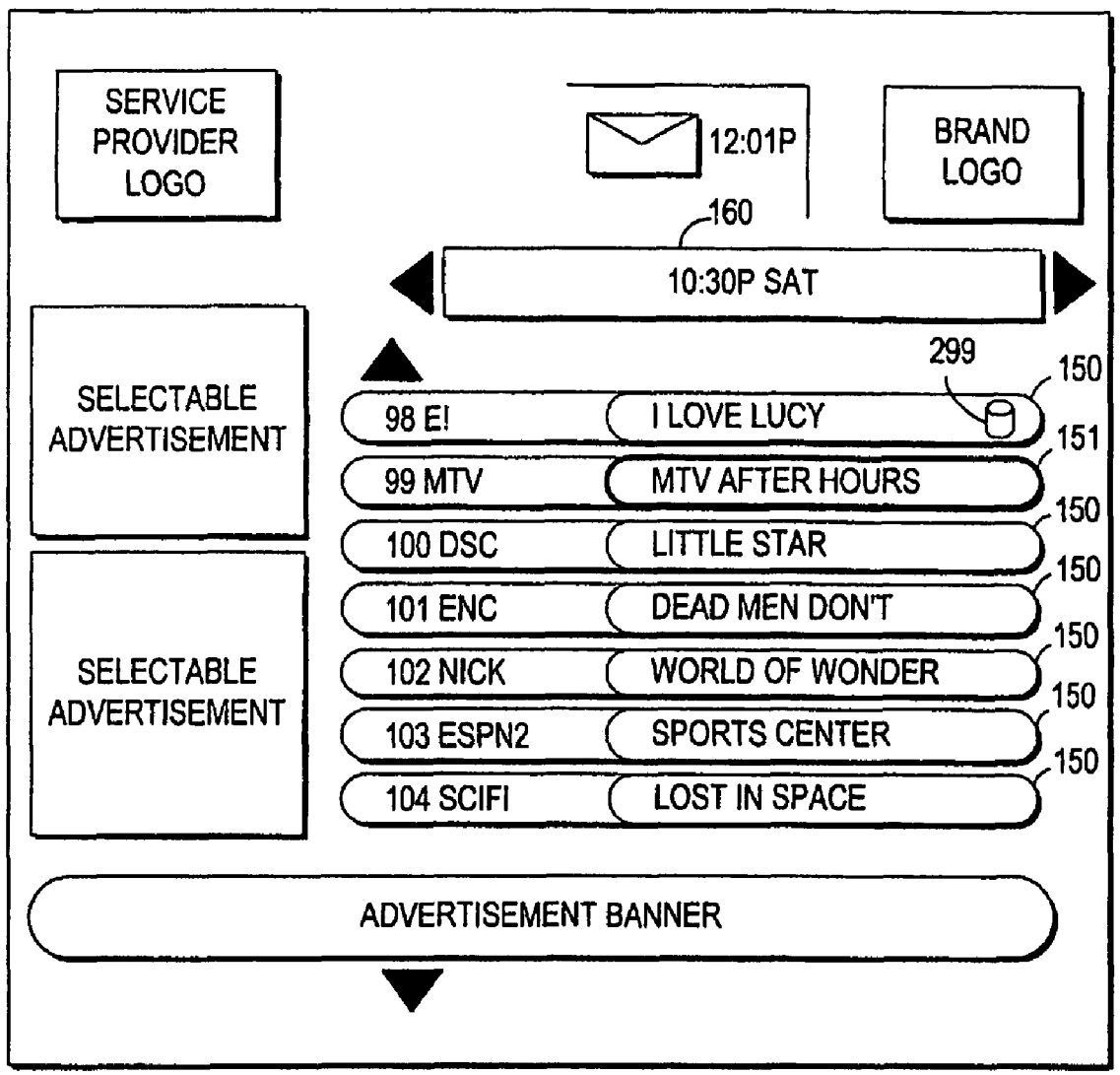
FIG. 11a shows an illustrative program listings screen in which program listings are displayed by time in accordance with the present invention.
Figure 11B:
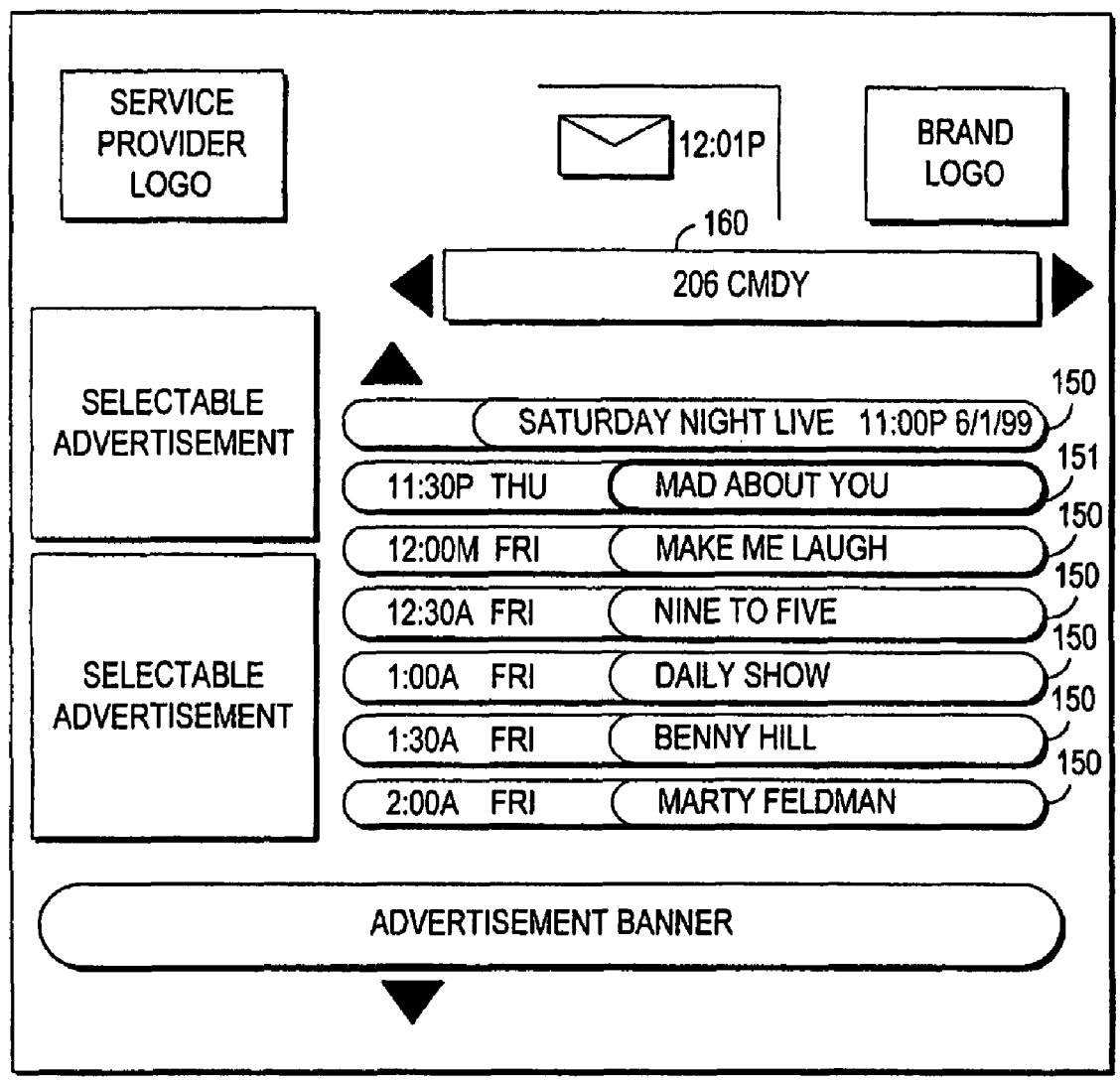
FIG. 11b shows an illustrative program listings screen in which program listings are displayed by channel in accordance with the present invention.
Figure 11C:
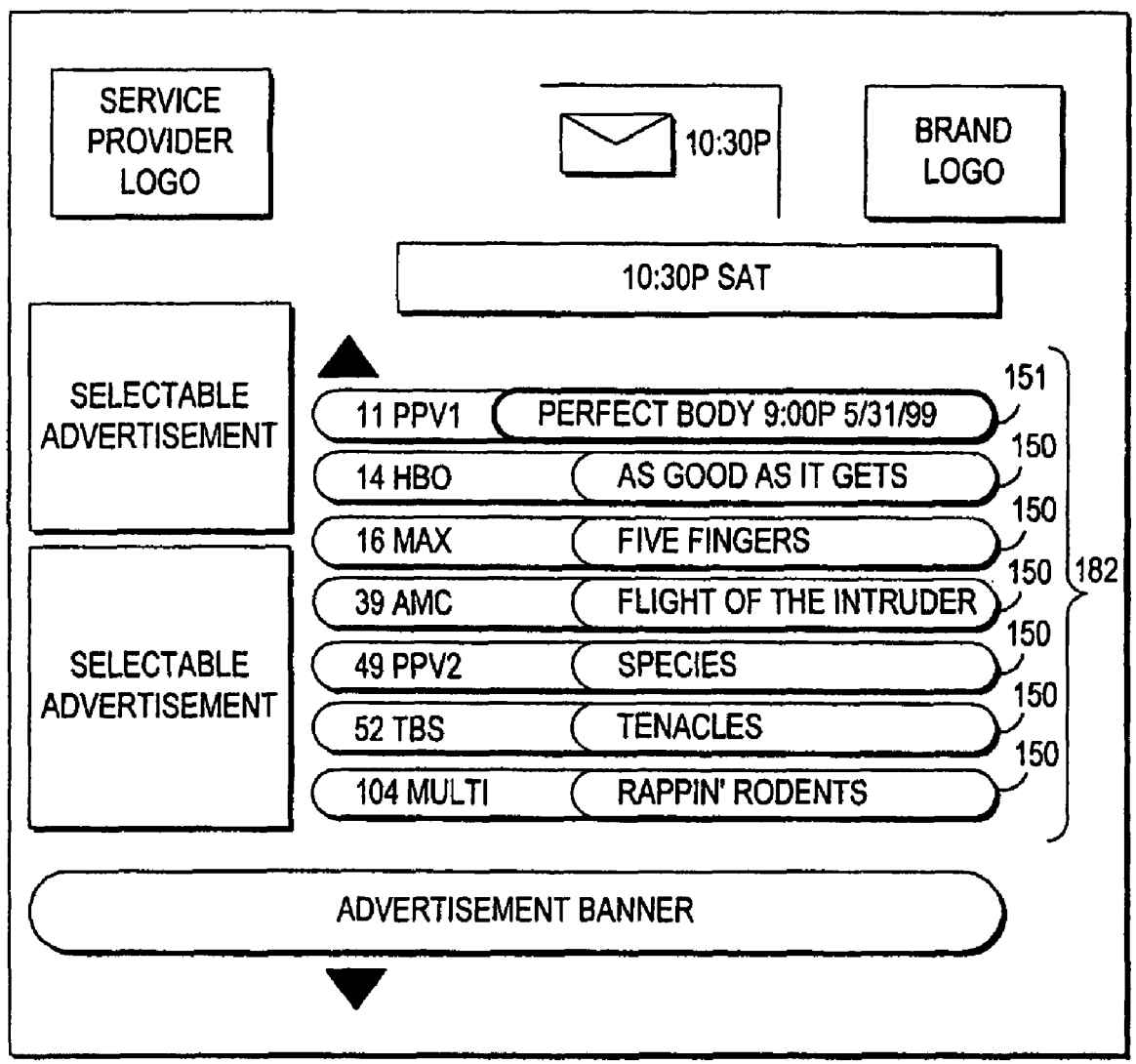
FIG. 11c shows an illustrative program listings screen in which program listings are displayed by category in accordance with the present invention.

A user may indicate a desire to view program listings by time, channel, or category by, for example, selecting a selectable feature from menu 102. In response, the program guide may display program listings in a suitable listings display screen. FIGS. 11a, 11b, and 11c illustrate the display of program listings by time, by channel, and by category, respectively. The program listings display screens 130, 135, and 140 of FIGS. 11a, 11b, and 11c may include highlight region 151, which highlights the current program listing 150. The user may position highlight region 151 by entering appropriate commands with user input device 46. For example, if user input device 46 has a keypad, the user can position highlight region 151 using up, down, left, and right arrow keys. Remote program listings may also be panned left, right, up, and down by positioning highlight region 151 using the arrow keys on remote control 40. Alternatively, a touch sensitive screen, trackball, voice recognition device, pen-based computer device, or other suitable device may be used to move highlight region 151 or to select program listings without the use of highlight region 151. In still another approach, the user may speak a television program listing into a voice request recognition system. These methods of selecting program listings are merely illustrative. Any other suitable approach for selecting program listings or other items in the program guide may be used if desired.

The program guide may provide the user with an opportunity to view program listings for other times or channels. The user may indicate a desire to access listings for other times or channels by, for example, using left and right arrow keys to change time slots (when program listings are presented by time as shown in FIG. 11a), or to change channels (when program listings are presented by channel as shown in FIG. 11b). In response to such an indication, the program guide may, for example, scroll or page the program listings to display additional program listings.

The program listings screens of FIGS. 11a, 11b and 11c may also include listings for programs recorded by, or selected for recording by, remote media server 24 or local media server 29. Recorded programs may be displayed, for example, at the beginning of the listings. Programs to be recorded may be displayed in their normal position within a list and may, if desired, have an icon indicating them as to be recorded. FIG. 11a shows, for example, a listing for a scheduled recording of "I Love Lucy" at 10:30 PM on Jun. 5, 1999. The listing has icon 299 that indicates the listing is for a program that is to be recorded. FIG. 11b shows, for example, a comedy program listing for a recorded copy of the comedy "Saturday Night Live" that was recorded at 11:00 on Jun. 1, 1999. FIG. 11c shows, for example, a movie listing for a recorded copy of the movie "Perfect Body," recorded at 9:00 PM on May 31, 1999.

FIGS. 11a, 11b and 11c show listings for recorded programs and programs scheduled for recording as having a slightly different listing display format than the listings for regular programs. For example, recorded programs have their actual or anticipated record dates displayed. If desired, any other suitable approach may be used to indicate that some listings are for recorded programs or programs scheduled for recording. Such listings may have a different color, a different font, a shading, an icon or any other effect that indicates they are not regular program listings. Alternately, such listings may be omitted from program listings screens.

The program guide may also provide a user with an opportunity to view pay-per-view program listings. A user may, for example, indicate a desire to view pay-per-view program listings by selecting the "PPV Time" on-screen feature of main menu 102 of FIG. 10. In response, the program guide may display pay-per-view program listings by time, as is illustrated by pay-per-view listings by time screens 203 of FIG. 12a. As with other listings screens, a user may scroll up and down to view pay-per-view program listings for additional channels. A user may view program listings for additional time slots by arrowing right. A user may also, for example, select selectable advertisements by arrowing to the left.

The program guide may also provide a user with an opportunity to view pay-per-view program listings by title. A user may indicate a desire to view pay-per-view program listings by title by, for example, selecting a "PPV Title" selectable feature from main menu 102 of FIG. 10. In response, the program guide may display pay-per-view program listings by title as shown, for example, in pay-per-view program listings by title screen 211 of FIG. 12b. The program guide may provide a user with an opportunity to highlight a selectable advertisement by, for example, arrowing left.

Figure 13A:
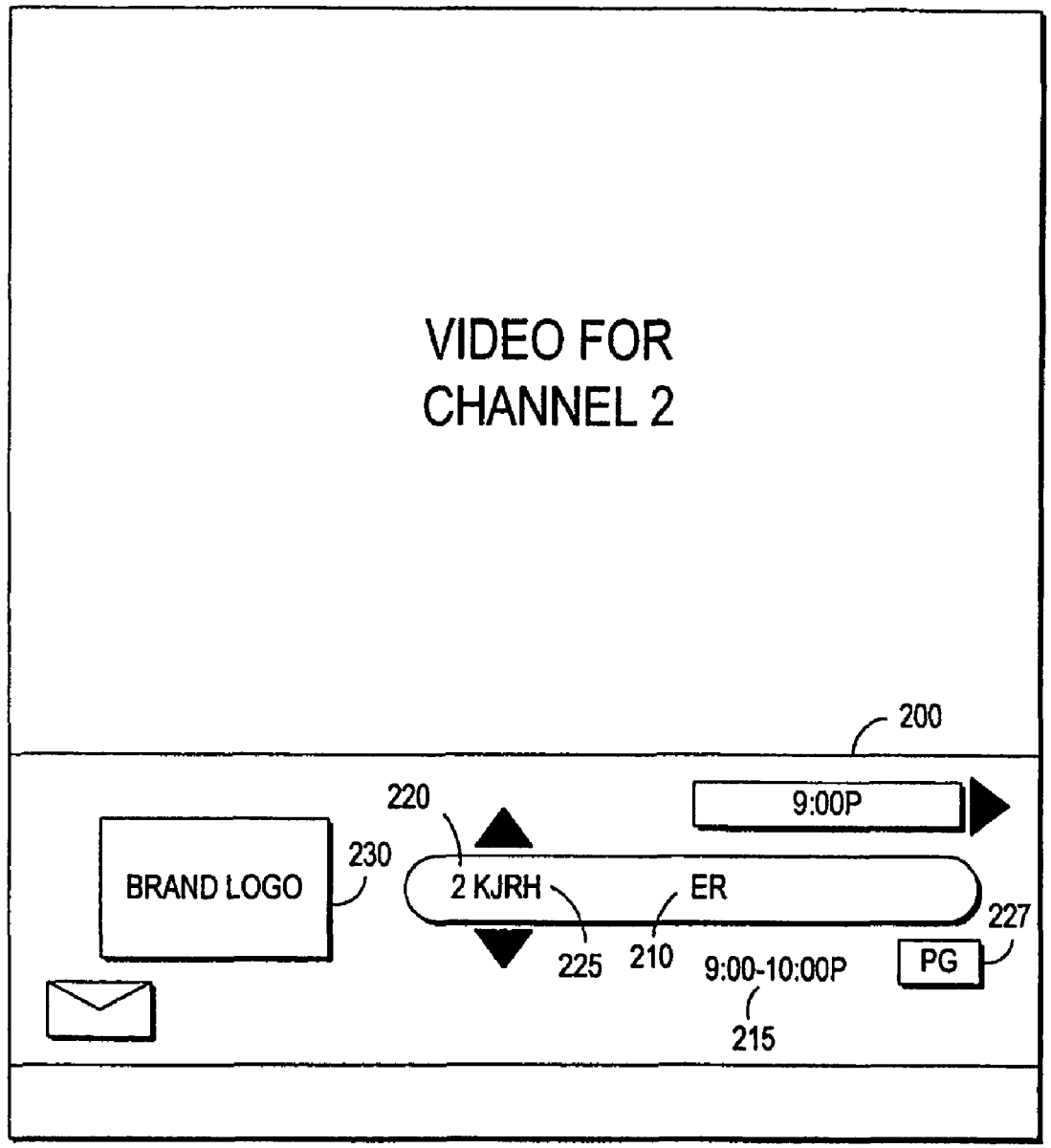
FIG. 13a shows an illustrative FLIP display that may be displayed by the program guide when a user changes channels in accordance with the present invention.

The interactive program guide may allow the user to view program listings while watching television programming by, for example, overlaying a "FLIP" or "BROWSE" display region over a television program. FIG. 13a shows an illustrative FLIP display 200 that the program guide may display whenever the user changes television channels. The FLIP display may contain information associated with the current program, such as the program title 210, running time 215, the current channel number 216, and the current channel's call letters 225. The FLIP display may also include a number of graphics, such as brand logo 230, a sponsorship graphic, a channel logo graphic, mail indicator, selectable advertisement or any other suitable graphic. The program's rating may also be displayed. If desired, brand logo 230 may be replaced with or used together with a selectable information icon. The user may, for example, press an "INFO" key on remote control 40 to obtain additional program information for the program currently displayed in FLIP display 200.

FLIP display 200 may also include rating indicator 227 for indicating the rating of the current program. If the program guide provides a parental control feature, the rating of the program on each new channel the user tunes to may be examined by the program guide to determine whether the program meets parental control settings that were previously established by the user. If the program rating is not acceptable, the program guide may, for example, display only the FLIP banner without the program video and prompt for a parental control code.

Figure 13B:
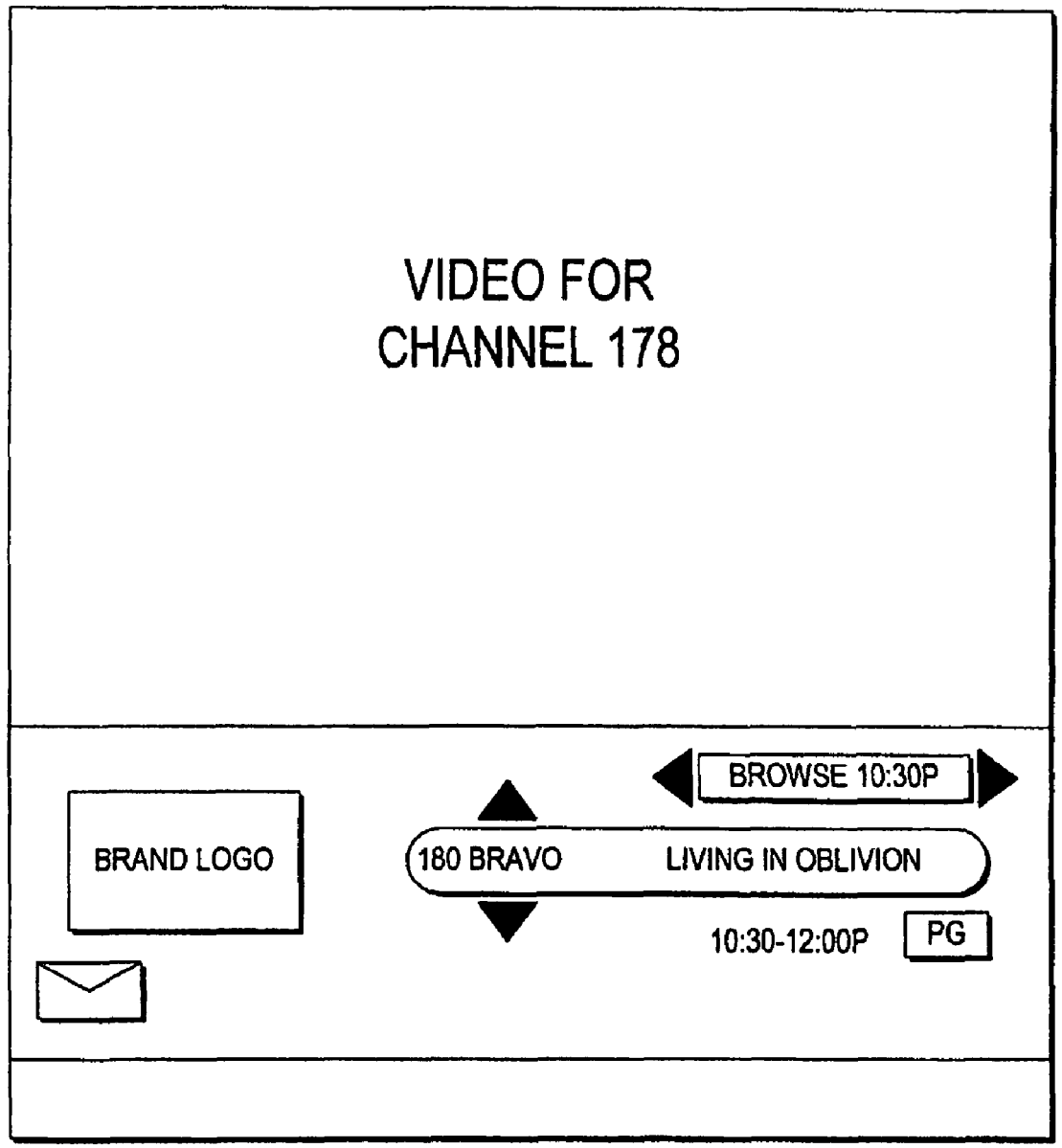
FIG. 13b shows an illustrative BROWSE display that the program guide may display when a user indicates a desire to browse through program listings for channels other than the one that a user is watching in accordance with the present invention.

FIG. 13b shows an illustrative "BROWSE" overlay or display that the program guide may display when the user indicates a desire to browse through program listings for a given time slot (e.g., by means of a "browse" key on remote control 40). The user may browse through program listings by, for example, using remote control arrow keys. Unlike the FLIP display, the BROWSE display allows the user to continue to watch a program on a particular channel (e.g., channel 178) while browsing for information on programs that are playing on other channels or at other times.

The FLIP and BROWSE overlays of FIGS. 13a and 13b have been shown as including a brand logo displayed at the left of the overlay. The logo may also, for example, promote different sponsors as the user browses program listings or flips between channels. The logos may change within the same overlay or banner if the user displays the overlay or banner for a predefined time. The logo may, for example, automatically rotate through a list of logo advertisements, returning to the first advertisement after each advertisement in the list has been displayed. The brand logo may also be replaced by a text based advertisement.

In addition to providing the user with the opportunity to access television programming and program guide data in these and other ways, the program guide may provide the user with an opportunity to record programs on demand at remote media server 24 or local media server 29, to view listings or directories of the programs that have been recorded or selected for recording, and to play videos and associated program guide data on demand from remote media server 24 or local media server 29. The program guide may also provide a user with an opportunity to record series of programs or other program groupings (e.g., pay-per-view packages). Program guide systems that provide users with an opportunity to record program series are described, for example, in concurrently filed Knudson et al. U.S. patent application Ser. No. 09/330,792, which is hereby incorporated by reference herein in its entirety. Users may indicate a desire to record a program or group of programs on demand by, for example, pressing a "RECORD" key on remote control 40 while watching a program or after highlighting its listing.

Figure 14A:
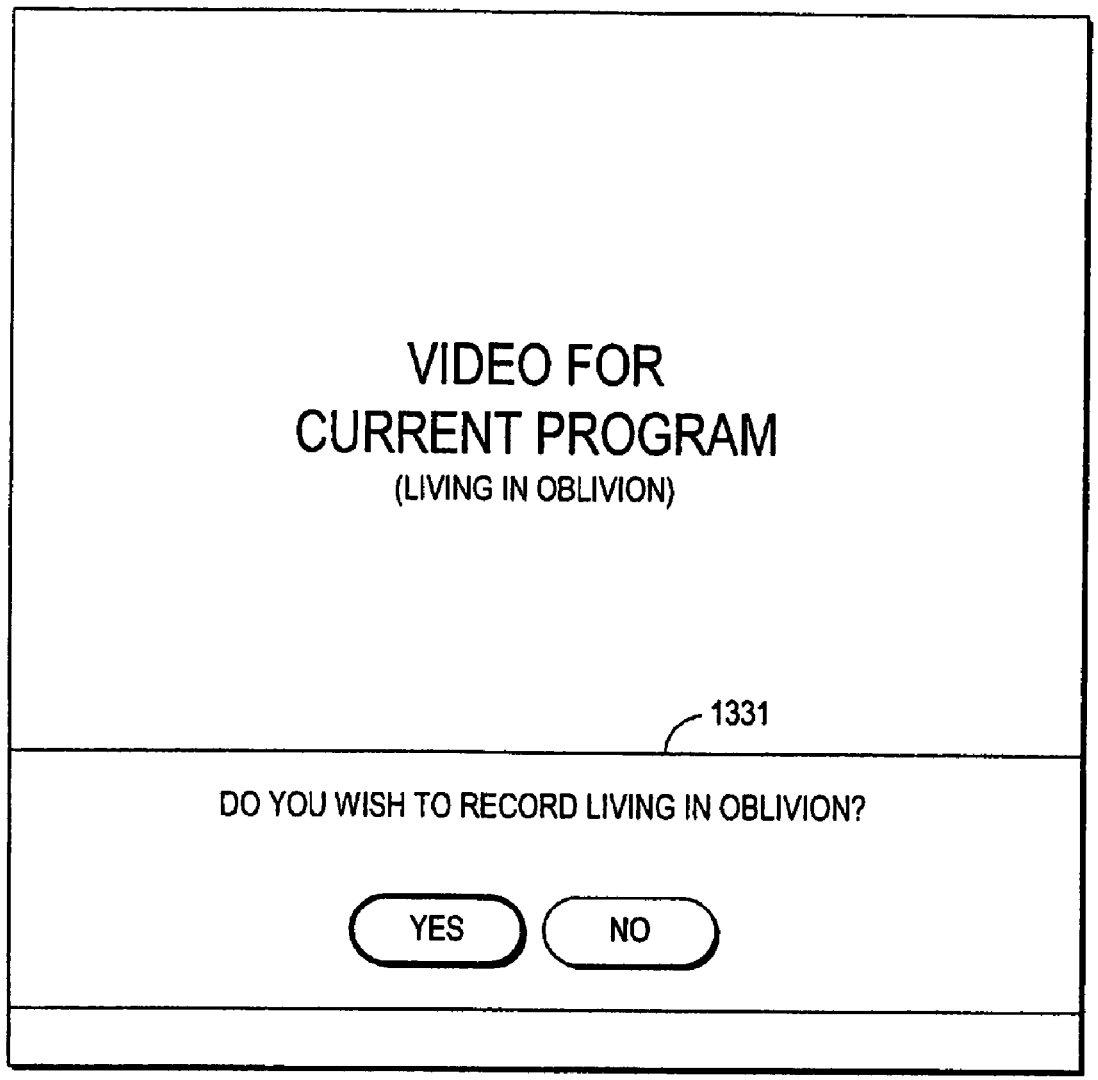
FIG. 14a shows an illustrative record overlay that may be displayed by the program guide when a user indicates a desire to record the program in accordance with the present invention.
Figure 14B:
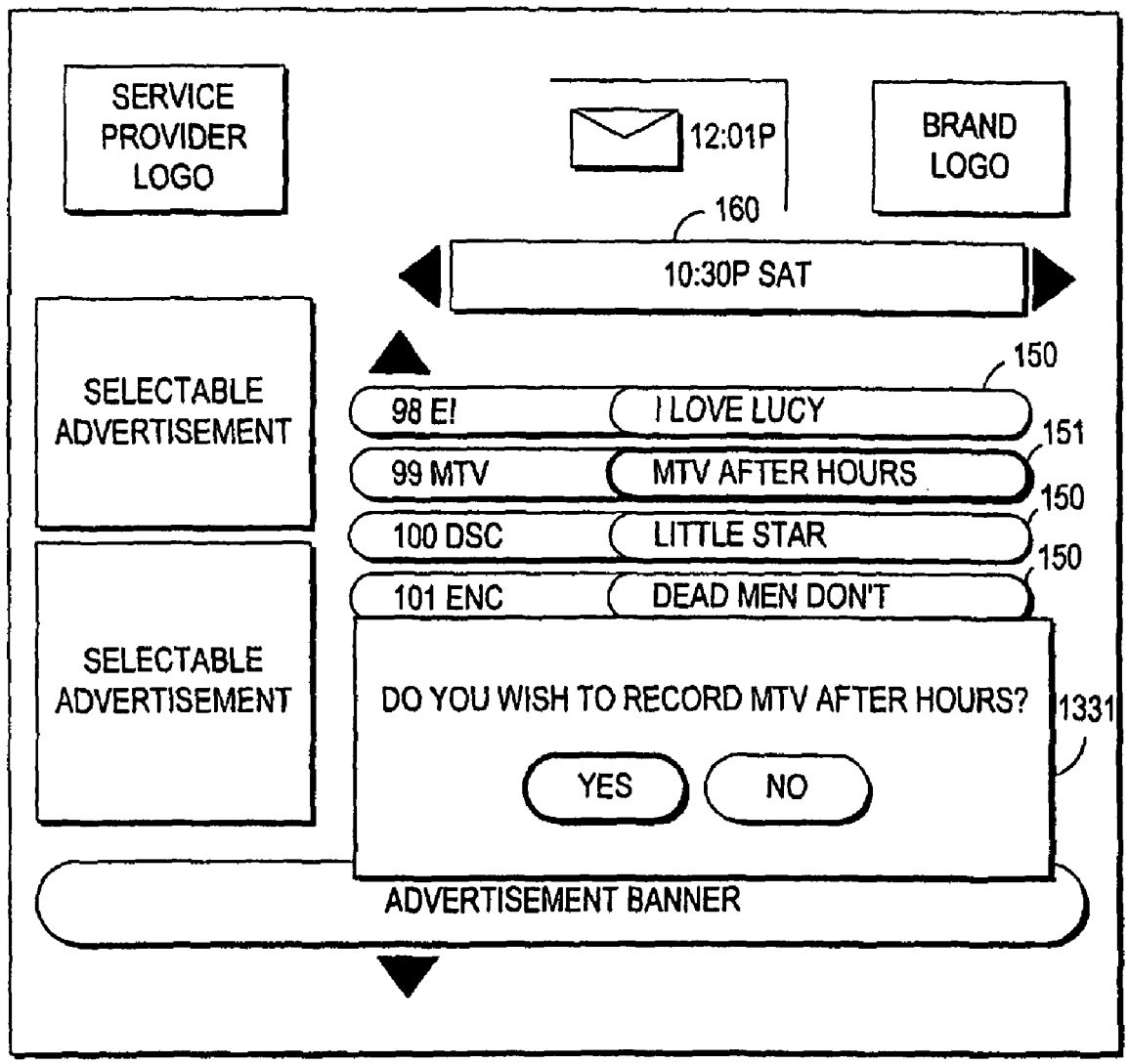
FIG. 14b shows an illustrative record overlay that may be displayed by the program guide while a user is in a program guide display screen. The overlay may be displayed when a user indicates a desire to record a program.

FIGS. 14a and 14b show illustrative overlays 1331 that may be displayed by the program guide when a user indicates a desire to record a program on remote media server 24 or local media server 29. Overlay 1331 may be displayed when, for example, a user indicates a desire to record the program that the user is watching, as shown in FIG. 14a. Alternatively, overlay 1331 may be overlaid on a program listings display screen when, for example, a user highlights a listing and indicates a desire to record the listed program (e.g., by pressing a "RECORD" key on remote control 40), as shown in FIG. 14b. Overlay 1331 may prompt the user to confirm the record request by, for example, selecting "Yes". These ways of providing a user with the opportunity to record a program are only illustrative and any other suitable approach may be used.

Figure 14C:
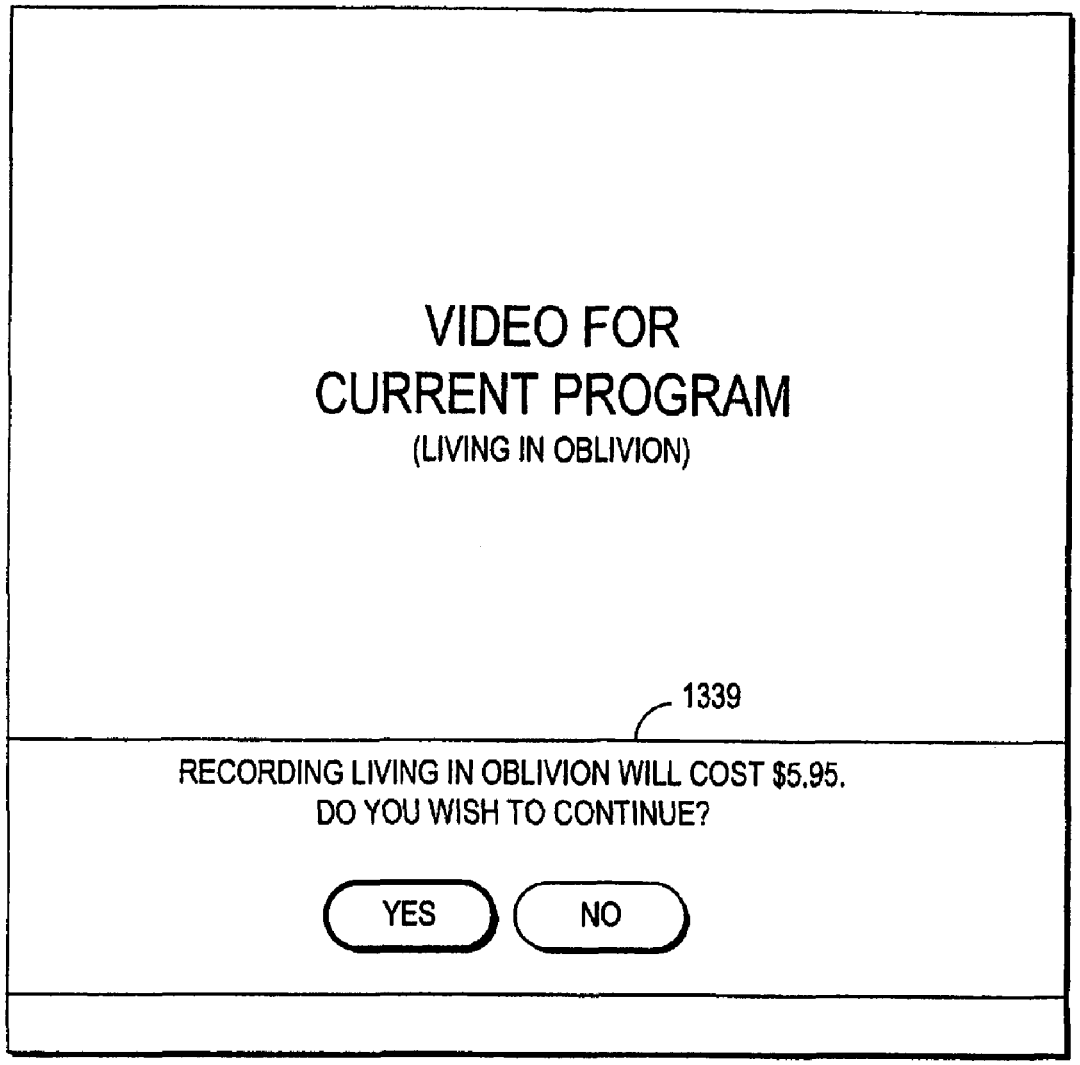
FIGS. 14c and 14d show illustrative record overlays that indicate a charge for recording a program and that provide a user with an opportunity to confirm the record.
Figure 14D:
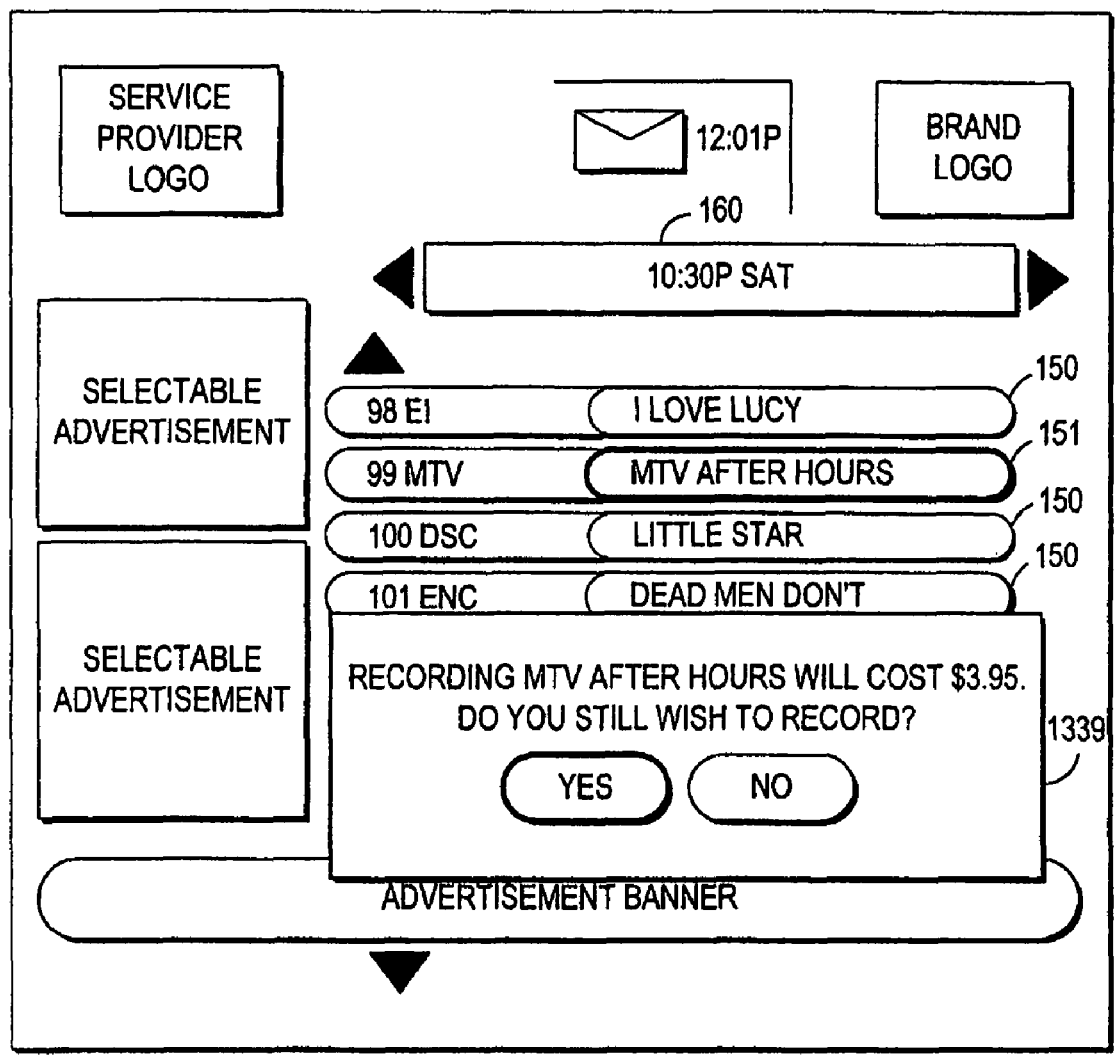

FIGS. 14c and 14d show additional illustrative overlays of 1339 that may, for example, replace overlays 1331 of FIGS. 14a and 14b. Alternatively, the program guide may display overlay 1339 when the user selects "Yes" from within overlay 1331 of FIGS. 13a and 13b. Overlay 1339 indicates to the user the charge for recording the selected program on remote media server 24. Overlay 1339 also provides the user with an opportunity to confirm or cancel the record.

The charge displayed in overlay 1339 may be based on any suitable user billing scheme. Users may be charged, for example, on a per-record basis, based on how long a program is, or may be charged a flat subscriber rate for unlimited recording within a period (e.g. one per month). Program guide distribution equipment 16 may provide the charge and other suitable program guide data (e.g., the title, airtime, etc.) to billing system 199. Billing system 199 may generate a bill that is sent to the user, or may automatically debit the user's account.

Figure 14E:
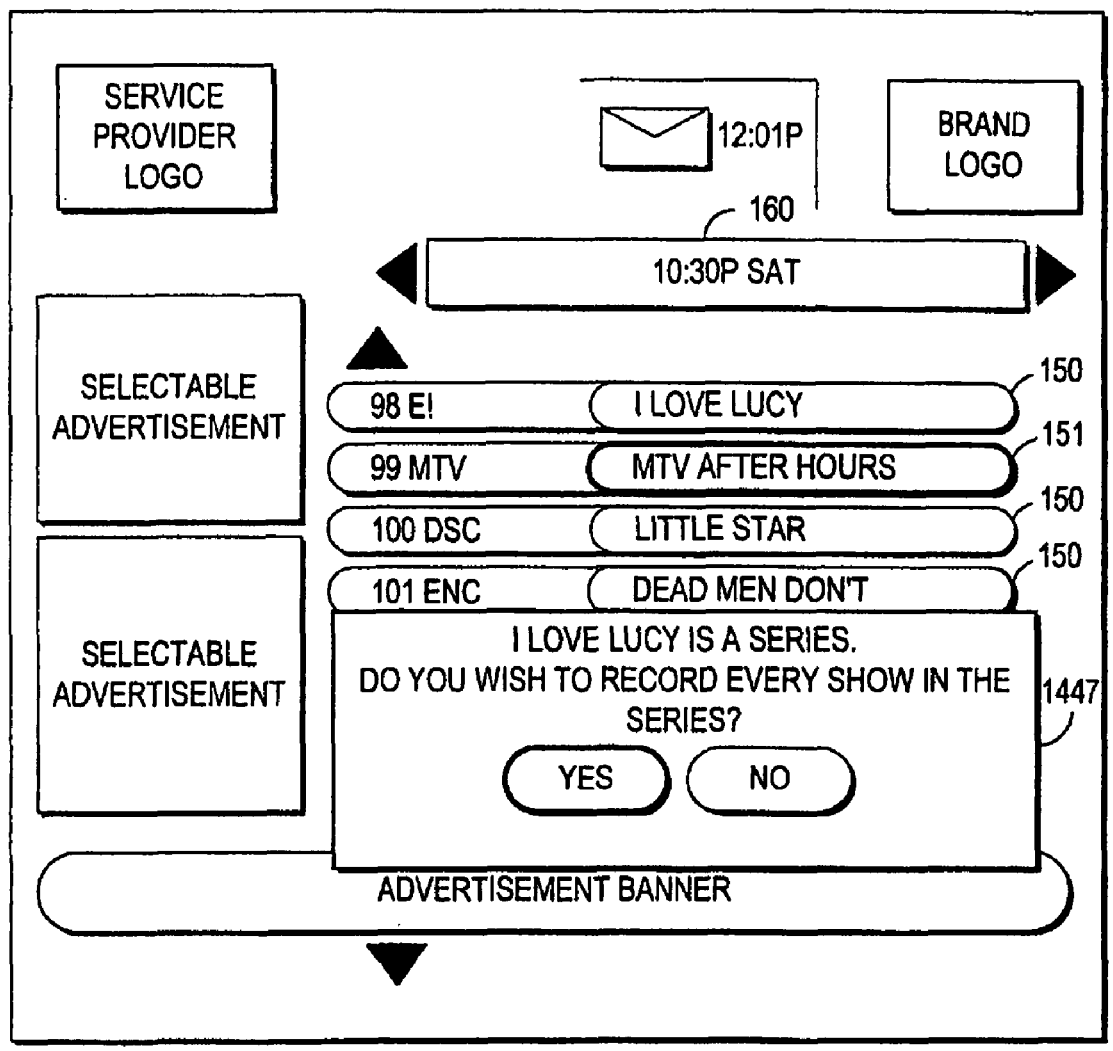
FIG. 14e shows an illustrative overlay that the program guide may display when a user indicates a desire to record a program that is part of a program grouping.

FIG. 14e shows an illustrative overlay 1339 that the program guide may display when, for example, a user selects a program that is part of a program grouping. Overlay 1447 may indicate to the user that a program is part of a program grouping, in this example a series, and prompt the user to confirm whether the user wishes to record all programs in the grouping. If the user selects "Yes," remote media server 24 or local media server 29 may record all programs in the grouping. If the user selects "No," the program guide may display overlay 1331 of FIG. 14a, 14b, 14c, or 14d to prompt the user to confirm recording only that showing.

Figure 15A:
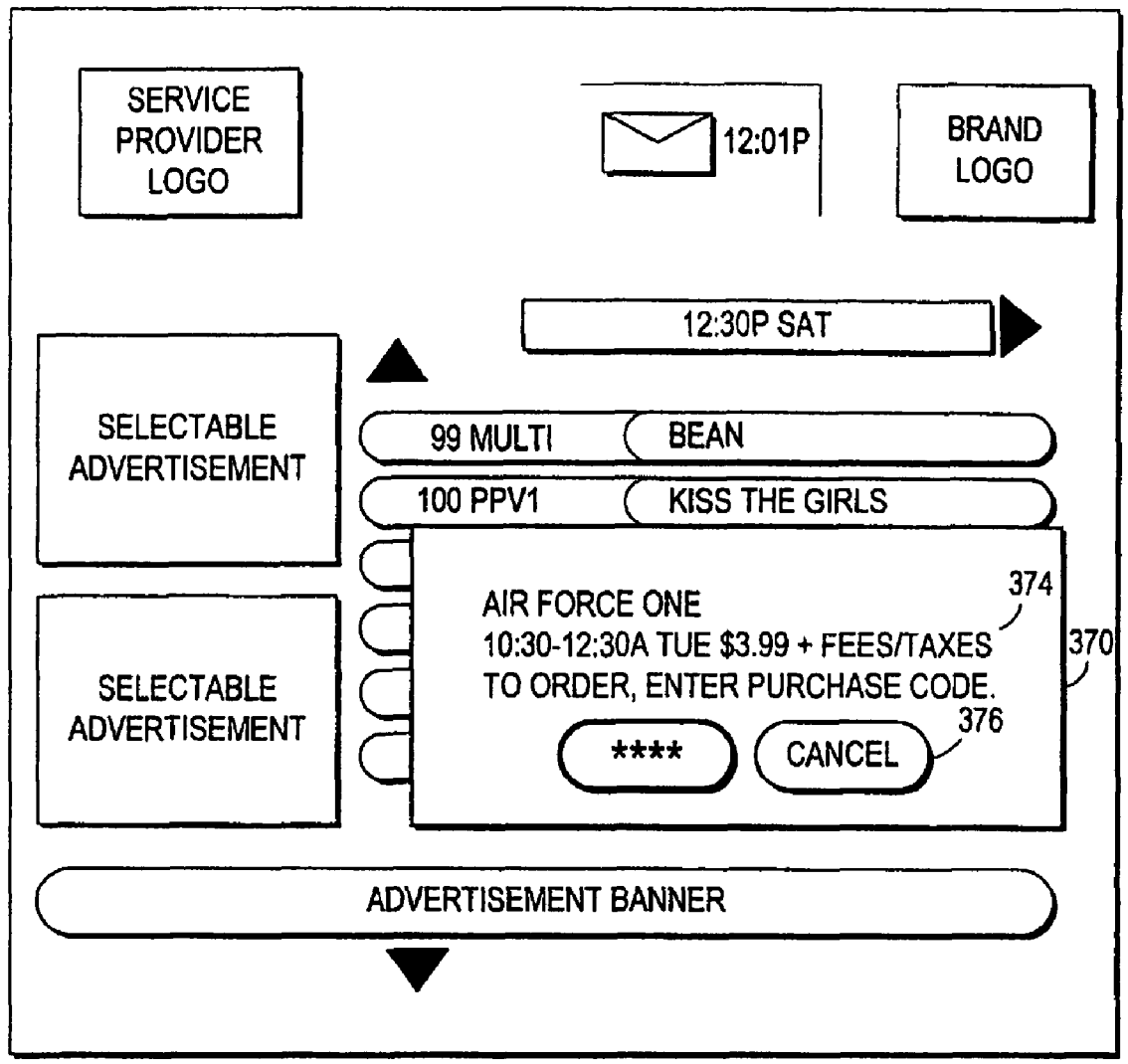
FIG. 15a shows an illustrative pay-per-view ordering overlay.
Figure 15B:
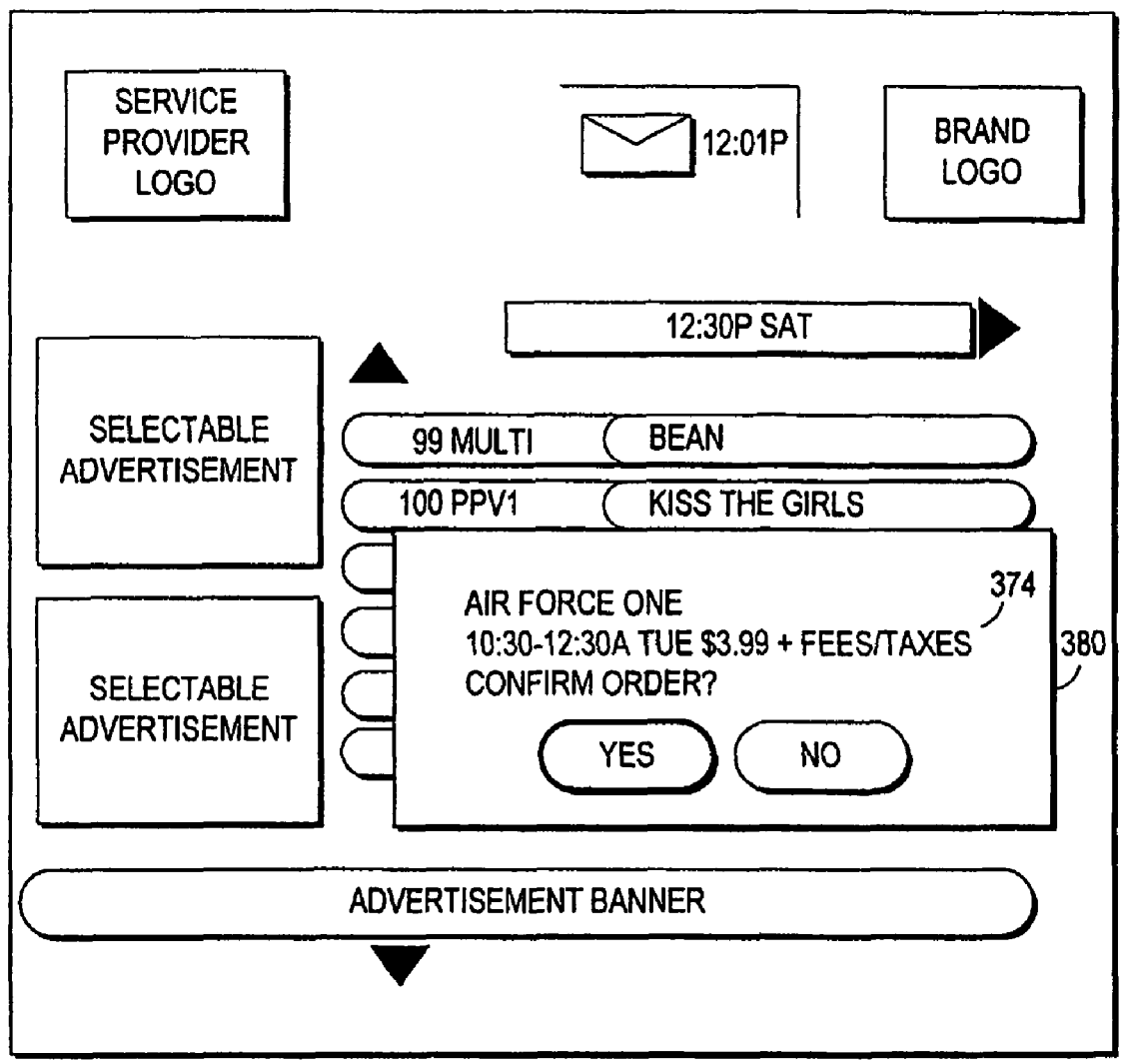
FIG. 15b shows an illustrative pay-per-view order confirmation overlay.

The program guide may provide the user with an opportunity to record pay-per-view programs and packages. An illustrative pay-per-view ordering overlay 370 is shown in FIG. 15a. The program guide may display pay-per-view ordering overlay 370 when, for example, the user highlights a pay-per-view program listing and presses an "order" or other suitable key on remote control 40. Pay-per-view ordering overlay 370 may display and ordering information 374, and may prompt the user to order the selected pay-per-view program by entering a purchase code. The user may enter a purchase code using, for example, number keys on remote control 40, or may cancel the purchase and return to the last screen by selecting "CANCEL" feature 376. The program guide may also provide the user with the opportunity to confirm the pay-per-view order using illustrative order confirmation overlay 380 of FIG. 15b. If desired, the program guide may display order confirmation overlay 380 of FIG. 15b instead of pay-per-view ordering overlay 370 to provide the user with the opportunity to order a pay-per-view program without requiring the user to enter a purchase code.

The charge displayed in overlays 370 and 380 may be set using any suitable approach. The charge may, for example, be the same whether a user watches a pay-per-view or records it. Alternatively, the user may be charged a different fee when just recording a pay-per-view program. In another suitable approach, charges for pay-per-view programs may differ depending on the length of the program. In still another suitable approach, the user may pay a flat charge for recording any amount of pay-per-views within a predetermined period (e.g., a month). The charge may be provided by program guide distribution equipment 16 to billing system 199 for billing the user or otherwise adjusting the user's account.

Figure 12A:
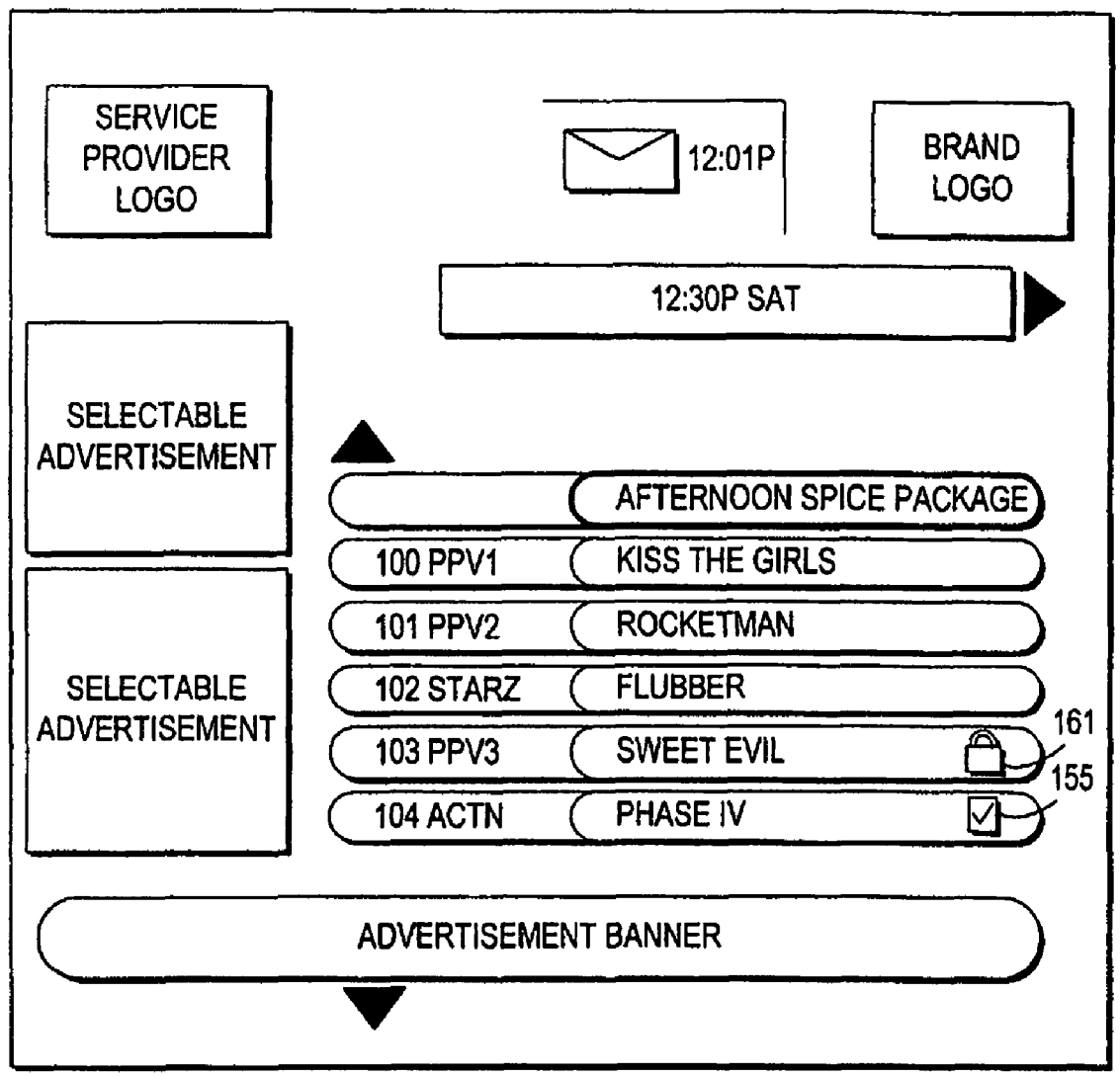
FIGS. 12a and 12b show illustrative program guide display screens in which pay-per-view program listings are displayed in accordance with the present invention.
Figure 12B:
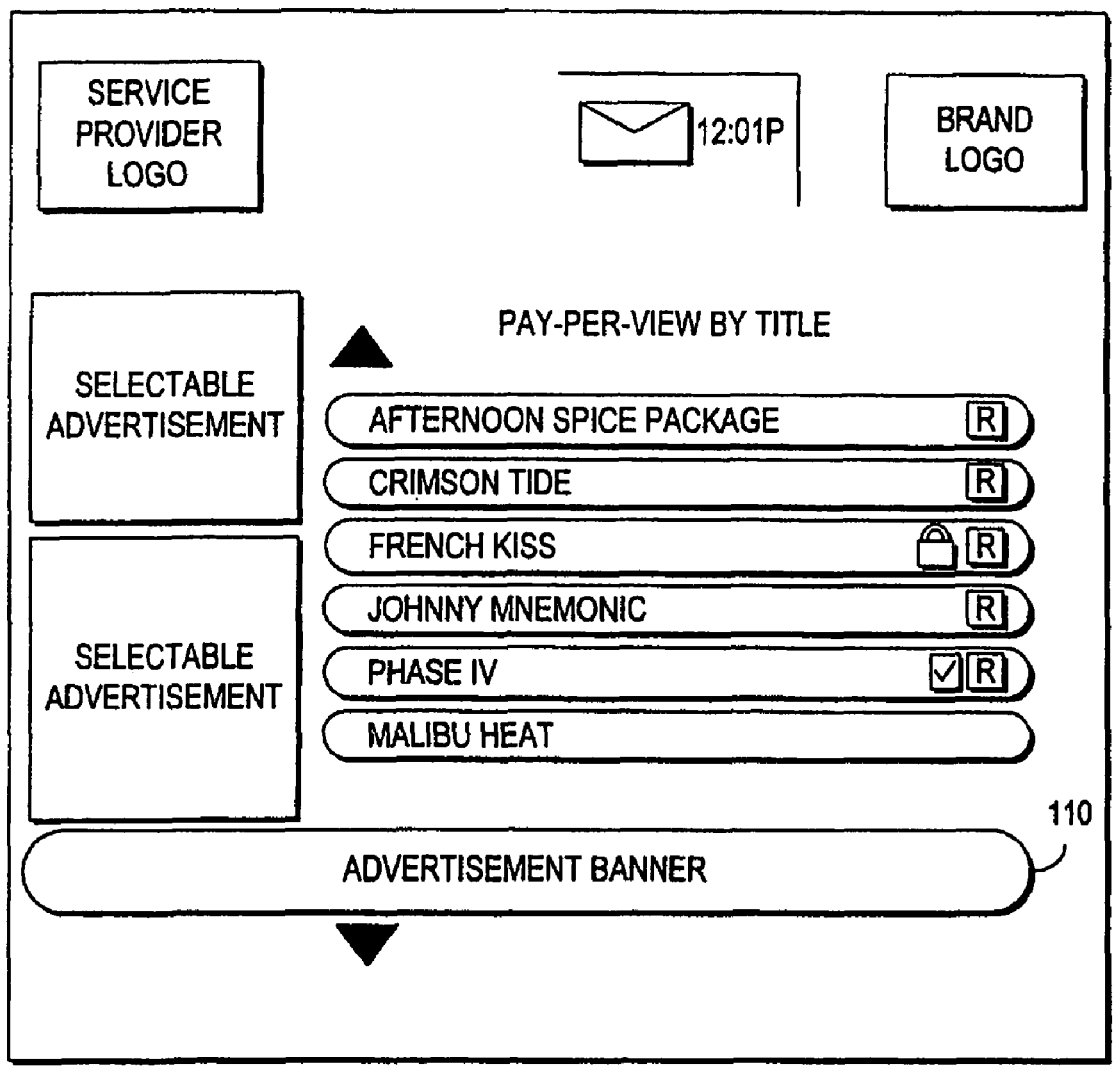
Figure 17:
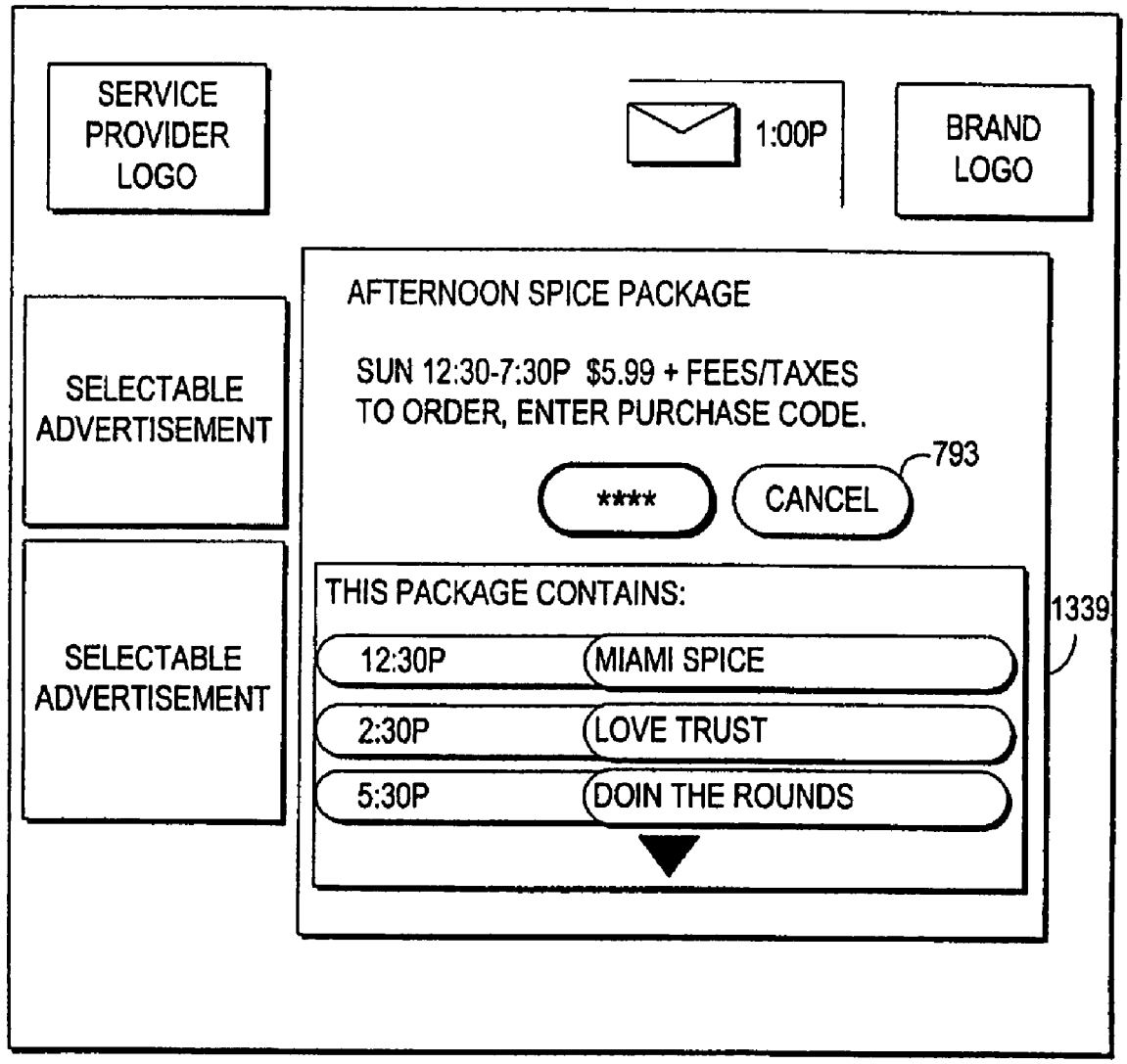
FIG. 17 shows an illustrative program guide display screen for providing a user with an opportunity to order a pay-per-view program package.

When a user indicates a desire to record a pay-per-view package by, for example, selecting a package listing from pay-per-view program listings screens 203 or 211 of FIGS. 12a and 12b, the program guide may display a package order screen, such as package order screen 811 of FIG. 17. Package order screen 811 may prompt a user for a purchase code. After a user enters a correct purchase code, the program guide orders the pay-per-view package from program guide distribution facility 16 or another suitable distribution facility.

The charge of the package as displayed in FIG. 17 may be set using any suitable approach. The charge may, for example, be the same whether a user watches each pay-per-view program in the package or whether the user records each program. Alternatively, the user may be charged a different fee when recording one or more pay-per-view programs in a package than when watching them. In another approach, charges for pay-per-view programs may differ depending on the length of each program in the package. In still another approach, the user may pay a flat charge for recording any amount of pay-per-views within a predetermined period (e.g., a month). The charge may be provided by program guide distribution equipment 16 to billing system 199 for billing the user or otherwise adjusting the user's account.

When a user indicates a desire to record a program or program grouping on remote media server 24 or local media server 29 (and possibly a desire to confirm recording of the program), the program guide generates a record request that is transmitted to the appropriate remote media server by communications device 51 (FIG. 9) via communications path 20 or 31. The record request may include, for example, an identifier for the program that the user wishes to record, an identifier for the user, and, if desired, any other information related to the program and the user. If the user indicated a desire to record a program grouping, the request may include a grouping identifier or the program identifiers of the constituent programs.

At the time a selected program or program in a grouping airs (which may be the time at which the program is selected for recording), remote media server 24 or local media server 29 may record the program and any associated program guide data. Program guide data may be stored as files associated with the program using pointers. Once the selected program is recorded, remote media server 24 or local media server 29 may provide a copy of user directory 59 to the program guide if the program guide maintains a copy of user directories. Alternatively, remote media server 24 or local media server 29 may provide a pointer to the location of the program on media store 63. In still another suitable approach, user directories 59 may be maintained solely by remote media server 24 or local media server 29 and provided to the program guide on request.

Figure 16:
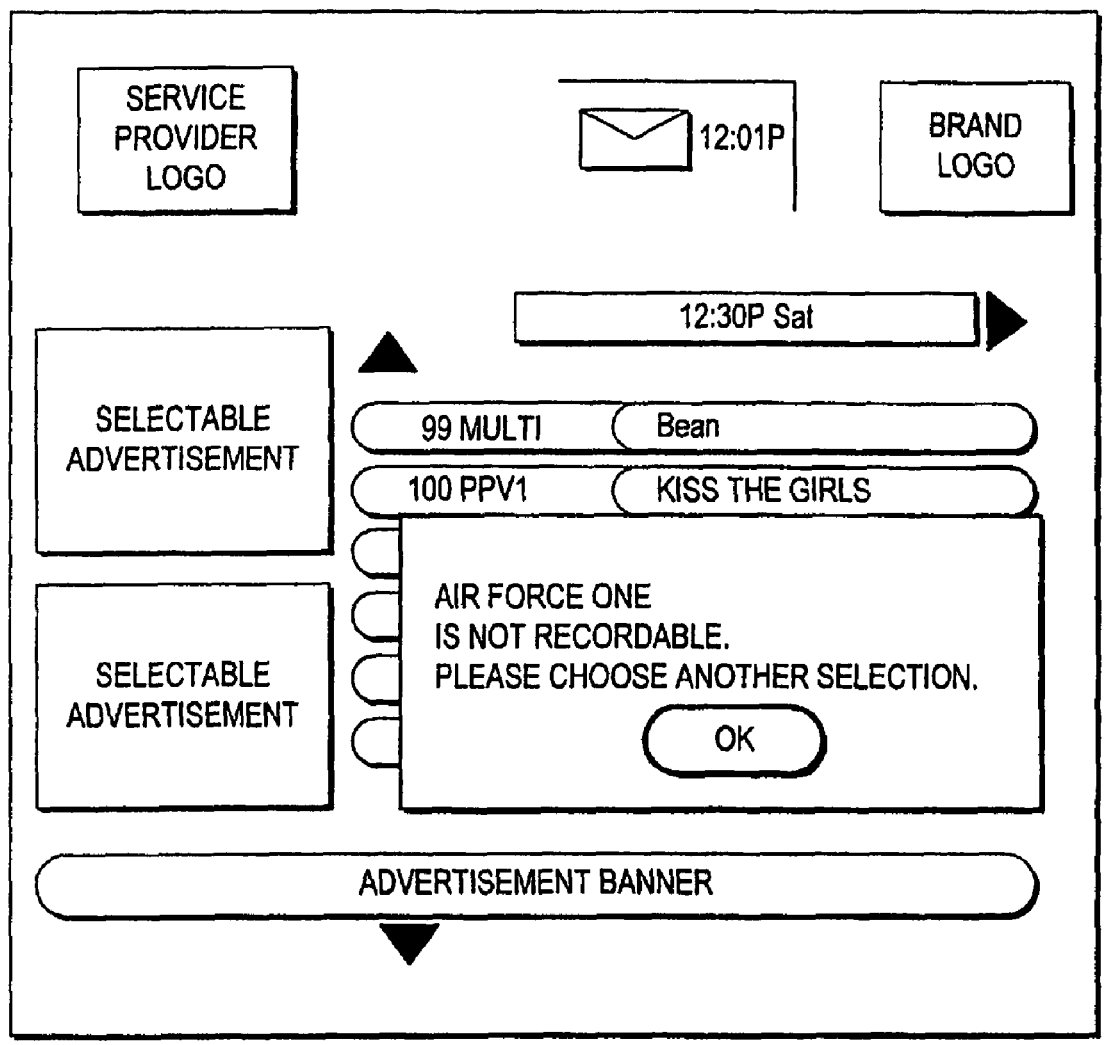
FIG. 16 shows an illustrative record overlay that the program guide may display when a user selects a program for recording that is copy protected.

In practice, some programs may be copy protected. Main facility 12, program guide distribution facility 16, or another distribution facility may, for example, designate some programs as not recordable. When the user indicates a desire to record a copy protected program, the program guide may indicate to the user that the program cannot be recorded as shown in FIG. 16.

Figure 18A:
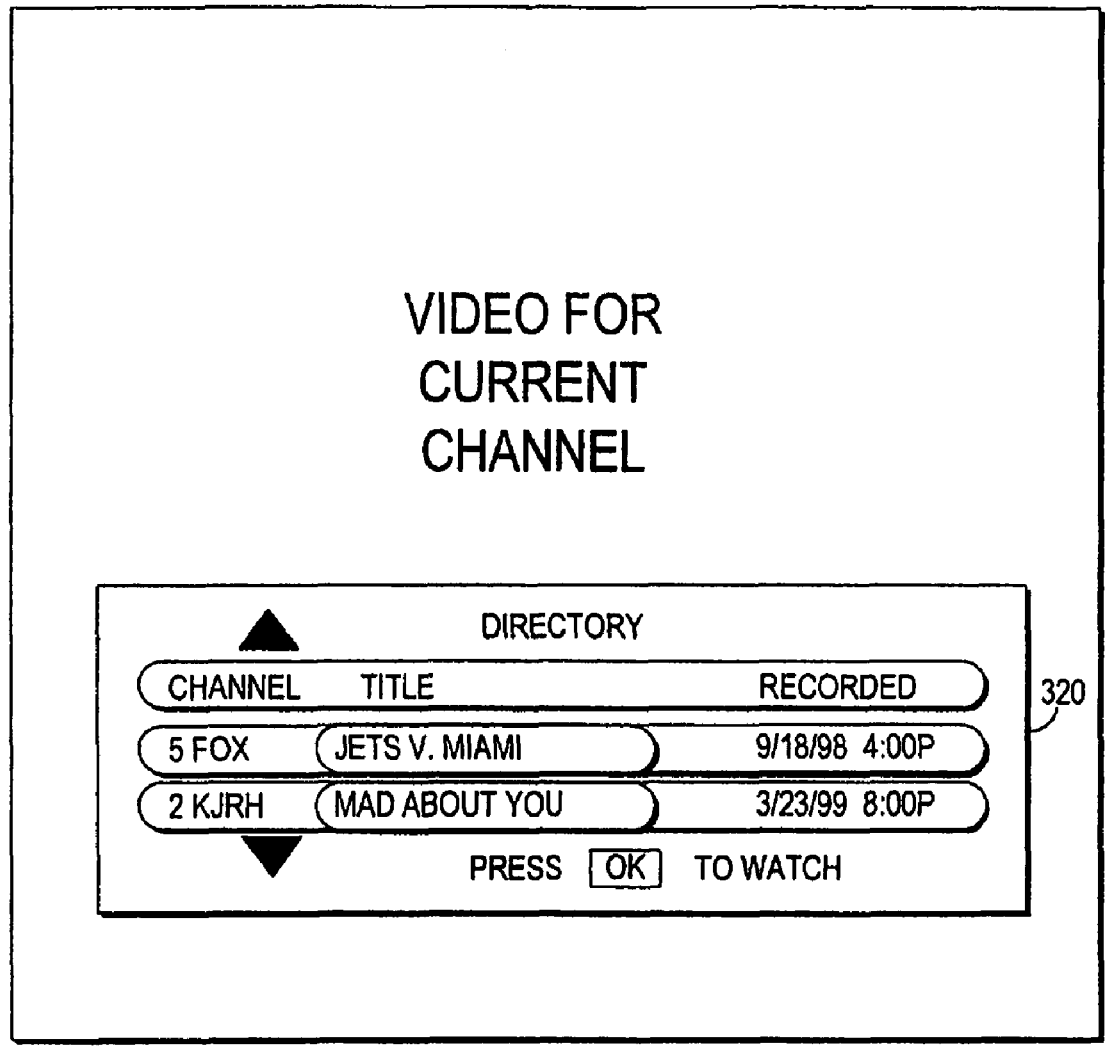
FIG. 18a shows an illustrative directory overlay that may be displayed by the program guide while a user is watching television. The overlay may be displayed when a user indicates a desire to view a directory of programs that have been recorded for a user on the remote media server of FIGS. 2a-2e or the local media server of FIG. 7.
Figure 18B:
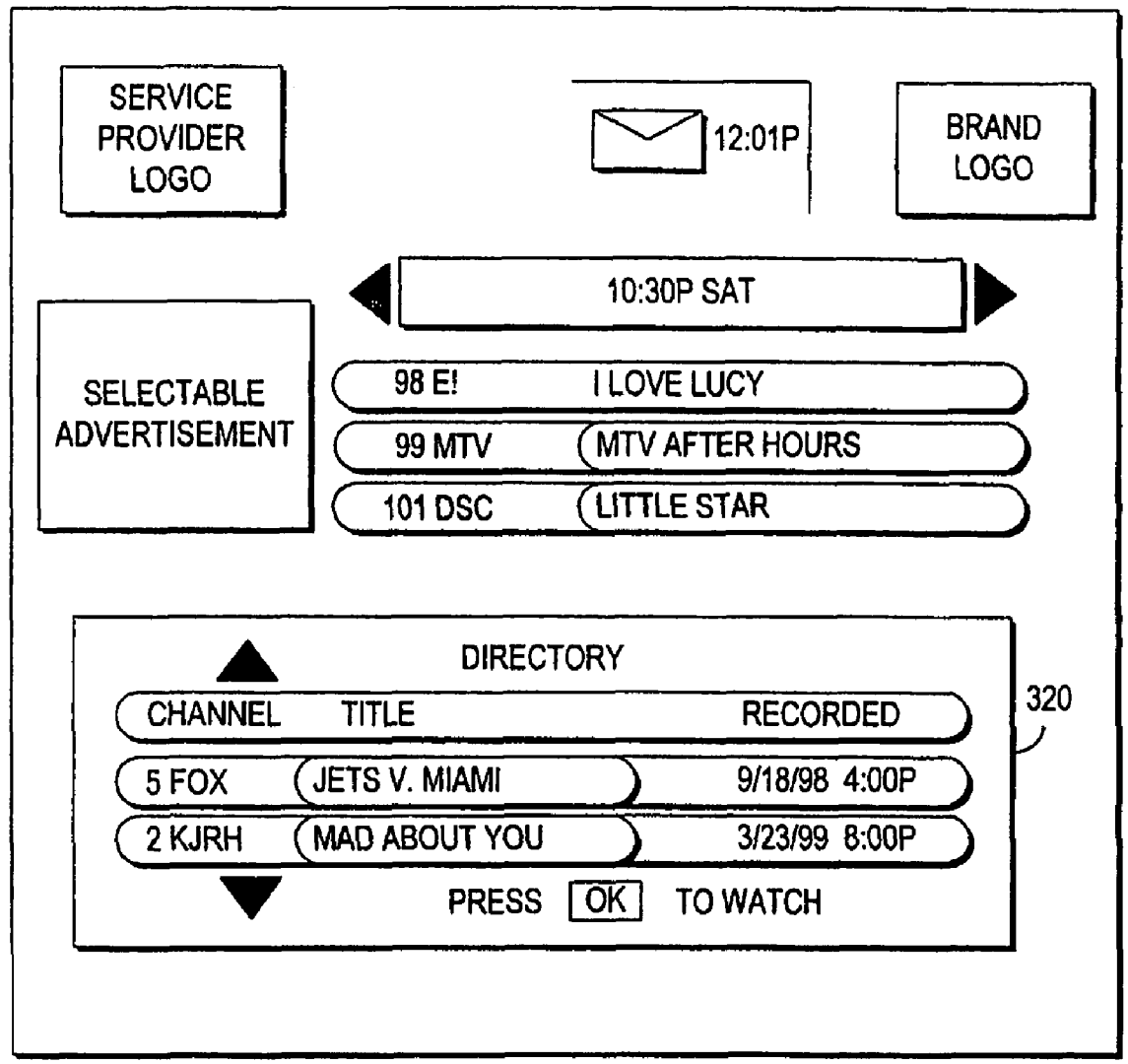
FIG. 18b shows an illustrative directory overlay that may be displayed by the program guide while a user is in a program guide display screen. The overlay may be displayed when a user indicates a desire to see a directory of programs that have been recorded for a user on the remote media server of FIGS. 2a-2e or the local media server of FIG. 7.

The program guide may provide the user with the opportunity to access a directory or other such list of programs that have been recorded for the user on remote media server 24 or local media server 29. The user may indicate a desire to access a directory or list of recorded programs by, for example, pressing a "DIR" key on remote control 40 or selecting a "Directory" feature from main menu 107. FIGS. 18a and 18b show illustrative overlays 320 that may be displayed by the program guide when the user indicates a desire to view a directory of the programs that the user has recorded on remote media server 24 or local media server 29. FIG. 18a shows overlay 320 overlaid on top of the video of the channel that the viewer is watching. FIG. 18b shows overlay 32 overlaid on top of a program listings screen. Overlay 320 may display any information related to the programming that the user has selected for recording by remote media server 24 or local media server 29. Overlay 320 may display, for example, the channels and titles of the recorded programs, the dates and times they are recorded, or any other suitable information.

Figure 18C:
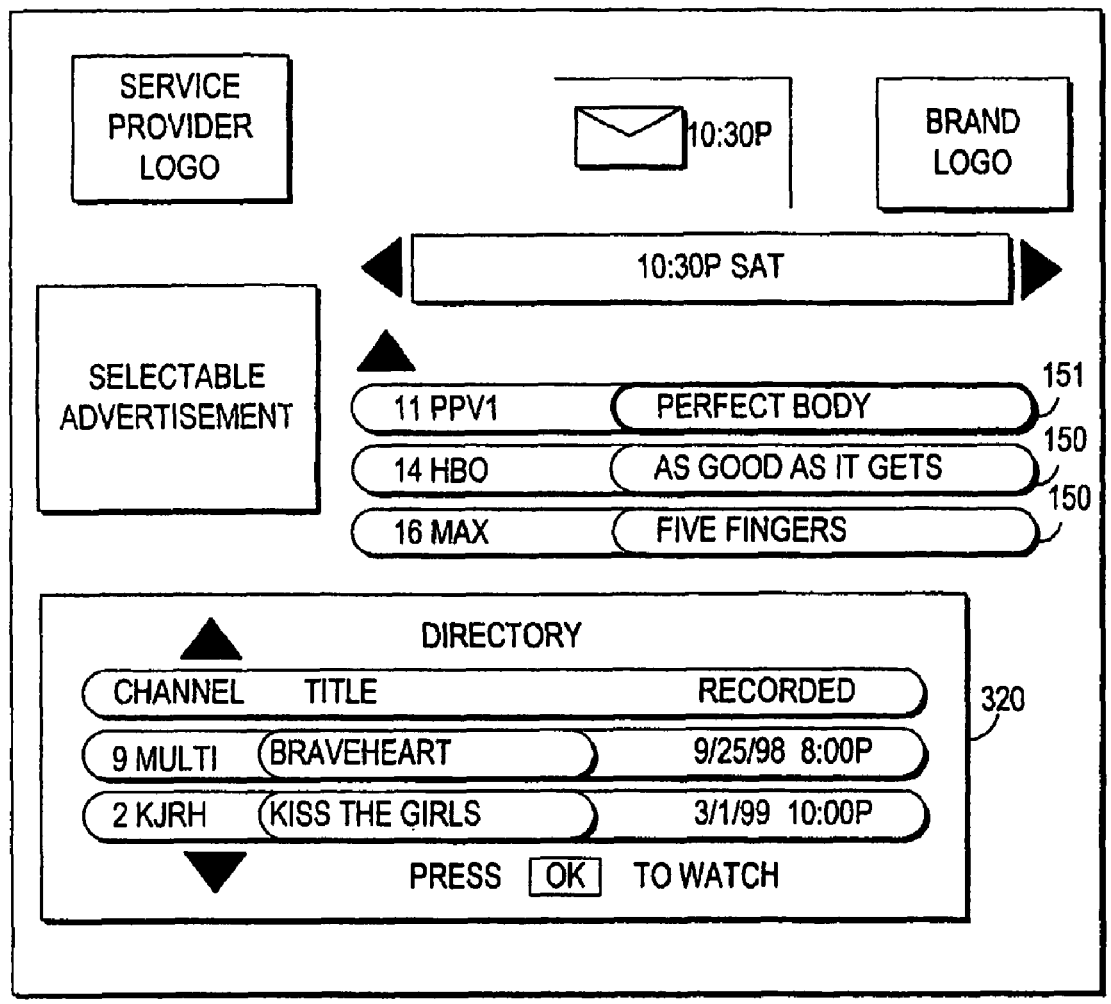
FIG. 18c shows an illustrative directory overlay that may be displayed by the program guide while a user is in a display screen in which listings are displayed by category in accordance with the present invention.

Program listings for recorded programs may be organized by channel, theme, user, or by any other suitable criteria. In practice, program listings for recorded programs may be displayed in overlays based on the type of display screen over which the overlays are displayed. In FIG. 18b, for example, listings are displayed by time because the display screen over which they are displayed displays program listings by time. FIG. 18c shows listings of recorded programs in the movies category, because the display screen over which they are displayed only displays listings for movies. FIGS. 18b and 18c are illustrative and any suitable criteria may be used. In addition, program listings may be displayed using display criteria or based on themes when the program listings are overlaid on top of a video the user is watching.

Figure 18D:
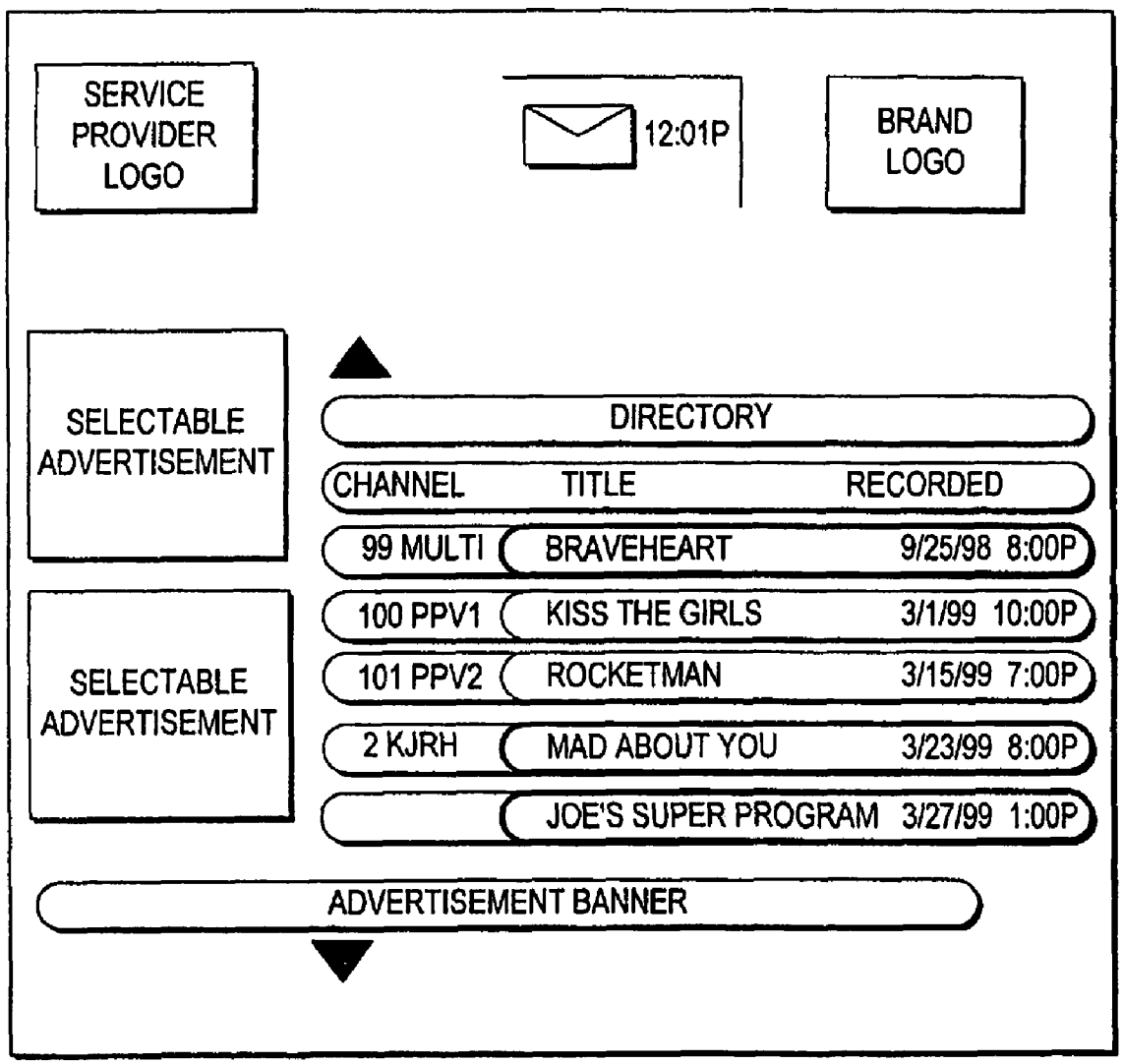
FIG. 18d shows an illustrative directory screen that may be displayed by the program guide when a user indicates a desire to access a directory of programs recorded for a user on the remote media server of FIGS. 2a-2e or the local media server of FIG. 7.

FIG. 18d shows an illustrative directory screen 350 that may be displayed by the program guide when the user indicates a desire to view a directory of the programs that the user has recorded on remote media server 24 or local media server 29. Directory screen 350 may display program-related information like that displayed by overlay 320. Directory screen 350 may also include other program guide display screen elements, such as selectable advertisements, service provider logos, brand logos, advertisement banners, etc. If desired, directory screen 350 may be displayed as an overlay and any of the overlays described herein may be presented as display screens. Such display screens may be either full screen display screens or partial screen display screens. Partial screen display screens may contain a reduced-size video window (e.g., for displaying the current television channel).

Figure 18E:
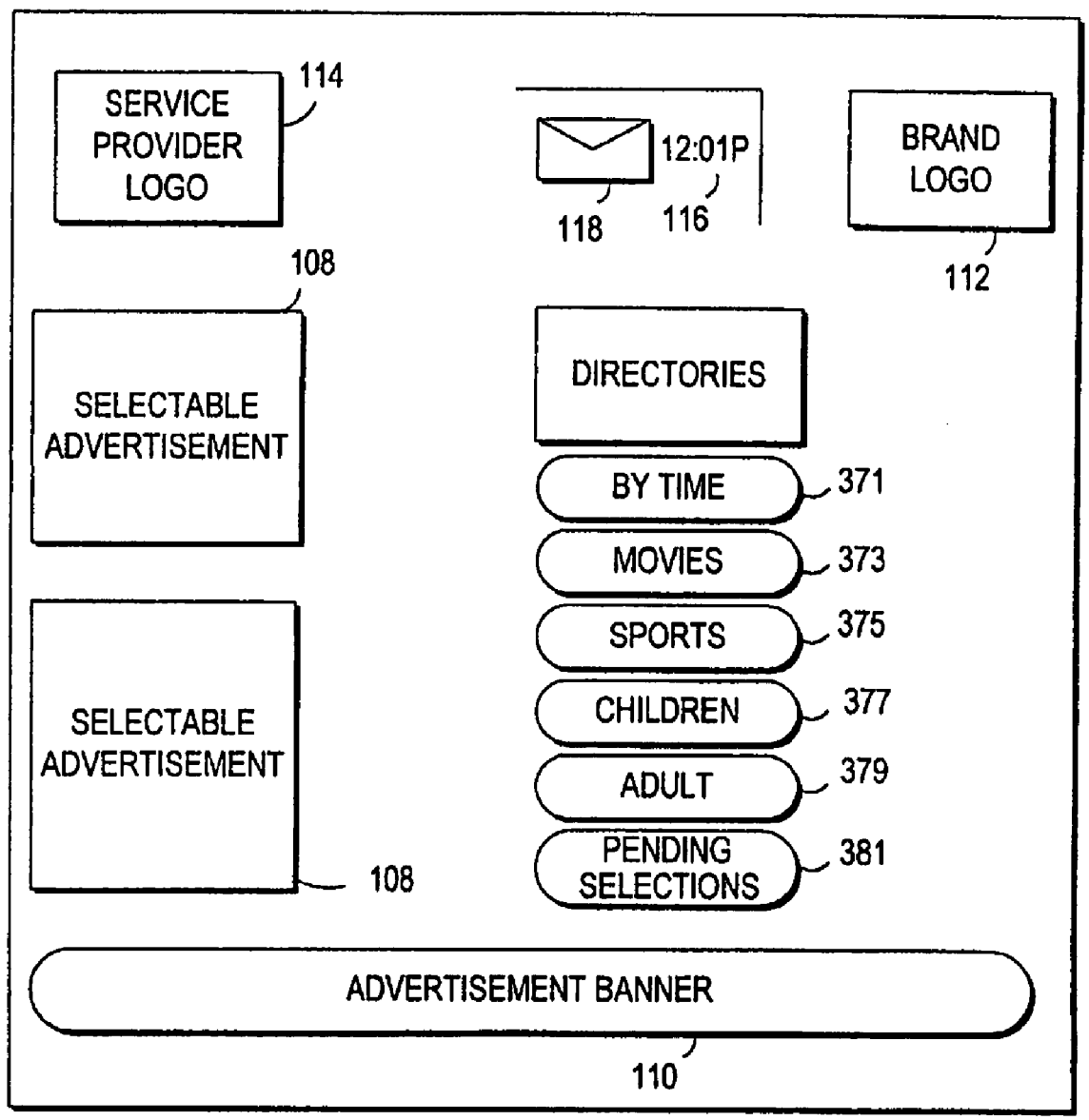
FIG. 18e shows an illustrative directory menu screen that the program guide may display when a user indicates a desire to access various directory screens, such as that shown in FIG. 14d, but in which recorded program listings are sorted in various ways.

In another suitable approach, the program guide may display a directory menu when the user, for example, presses a "DIR" key on remote control 40 or selects a "Directory" feature from main menu 102. An illustrative directory menu screen 370 is shown in FIG. 18e. Directory menu screen 370 may provide the user with an opportunity to view directories of recorded programs, such as that shown in FIG. 18d, but sorted in various ways. When, for example, the user selects "By Time" feature 371, the program guide may display a directory of recorded programs assorted according to the date and time the programs were recorded. When, for example, the user selects "Movies" feature 373, "Sports" feature 375, "Children" feature 377, or "Adult" feature 379, the program guide may display a directory of recorded programs for movies, sports, children's programs, or adult programs, respectively. The listed categories may be predetermined or based on movies a user has recorded. For example, if a user has only recorded movies, only "Movies" feature 373 may be displayed. If a user has recorded movies and children's programs, "Movies" feature 373 and "Children" feature 377 may be displayed.

Figure 18F:
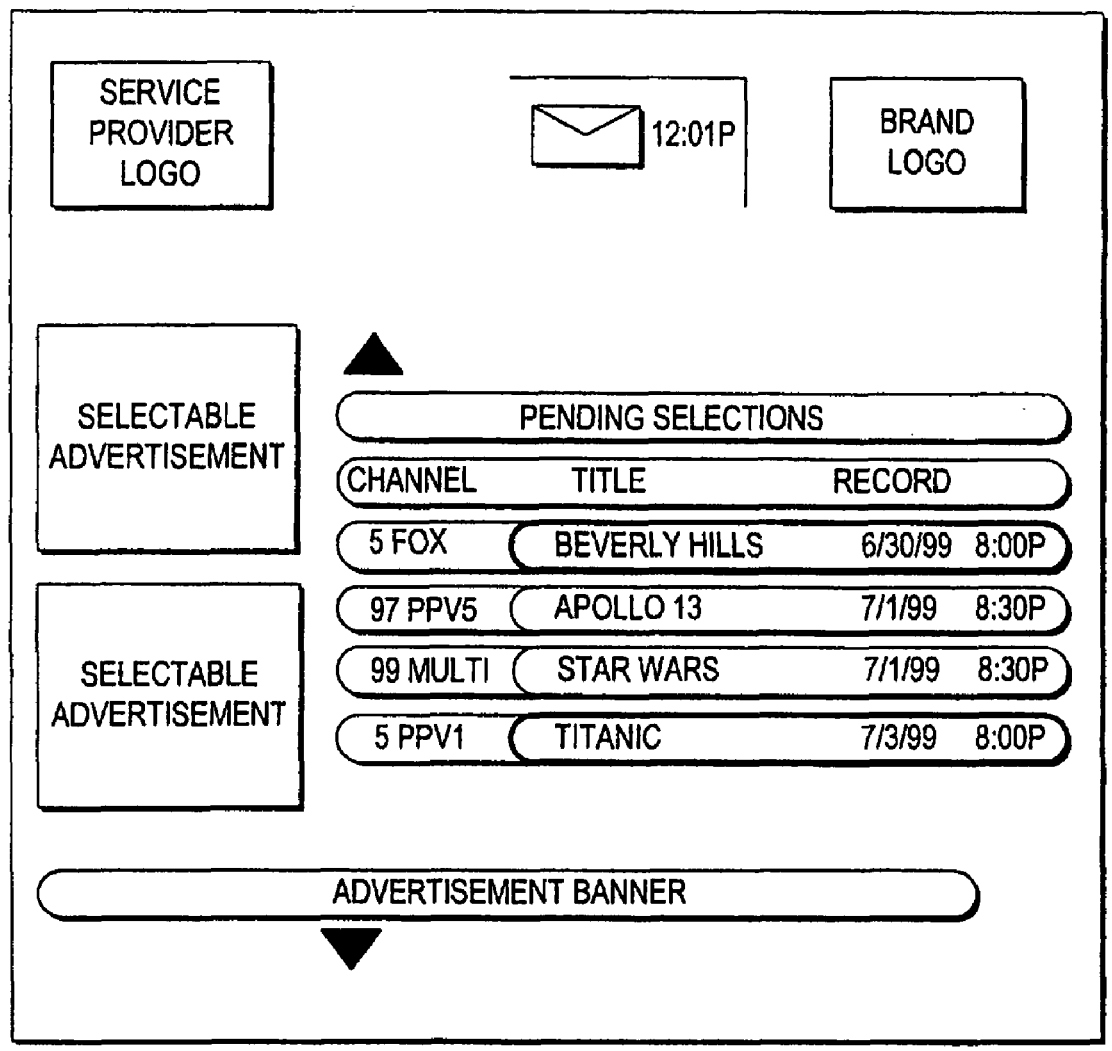
FIG. 18f shows an illustrative directory screen of programs that a user has selected for recording by a media server but that have not yet been recorded.

The program guide may also provide the user with an opportunity to view a directory of programs that the user has selected for recording by a media server but that have not yet been recorded. FIG. 18f shows an illustrative pending program directory screen 390 that the program guide may display when, for example, the user selects "Pending Selections" feature 381 from directory menu screen 370.

The information displayed in the listings screens of FIGS. 11a, 11b, 11c, 12a, and 12b (FIGS. 18a and 18b), in overlay 320, or in directory screens 350 or 390 (FIGS. 18d and 18f), may be obtained by the program guide using any suitable approach. For example, a copy of user directory 59 having all of the displayed information may be stored by the program guide in memory 49. In still another suitable approach, a copy of user directory 59 may be maintained by the program guide that includes all program guide data related to the recorded program (e.g., program listings information, Internet links, software, etc.), while a copy of user directory 59 having a small subset of the total program guide data available for the program (e.g., a program identifier and pointer) is maintained by remote media server 24 or local media server 29. In still another suitable approach, the program guide may maintain user directory 59 including the program guide data for the programs in the directory. Alternatively, a smaller directory may be maintained having only program identifiers, for example, and the program guide may obtain program guide data from a continuously provided program guide data stream from program guide distribution facility 16 or from program guide server 25 based on the identifier. In still another suitable approach, user directory 59 may be totally maintained by remote media server 24 or local media server 29 and made available to the program guide on demand. These various approaches are only illustrative and any suitable approach for maintaining user directories and providing users with access to them may be used if desired.

Figure 19:
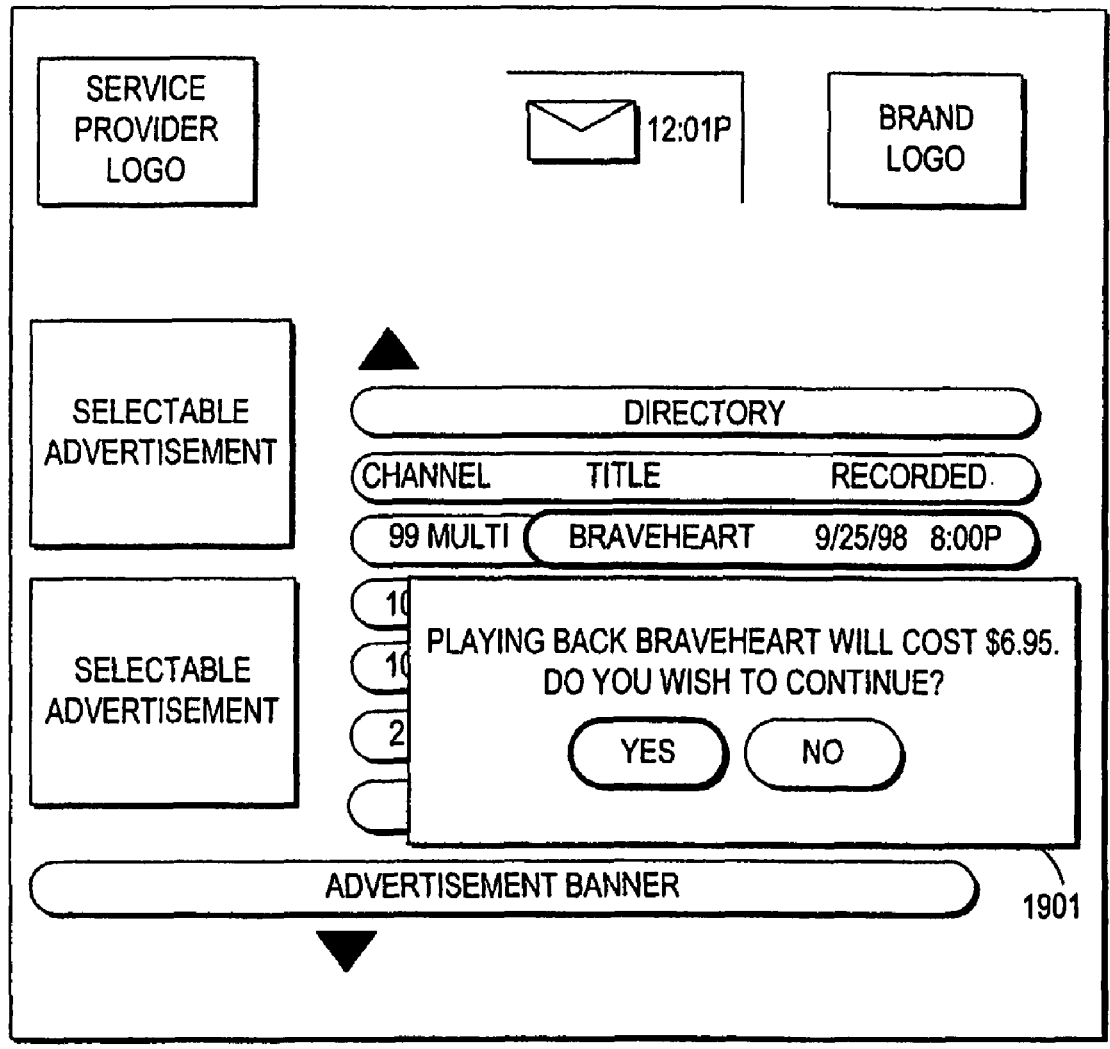
FIG. 19 shows an illustrative overlay that the program guide may display when a user indicates a desire to play back a program. The overlay indicates a charge for the playback.

Once the user has selected for playback a program recorded on remote media server 24, the program guide may indicate to the user a charge for playing back the program and prompt the user to confirm the playback. FIG. 19 shows an illustrative overlay 1901 in which such a charge is indicated and in which the user is prompted to confirm the playback. The charge displayed in overlay 1901 may be determined using any suitable approach. Users may be charged a flat rate per-playback. Alternatively, users may be charged based on how long a selected program is. In another suitable approach, users may subscribe to a service in which users are permitted unlimited playback time for a flat fee paid on a periodic basis (e.g., monthly). In still another suitable approach, users may be charged a flat rate for a predetermined amount of playing back programs. The charge may be provided by program guide distribution equipment 16 to billing system 199 for billing the user or otherwise adjusting the user's account.

Once the user has selected a listing and indicated a desire that its associated program be played back (and if necessary confirmed the playback), the program guide may issue a play back request to remote media server 24 or local media server 29. If desired, the program may be played back without commercials. The program guide may, for example, provide the user with the opportunity to set a "skip commercials" option from a set-up screen. Alternatively, the user may fast-forward through commercials.

If desired, the program guide may instead issue a retrieval request to remote media server 24. In contrast to a play back request that directs remote media server 24 to both retrieve and play back the requested program, a retrieval request need not involve immediate play back. Rather, the requested program may be retrieved from storage 15 and provided to user television equipment 22. As used herein, "retrieval request" is intended to mean any command, request, message, remote procedure call, object based communication or any other type of interprocess or interobject based communication whereby the program guide may communicate information to the remote media server 24 or local media server 29 specifying which program the user wishes to retrieve. The retrieved program may then be stored in memory 44 (FIG. 6), digital storage device 31 (FIG. 6), secondary storage device 32 (FIG. 6) or on local media server 29 (FIG. 6). When the user wishes to view the program that has been retrieved and locally stored, user television equipment 20 may be directed to play back the program. If the retrieved program is stored on local media server 29, the user television equipment can retrieve it and then play it or may request that local media server 29 play it back directly.

Figure 20:
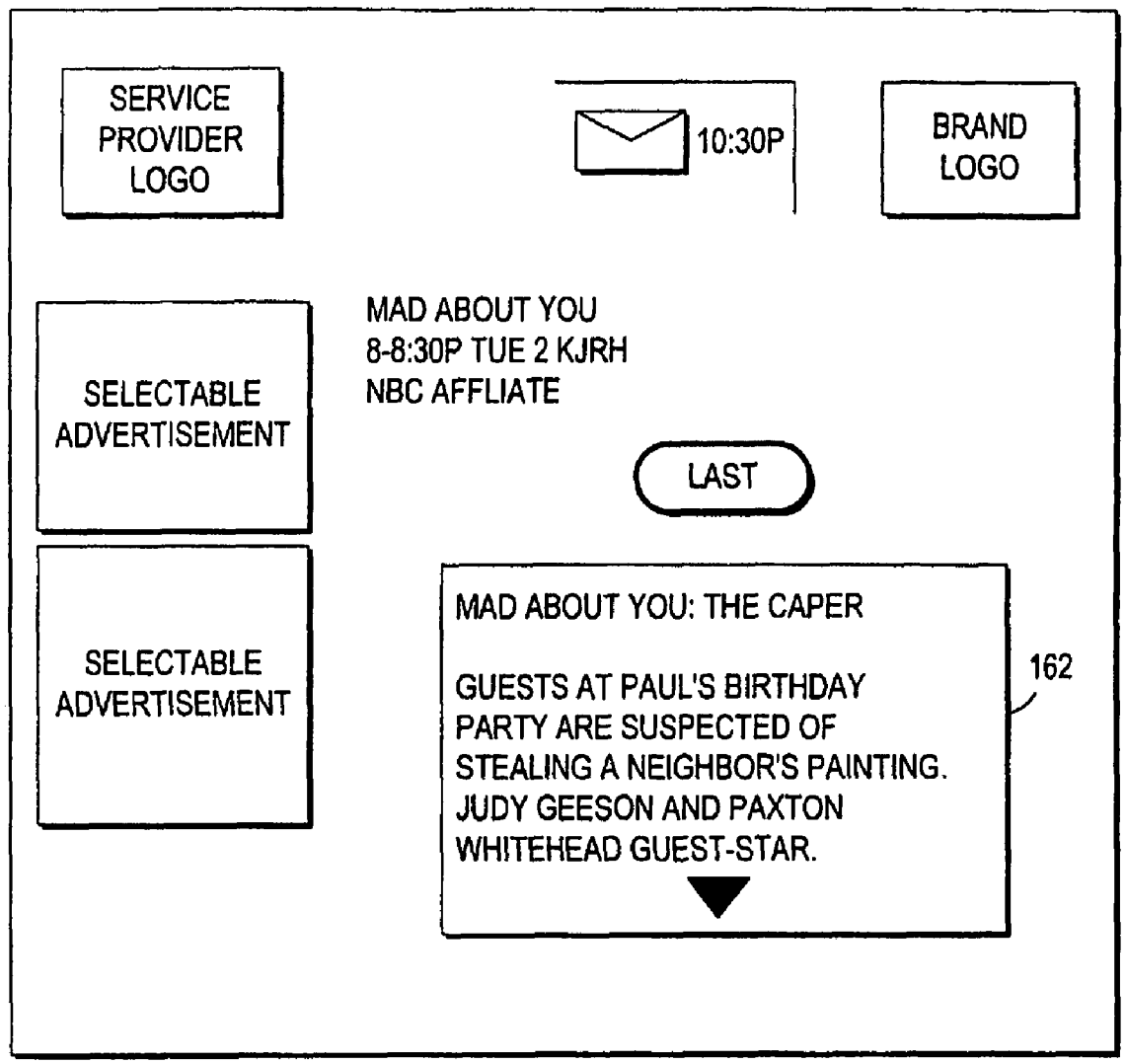
FIG. 20 is an illustrative full information screen that may be displayed by the program guide when a user indicates a desire to see information on a program that has been recorded for a user on the remote media server of FIGS. 2a-2e.

The program guide may provide users with the opportunity to view additional information for programs recorded by remote media server 24 or local media server 29. FIG. 20 shows an illustrative full information screen 161 that may be displayed when a user indicates a desire to view information for a program that has been recorded by remote media server 24 or local media server 29. Full information screen 161 may be displayed, for example, when the user presses an "INFO" key on remote control 40 after highlighting a program listing in a directory or other list of recorded programs.

Full information screen 161 may include information window 162, in which a brief description of the recorded program may be displayed. The information displayed in information window 162 may have been stored by remote media server 24 or local media server 29 when the program was recorded, may have been stored by the program guide when the program was recorded, may be retrieved by the program guide when full information screen 161 is displayed, or may be obtained by the program guide using any other suitable approach.

The program guide may provide users with the opportunity to play programs on demand that users have previously recorded on remote media server 24 or local media server 29. Remote media server 24 or local media server 29 may play programs on-demand in response to playback requests generated by the program guide. As used herein, "playback request" is intended to mean any command, request, message, remote procedure call, object based communication, or any other type of interprocess or inter-object based communication whereby the program guide may communicate information to a media server specifying which program the user wishes to play back. The program guide may generate playback requests when a user indicates a desire to view a program that has been recorded. The user may indicate a desire to view a program that has been recorded by, for example, highlighting a listing in a directory or list and pressing a "PLAY" key on remote control 40.

When the user indicates a desire to view a program that has been recorded, the program guide generates a playback request that is transmitted by communications device 51 to remote media server 24 or local media server 29 via communications path 20 or 31. The playback request may include for example, an identifier for the program that the user wishes to play back, an identifier for the user, etc. The playback request may include a pointer to a media directory on storage 15 if, for example, the program guide maintains a user directory 59 or a copy of a user directory 59. Remote media server 24 retrieves the requested program from storage 15 and provides it to distribution equipment 21 for distribution as a suitable video signal (e.g., NTSC video, MPEG-2, etc.). Local media server 29 may retrieve the requested program from storage 37 and provide it to user television equipment 22 as a suitable video signal (e.g., NTSC video, MPEG-2, etc.). If the requested program is to be played back, distribution equipment 21 distributes the program in real time. If the requested program is merely being retrieved, distribution equipment 21 may transfer the program to user television equipment 21 in a compressed format (e.g., as a compressed video file).

Remote media server 24 may also retrieve any recorded program guide data associated with a recorded program and may provide the retrieved data to distribution equipment 21 or program guide server 25 for access by the program guide. Alternatively, remote media server 24 may provide the retrieved data directly to the program guide. Local media server 29 may provide the data to user television equipment 22 via communications path 29. The program guide may access the retrieved program guide data and may present it to the user so that the user may interact with the data during playback just as when the program was originally aired. If, for example, associated program data is computer software that the user could have accessed when the program was originally aired, the software may be downloaded by the program guide in response to an indication from the user that the user desires to access the software.

The software may be stored on, for example, digital storage device 49, so that the user can access the software during playback. Such software may be, for example, an interactive television application, such as a shopping application that allows the user to place orders for goods offered during the program.

Another example of program guide data that may be stored is an Internet link that is associated with a recorded program. The link may be retrieved by remote media server 24 or local media server 29 and downloaded by the program guide when the user plays back the program. The program guide may display the link in a program guide display screen or overlay. Internet links may, for example, be displayed in an overlay that is displayed on top of the program during playback. The program guide may provide the user with the opportunity to select the Internet link and thereby direct the program guide to launch a web browser.

Figure 21:
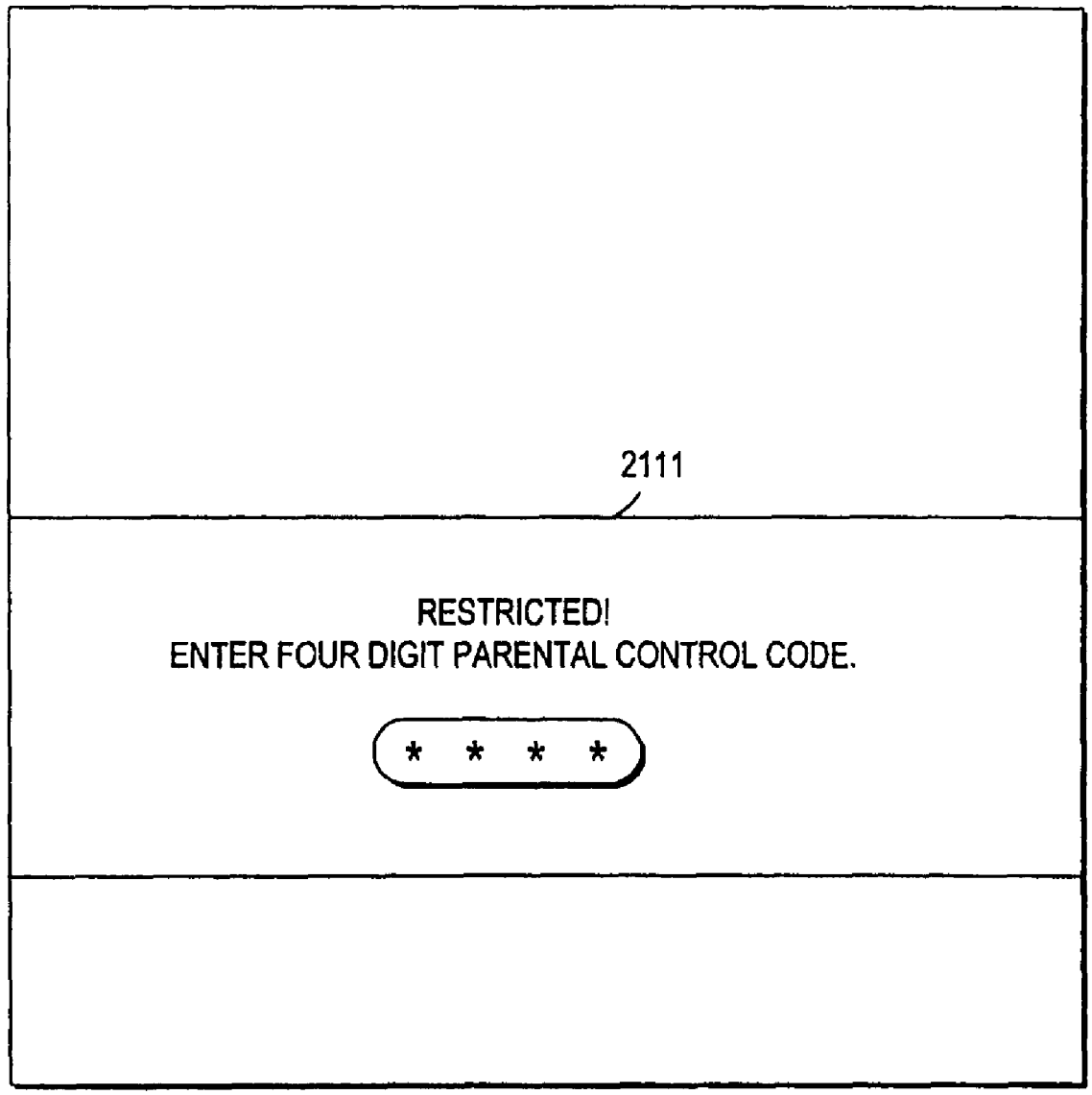
FIG. 21 shows an illustrative overlay that the program guide may display when a user indicates a desire to record or play back a program that is parentally locked.

The program guide may provide a user with an opportunity to parentally control programs and program guide data. The program guide may, for example, provide a user with an opportunity to set a parental control code and parental control criteria (e.g., rating, title, channel, etc.) When a user indicates a desire to record a program on or play back a program from remote media server 24 or local media server 29, the program guide may compare the characteristics of the program (e.g., its rating, title, channel, etc.) stored, for example, in a user directory, with the parental control criteria. If the program does not meet the criteria (e.g., its rating is too mature), the program guide may prompt the user for the parental control code. The program guide may allow the user to record or playback the program only when the proper parental control code is entered. FIG. 21 shows an illustrative overlay 2111 that the program guide may display over a television channel or program guide display screen to prompt the user for parental control code. FIG. 21 shows overlay 2111 displayed over a television channel which has had an objectionable program blacked out by the program guide.

The program guide may provide the user with VCR like control of recorded programs. Remote control 40 may have keys that resemble the buttons on a typical analog videocassette recorder. In another suitable approach, user input device 46 (FIG. 9) may have a keyboard with keys mapped to VCR like functions. Alternatively, the user may select on-screen features that correspond to such functions. Any other suitable approach for providing the user with VCR like control of recorded programs may be used. The user may, for example, pause, stop, rewind, fast-forward, or play the program by indicating a desire to do so (e.g., by pressing suitable keys on remote control 40).

These features may be performed locally by the program guide, for example, by downloading on-demand programming in part or in whole to digital storage device 49 (FIG. 9). Alternatively, the program guide may generate appropriate requests (e.g., fast-forward, rewind, skip, and pause requests) in real time in response to user input. Such requests may be transmitted to remote media server 24 or local media server 29 for processing. As used herein, requests for VCR-like control of recorded programs are intended to mean any command, request, message, remote procedure call, object based communication, or any other type of interprocess or inter-object based communication whereby the program guide may communicate information to the media server specifying which program the user wishes to control.

Figure 22:
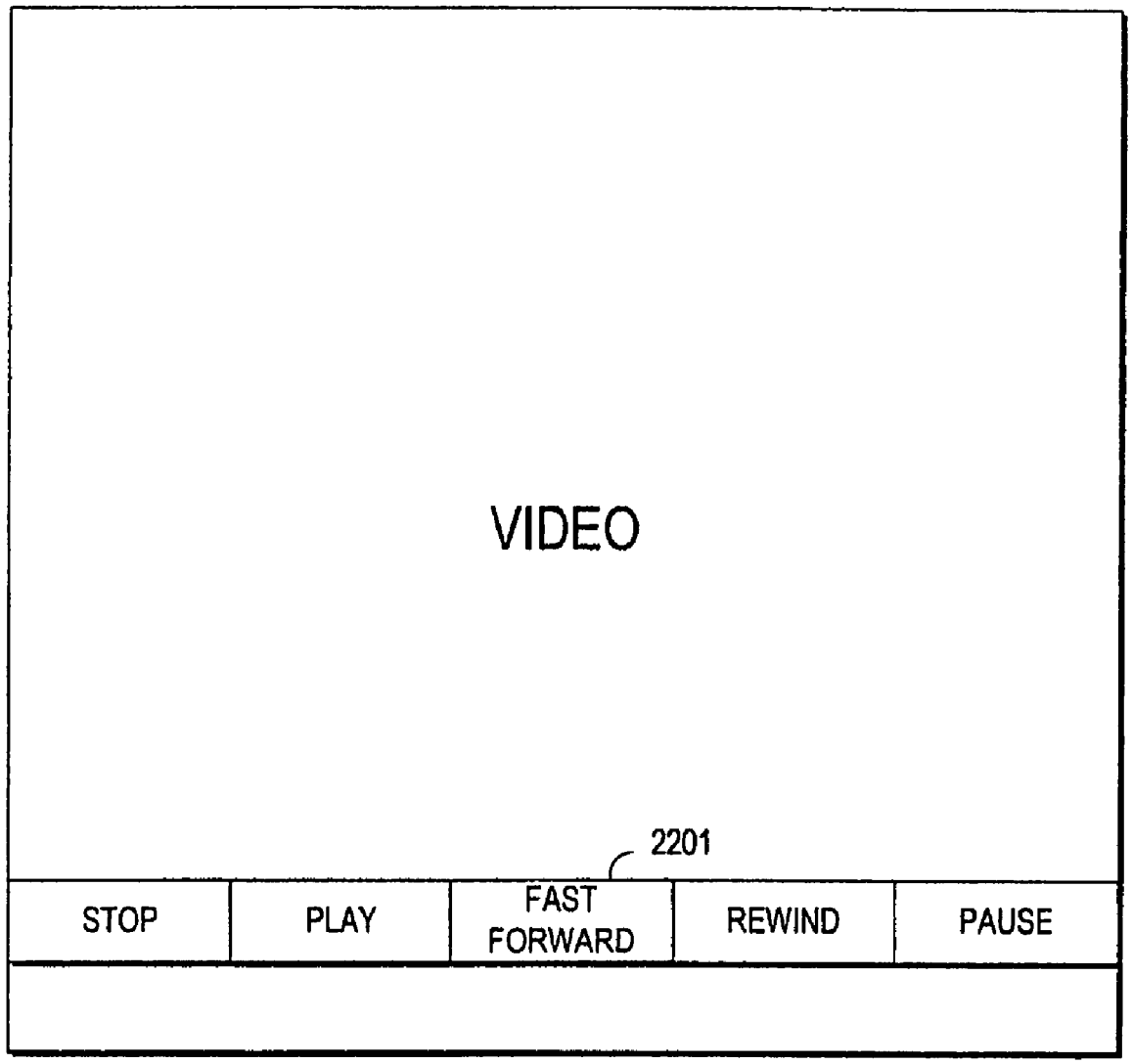
FIG. 22 shows an illustrative overlay for providing users with control of a program recorded on the remote media server of FIGS. 2a-2e or the local media server of FIG. 7.

FIG. 22 shows an illustrative overlay 2201 for providing users with VCR-like control of programs that have been recorded on remote media server 24 or local media server 29. When a user indicates a desire to stop, play, fast-forward, rewind, or pause a video by, for example, pressing suitable keys on remote control 40, the program guide may indicate which key has been pressed. For example, if the user fast-forwards a video, the program guide may highlight the "FAST FORWARD" button portion of overlay 2201.

The program guide may also provide users with an opportunity to real-time cache programs. This feature may allow users to view portions of a program that the user would otherwise not be able to view when, for example, the user must momentarily leave the room in which the program is being shown. A user may indicate a desire to record a program on remote media server 24 when viewing is interrupted by, for example, pressing a "PAUSE" key on remote control 40. The program guide may respond for example, by indicating to the user a charge for caching the program and prompting the user to confirm the recording as shown in FIG. 23. Once the user has confirmed the record or if there is no charge for the record, the program guide may issue a record request to remote media server 24. Remote media server 24 may begin recording the program at that point and until the program is finished. When the interruption is over (e.g., the user returns to his or her seat), the user may indicate a desire to continue watching the program. Remote media server 24 may play back the cached copy of the program while continuing to cache the remaining portion of the aired program until the aired program is over. The user may catch up to the aired program during commercials or other progress of little interest by, for example, fast-forwarding.

When a user indicates a desire to "rewind" a real-time cached program to the point before which the user began recording, remote media server 24 may check storage 15 to see if any other users have recorded the program or whether the program is otherwise still available. If there are no other copies of the program available, the user may be restricted to rewinding only to the point at which the user began recording. If desired, remote media server may automatically cache or otherwise temporarily record all current programs, programs being viewed, or programs for certain subscribers thereby providing users or subscribers with the ability to have full VCR-like control of such cached or recorded programs. Local media server 29 may cache programs in a similar manner if desired.

The program guide may also provide users with an opportunity to manage what is stored on remote media server 24 and local media server 29. The program guide may, for example, provide users with an opportunity to delete programs that are no longer desired. The user may indicate a desire to delete a program by, for example, highlighting a listing for a recorded program and pressing a "DEL" key on remote control 40, by selecting an on-screen feature of a program guide display screen such as feature 159 of full information screen 161 (FIG. 20), or using any other suitable approach. When the user indicates a desire to delete a recorded program, the program guide may generate a delete request that is transmitted to remote media server 24 or local media server 29 by communications device 51. Delete requests may be any suitable request, message, object-based communication, remote procedure call, etc.

After receiving a delete request, remote media server 24 (for users from within the same or different households) or local media server 29 (for users from within the same household) may determine whether more than one user has requested a copy of the selected program. If only one user has requested that the program be recorded, remote media server 24 may issue a delete command to the storage device that stores the program selected for deletion. The appropriate storage device deletes the selected program from its media store 63 (FIG. 4) and media directories 61 and user directory 59 are updated accordingly. If more than one user has requested that the program be recorded, remote media server 24 may delete the entry in user directory 59 for that program. If the program guide maintains a user directory 59, the program guide may delete the entry. Local media servers may delete programs in a similar manner.

Remote media server 24 and local media server 29 may automatically delete programs if desired. This may be done, for example, when a program is not accessed by a user for a predetermined period of time. Remote media server 24 and local media server 29 may also automatically delete portions of a program that is being real-time cached. For example, real time caching may be limited to ten minutes of recording, thereby limiting the amount of recording a user may rewind. Remote media server 24 may, for example, move a program to physical media that is sent to the user. Another suitable approach involves deleting programs after all users have watched them. Users may be charged a fee for recording programs on server 29 or server 24. If users are charged a fee, users may be charged per unit of storage consumed, per program recorded, per playback, or may be charged a flat fee, etc.

The program guide may provide a user with an opportunity to set up various settings related to how programs are recorded on or played back from remote media server 24 or local media server 29. The program guide may display a setup screen when the user indicates a desire to set up these features by, for example, selecting a "Setup" feature from main menu 102. An illustrative setup screen 2401 is shown in FIG. 24.

Figure 24:
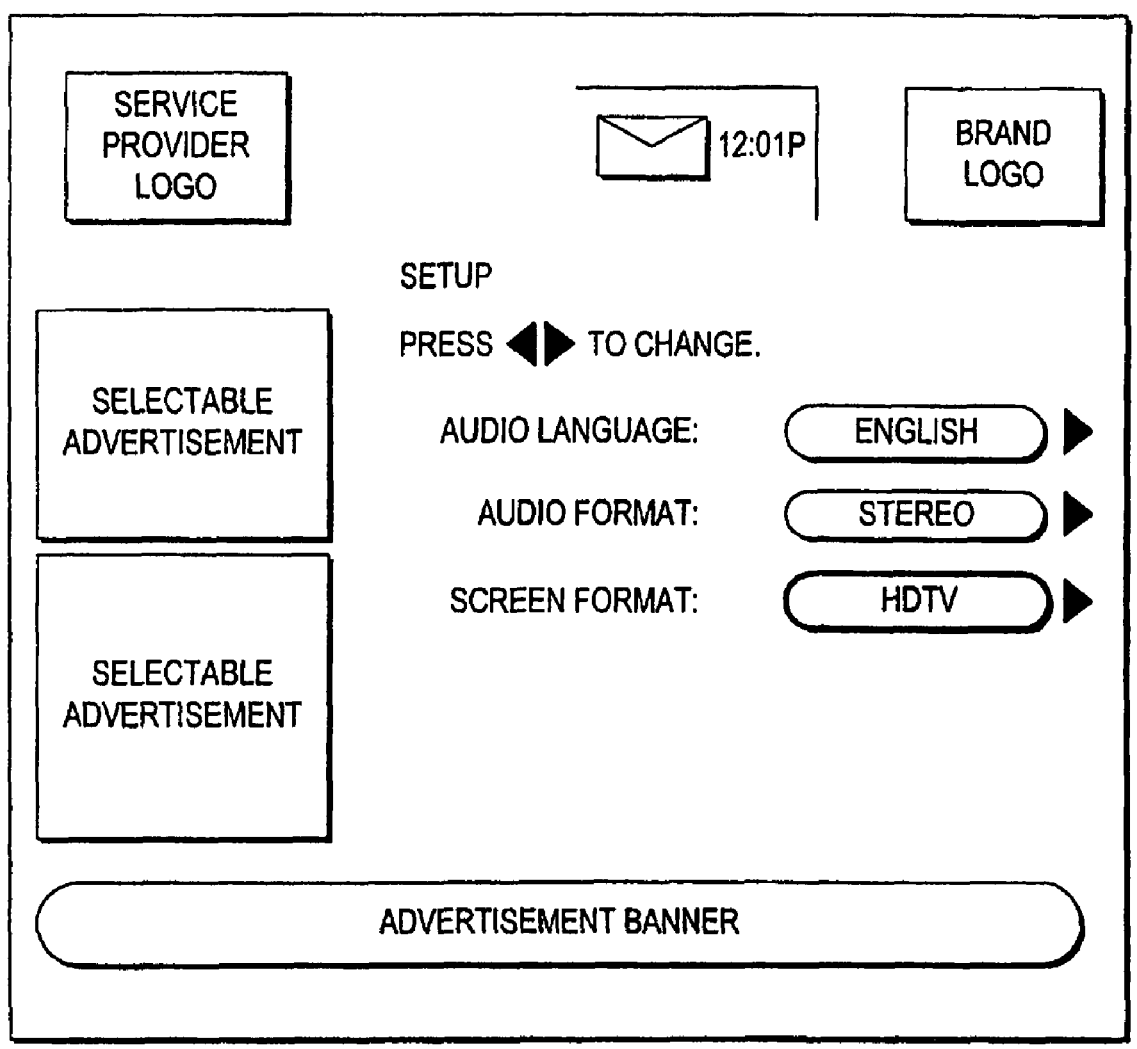
FIG. 24 shows an illustrative setup screen in which a user may set various settings for recording programs on or playing programs back programs from the remote media server of FIGS. 2a-2e or the local media server of FIG. 7.

As shown in FIG. 24, the user may set the audio language, audio format, and video format that user television equipment 22 may play programs in. The user may change settings by, for example, arrowing right or left. The user may change between settings by, for example, arrowing up or down. Suitable audio formats may include mono, stereo, surround sound, etc. Suitable video formats may include regular, high definition television (HDTV), wide screen, narrow screen, etc. The user may also select the language in which programming audio is played if available on a digital audio track.

The program guide may include the selected language, audio format, and video format in record requests. Remote media server 24 or local media server 29 may record programs with only those indicated formats and languages if they are available as part of program data associated with the programs. Alternatively, the program guide may include the selected language, audio format, and video format in playback requests. Remote media server 24 or local media server 29 may record programs with all available video and audio formats and languages and may playback programs only in the selected formats and language (or any default format or language) when requested.

The program guide may also allow the user to define "super-programs." Super-programs are sequences of programs or program segments that the guide will play back sequentially in a specified order. Recording super-programs on digital storage using interactive television program guides is described, for example, in the above-mentioned Hassell et al. U.S. patent application Ser. No. 09/157,256. The user may indicate a desire to access the super-program feature of the program guide by, for example, entering appropriate commands with user input device 46. If user input device 46 is a remote control such as remote control 40 of FIG. 8, the user may, for example, use a "SUPER" key on remote control 40 after highlighting a program listing in directory listing screen 350 (FIG. 18d), or may select an on-screen "Super-Program" option from a program guide display screen or from a list of on-screen options that are provided by the program guide when a program listing is selected.

The program guide may also provide the user with the ability to name super-programs and to store them on remote media server 24, local media server 29, or optional digital storage device 49. Entries for the named super-programs may be kept in user directories maintained by remote media server 24, local media server 29, or the program guide and may be displayed in any suitable screen that lists directory entries for programs (e.g., directory screen 350 of FIG. 18*d*). Alternatively, the program guide may list super-program listings in a super-program directory screen (i.e., a directory screen dedicated to listing super-program listings). For example, when directory screen 350 is displayed by the program guide, the program guide may provide the user with an opportunity to select a named super-program.

Figure 25A:
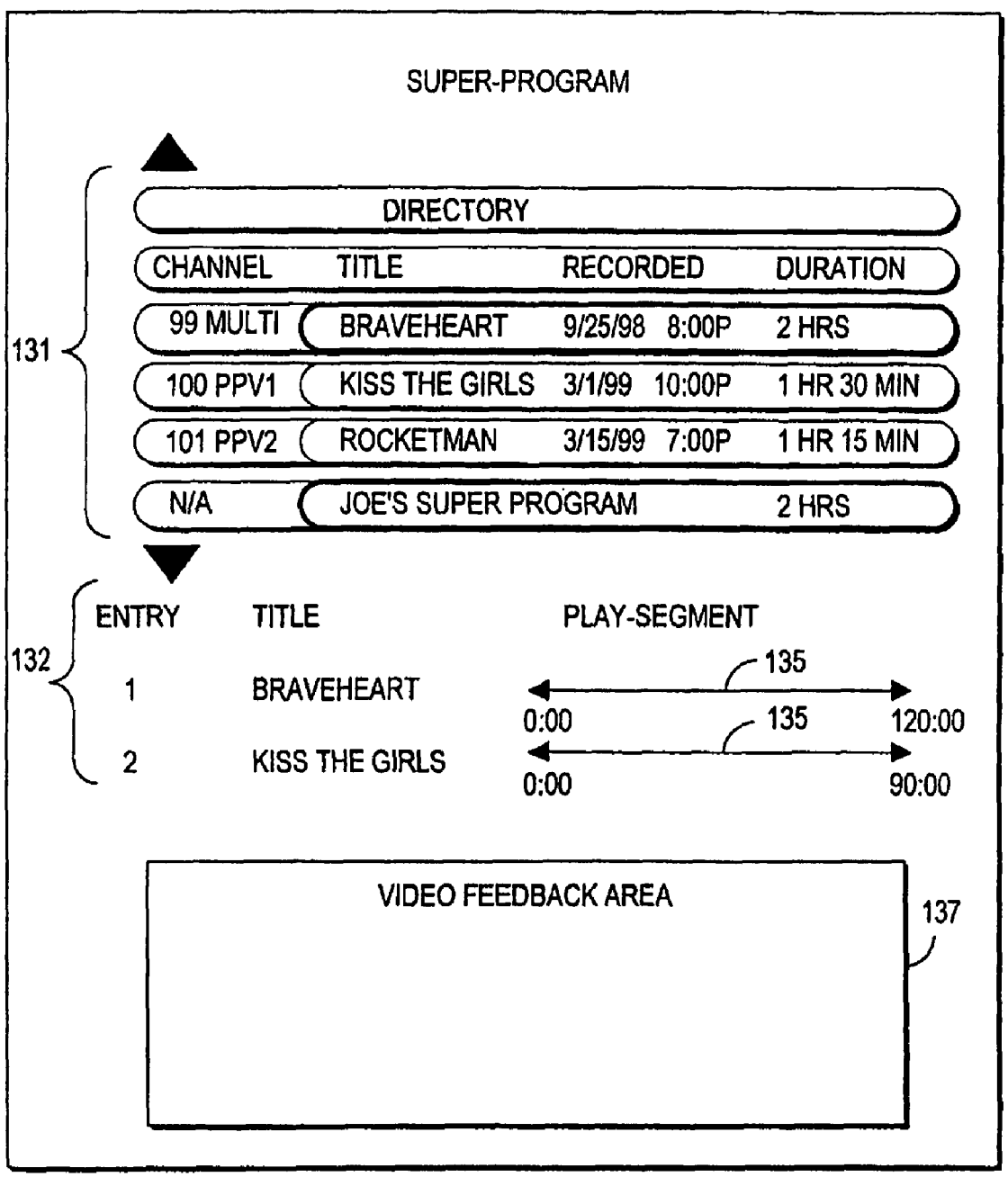
FIGS. 25a and 25b are illustrative super-program screens for providing users with an opportunity to define super-programs in accordance with the present invention.
Figure 25B:
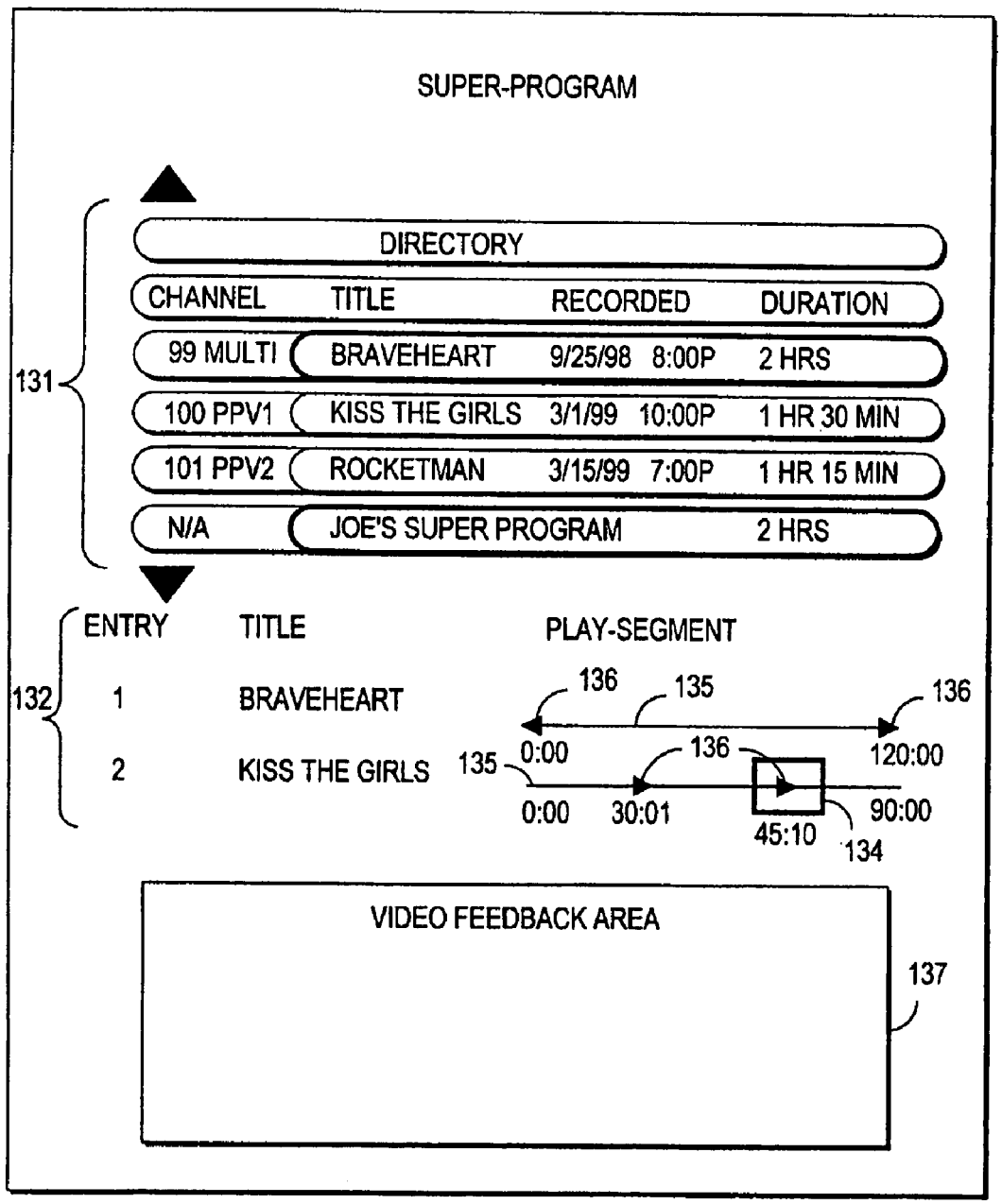

When the user selects a named super-program, the program guide may generate a super-program screen for display on display device 45. The program guide may also provide the user with an on-screen list of options for performing super-program functions (e.g., playing, transferring or editing the super-program). When the user indicates a desire to define a super-program, the program guide generates a super-program screen for display on display device 45. An illustrative super-program screen 130 is shown in FIGS. 25*a* and 25*b*.

Super-program screen 130 may be organized into three areas. Area 131 displays a directory of programs recorded by remote media server 24, local media server 29, digital storage device 49, or any combination thereof. Area 132 indicates the super-program sequence. Video feedback area 137 displays portions of programs included in the super-program. The time remaining for recording may be displayed, for example, to indicate to the user how much time is left on remote media server 24 or local media server 29 for recording in approaches where there are limits on user recording.

The three areas of super-program screen 130 may be presented only when needed. For example, area 131 may be displayed only when the program guide is providing the user with an opportunity to select a recorded program. Once the user has selected a program, area 131 may be removed and area 132 may be displayed in its place, while the program guide is providing the user with an opportunity to define a program segment for inclusion in the super-program. Video feedback area 137 may be displayed only in response to an indication by the user to the program guide to display a program segment. Thus, it may not be necessary for all three areas to be displayed at once.

To define a super-program, the user indicates which programs are to be included in the super-program sequence. The program guide may also give the user the ability to include in the current super-program other previously defined super-programs. Area 131 lists the recorded programs and super-programs. If the user interface is a remote control such as remote control 40 of FIG. 8, the user may use up and down arrow keys to select a desired program or super-program. The user may also access other information associated with the entry by using an "INFO" key on remote control 40, or by selecting a suitable option from an on-screen options list provided by the program guide. The program guide may generate a full information screen such as full information screen 161 of FIG. 20, containing information associated with the selected program when the "INFO" key is pressed.

Whenever the user selects a program, the program guide places the selected entry in the super-program sequence at a defined point in the sequence (e.g., at the end of the sequence). As shown in FIG. 25*a*, for example, a first segment entry, "Braveheart," has already been selected by the user. The user is currently selecting the second segment entry, "Kiss The Girls." The segment entries are listed in second area 132. The user then has the option of defining the play segment of the program to be played. Indicators 135 indicate the currently defined play segment.

If the user wishes to define a play segment, the user may do so, for example, by using markers 136 (FIG. 25*b*) to define the segment by moving the markers to the desired time within a program. As shown in FIG. 25*b*, the user uses highlight region 134 (positioned by the program guide over one of the markers) to move markers 136 to define the play segment. The program guide may display the portion of the program corresponding to markers 136 in video feedback area 137 as markers 136 are individually positioned. The program guide may, for example issue playback requests to remote media server 24 or local media server 29 that include a user pointer to the desired position in the program or off-sets from the current position. Alternatively, the program guide may send suitable requests to remote media server 24 or local media server 29 to adjust one or more user pointers on remote media server 24 or local media server 29. When the user is finished defining the play segment, the user may press an "OK" key on remote control 40. In response, the program guide positions highlight region 134 (FIG. 25*a*) in first area 131 to allow the user to define another entry in the super-program sequence.

When the user has finished defining the super-program, the user may issue appropriate commands with user input device 46. If user input device 46 is a remote control such as remote control 40 of FIG. 8, the user may use a "PLAY" key to finish editing the super-program and play the super-program. The user may also select an on-screen "Play" feature from a list of on-screen options provided by the program guide. The user may play the super-program at any time after the super-program has been defined.

When the user presses "PLAY", the program guide may issue a playback request to remote media server 24 or local media server 29, or may issue the appropriate instructions to digital storage device 49 to read the programs and associated program data according to the defined super-program sequence. The playback requests may, for example, contain pointers to the positions in the programs that are defined by the super-program sequence. The program guide then instructs user television equipment 22 to provide the programs in the super program and any associated data in the appropriate format for display on display device 45 and for use by the user as if the user were viewing the programs when they were originally aired. If display device 45 is a television, for example, user television equipment 22 may convert the programs from their digital format to appropriate RF or demodulated video signals for display on monitor 45.

The user may store the super-program for playback at a later time. The user may indicate a desire to postpone playback by, for example, issuing appropriate commands with user input device 46. If user input device 46 is a remote control such as remote control 40 of FIG. 8, the user may use an "EXIT" key on remote control 40 or select an on-screen "Exit" option. The program guide may respond to an indication to postpone playback by storing the playback sequence (either in memory 63, on digital storage device 49, remote media server 24 or local media server 29. The user may later access the super-program by, for example, selecting the super-program while in directory screen 350. The program guide may then generate a super-program screen with the previously entered selections and defined play-segments and provide the user with the opportunity to add, edit or re-order the programs and program segments. The user plays the super program by issuing a suitable command (e.g., pressing a "PLAY" key on remote control 40).

FIGS. 26-31 are illustrative flowcharts of steps involved in operating the system of the present invention. The steps shown in FIGS. 26-31 are illustrative and may be performed in any suitable order. Various steps may also be deleted if desired.

Figure 26:
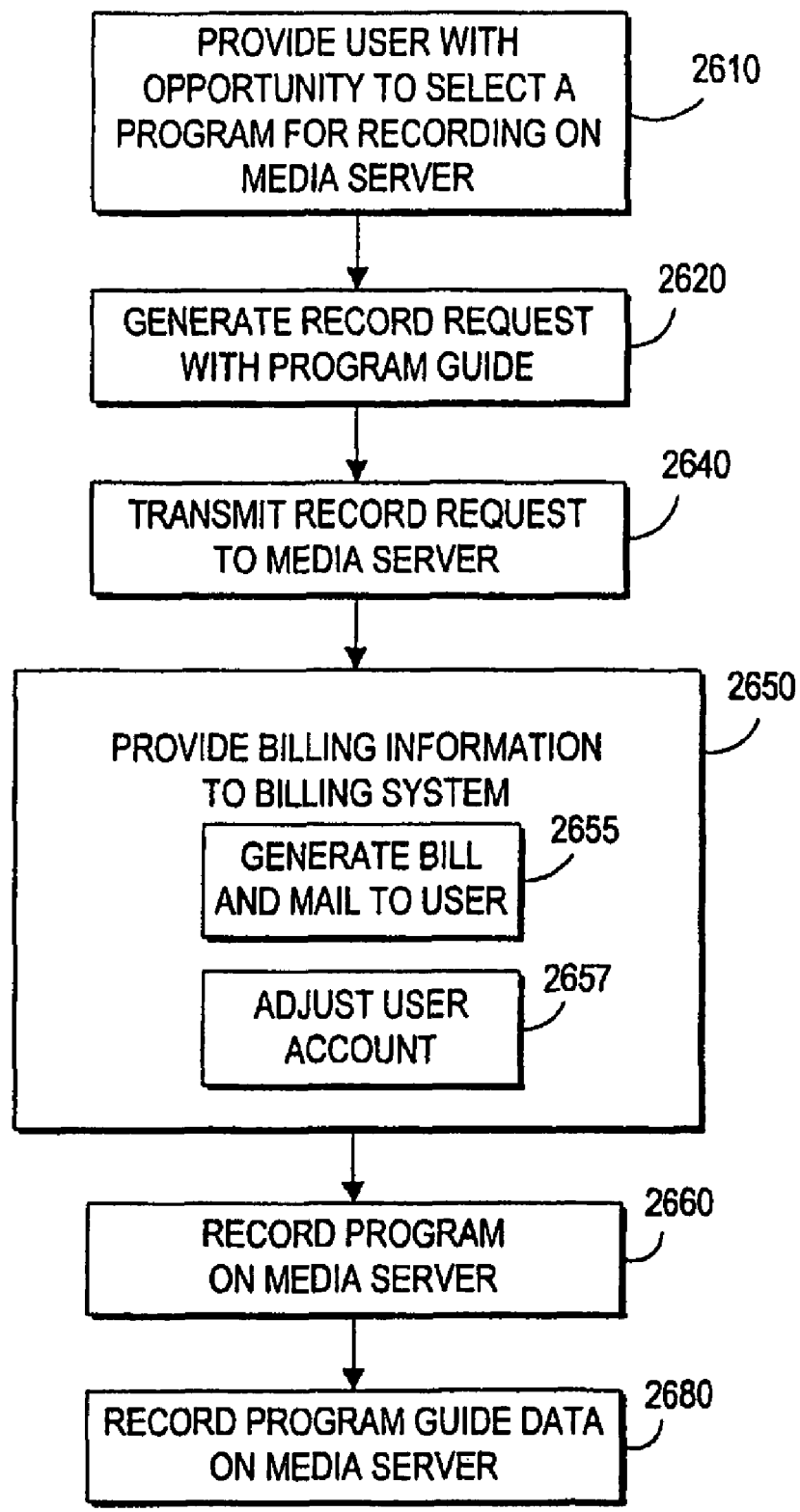
FIG. 26 is a flowchart of an illustrative overview of steps involved in recording programs and associated program guide data on the remote media server of FIGS. 2a-2e or the local media server of FIG. 7 in accordance with the present invention.

FIG. 26 is an flowchart of an illustrative overview of steps involved in recording programs and program guide data on remote media server 24 or local media server 29. At step 2610, the program guide provides the user with an opportunity to select a program for recording on remote media server 24 or local media server 29. This may be accomplished by, for example, providing a user with an opportunity to record a program while watching it, whether directly or in combination with a FLIP overlay. This may also be accomplished by providing a user with an opportunity to select a program listing. Program listings may be presented by the program guide in various types of program listings screens, such as program listings by time screen 130 (FIG. 11a), program listings by channel screen 135 (FIG. 11b), program listings by category screen (FIG. 11c), in a Browse overlay or in any other suitable type of program guide display screen. Alternatively, the user may access program listings via the Internet such as in the arrangement of FIG. 2e. The user may also record programs by pressing a "PAUSE" or "REWIND" key on remote control 46 while watching a program to cache the program in real time.

Users may also select programs for recording by remote media server 24 or local media server 29 by setting up search queries that define types of programs the user wants to record. The user may, for example, define boolean expressions that result in recording programs based on a suitable parameter or parameters. Suitable parameters may include any program guide data associated with programs, such as program titles, actors within programs, program themes or categories, program ratings, text within program information fields, or any other suitable program guide data.

When the user selects or designates a program for recording, the program guide generates a record request (step 2620). This step may be performed concurrently with step 2610, immediately after step 2610, or sometime in the near future after step 2610 such as just prior to a program starting. When a user indicates a desire to record a program grouping, the request may include a grouping identifier or the program identifiers of the constituent programs. In still another approach, the program guide may generate separate record requests for each program in the grouping, repeating step 2620.

The one or more record requests are transmitted to the recording media server at step 2640. Transmitting the record request may involve using any suitable communications protocol stack. Record requests may be transmitted using, for example, TCP/IP, IPX/SPX, DOCSIS, or any other suitable protocol or group of protocols. If users are charged for recording, program guide distribution equipment 16 may provide billing information to billing system 199 (FIG. 1) at step 2650. The billing information may include the title of the program that was selected, its identifier, its length, the charge for the record, or any other suitable information. Billing system 199 may bill the requesting user or adjust the user's account at steps 2655 and 2657, respectively.

At steps 2660 and 2680, the program and associated program guide data are recorded on the recording media server, respectively. Steps 2660 and 2680 may be performed in any suitable order and may be performed concurrently if desired. Step 2660 may include recording program associated data. Step 2680 may also be performed automatically by remote media server 24 or local media server 29 such as when automatically real-time caching programs.

Figure 27:
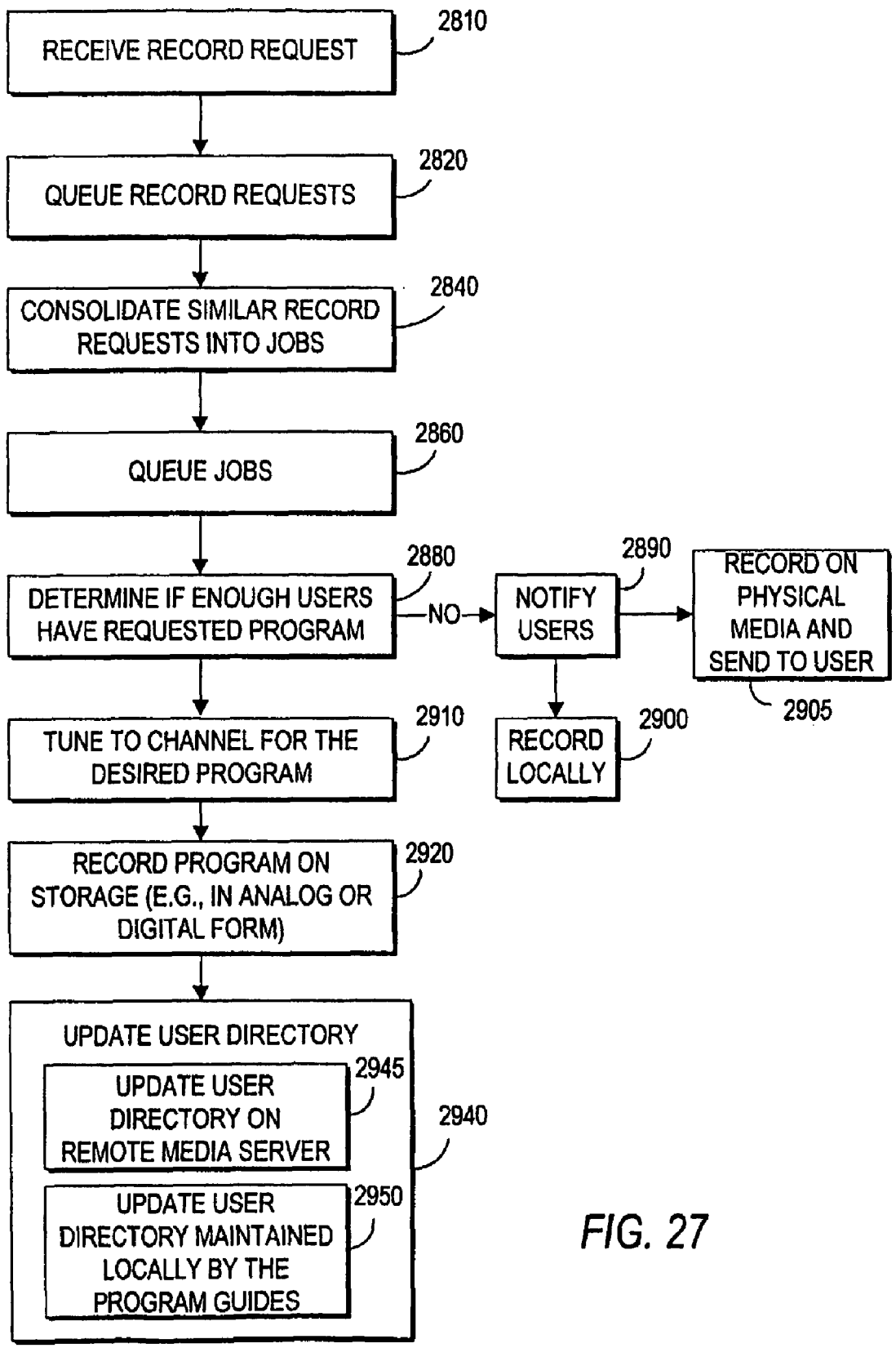
FIG. 27 is a somewhat more detailed flowchart of illustrative steps involved in recording programs and associated program guide data on the remote media server of FIGS. 2a-2e or the local media server of FIG. 7 in accordance with the present invention.

FIG. 27 is a somewhat more detailed flowchart of illustrative steps involved in recording programs, program guide data, or any combination thereof, on remote media server 24 or local media server 29 (e.g., steps 2660 and 2680 of FIG. 26). At step 2810, record requests are received by remote media server 24 or local media server 29. The record requests are queued in a job queue at step 2820. At step 2840, similar requests are consolidated. The consolidated and unconsolidated requests are queued at step 2860.

The job queue may be examined at step 2880 to determine if enough users have requested each program for recording. Job queue entries may be examined, for example, 15 minutes before a program is scheduled to air. If too few users requested a given program, the users who requested the program may be notified (step 2890) and the program guide may record the program locally by using, for example, local media server 29, optional digital storage device 49 (FIG. 9), or optional secondary storage device 47 (FIG. 9) (step 2900). Alternatively, programs may be recorded on physical media and sent to users (step 2905).

At step 2910, suitable equipment at program guide distribution facility 16 (e.g., distribution equipment 21) tunes to the channel (analog or digital) on which the requested program is carried. This may be done, for example, in response to a request by remote media server 24. At step 2920, the program is recorded in analog or digital format on storage in remote media server 24 or local media server 29.

User directories may be updated at step 2940. User directories may be maintained by remote media server 24, local media server 29, by the program guide, or any combination thereof. User directories that are maintained by remote media server 24 or local media server 29 may be updated at step 2945. Local media server 29 may maintain a user directory for only those programs that it records on storage 37 (FIG. 7), or may maintain a copy of the user directories maintained by remote media server 24 for one or more users of a local media server 29.

The program guide may maintain user directories for one or more users locally in memory 63 (FIG. 9), on optional digital storage device 49, or on optional secondary storage device 47 (step 2950). The user directories maintained by the program guide may reflect the programs stored by remote media server 24, local media server 29, or both, and may also be maintained by the program guide on local media server 29 if desired. It may be desirable for the program guide to exclusively maintain user directories. In another suitable approach, however, the program guide may maintain copies of user directories that are maintained by remote media server 24 and local media server 29. Alternatively, user directories may be maintained exclusively by remote media server 24 or local media server 29 and provided to the program guide on-demand.

Figure 28:
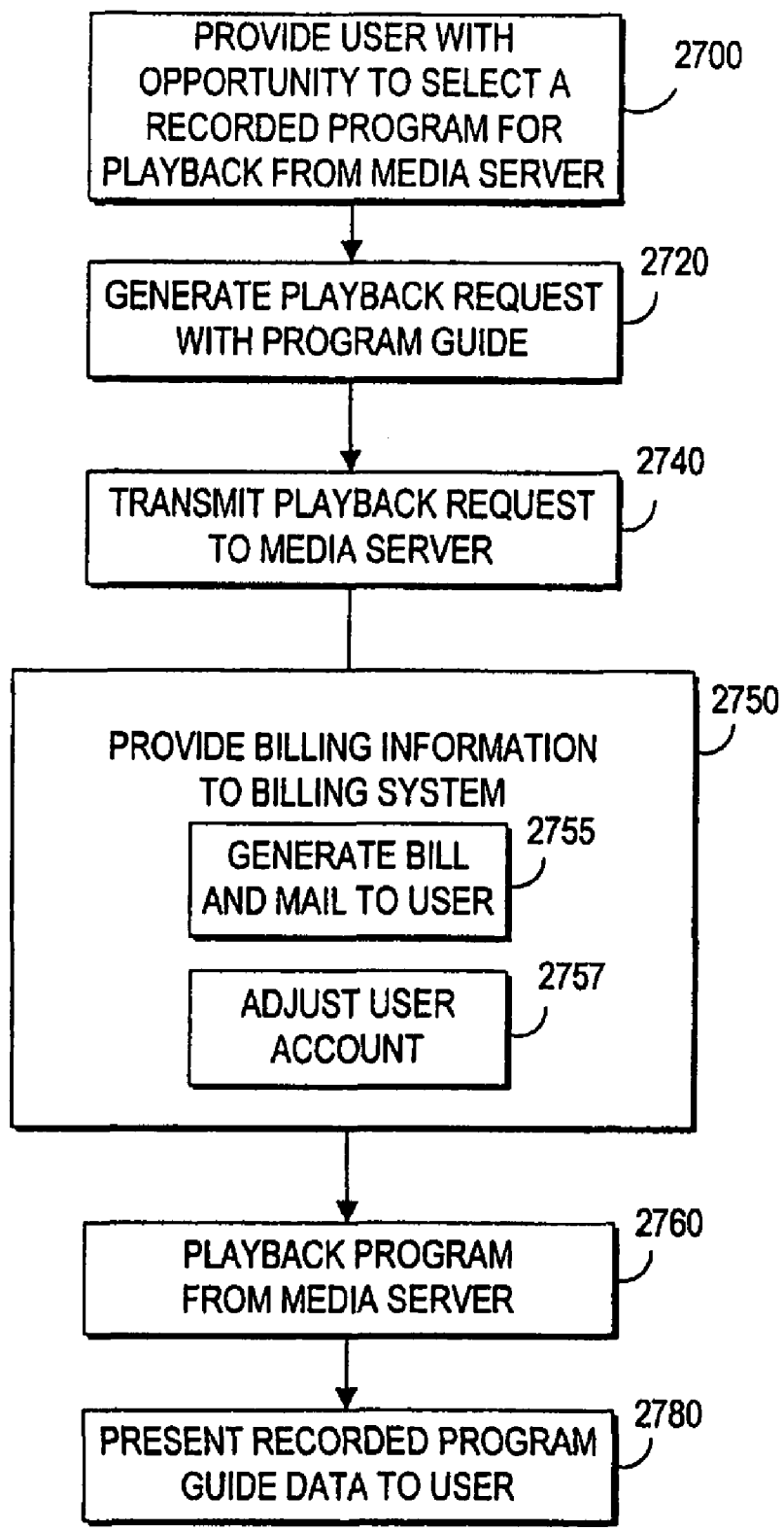
FIG. 28 is a flowchart of an illustrative overview of steps involved in playing back programs and associated program guide data from the remote media server of FIGS. 2a-2e or the local media server of FIG. 7 in accordance with the present invention.

FIG. 28 is a flowchart of an illustrative overview of steps involved in playing back programs, program guide data, or any combination thereof, from remote media server 24 or local media server 29. At step 2700, the program guide provides the user with an opportunity to select the recorded program for playback from remote media server 24 or local media server 29. This may be accomplished by, for example, presenting the user with a directory of recorded programs. The directory may be overlaid on top of a television program that the user is watching (e.g., as with overlay 320 of FIG. 18a), may be overlaid on top of a program guide display screen (e.g., as with overlay 320 of FIGS. 18b and 18c), may be displayed within a dedicated program guide display screen (e.g., as with directory screen 350 of FIG. 18d), or may be displayed within a web page such as in the arrangement of FIG. 2e. Alternatively, users may be presented with program listings for recorded programs or programs selected for recording in regular program listings screens such as shown in FIGS. 11a, 11b and 11c.

The user may select or designate a program for playback by, for example, selecting the listing for the program from a list or other program guide display screen. After the user designates a program for playback (e.g., by selecting a listing and pressing a "PLAY" key on remote control 40), the program guide generates a playback request that is transmitted to remote media server 24 or local media server 29 (steps 2720 and 2740). Playback requests may be transmitted using, for example, TCP/IP, IPX/SPX, DOCSIS, or any other suitable protocol or protocols. If users are charged for playing back programs, program guide distribution equipment 16 may provide billing information to billing system 199 (FIG. 1) at step 2750. The billing information may include the title of the program that was selected, its identifier, its length, the charge for the play back, or any other suitable information. Billing system 199 may bill the requesting user or adjust the user's account at steps 2755 and 2757, respectively. At steps 2760 and 2780, the program and associated program guide data are played back from the recording media server and presented to the user (e.g., on the user's television 36 of FIG. 7 or PC 231 of FIG. 2e).

Figure 29:
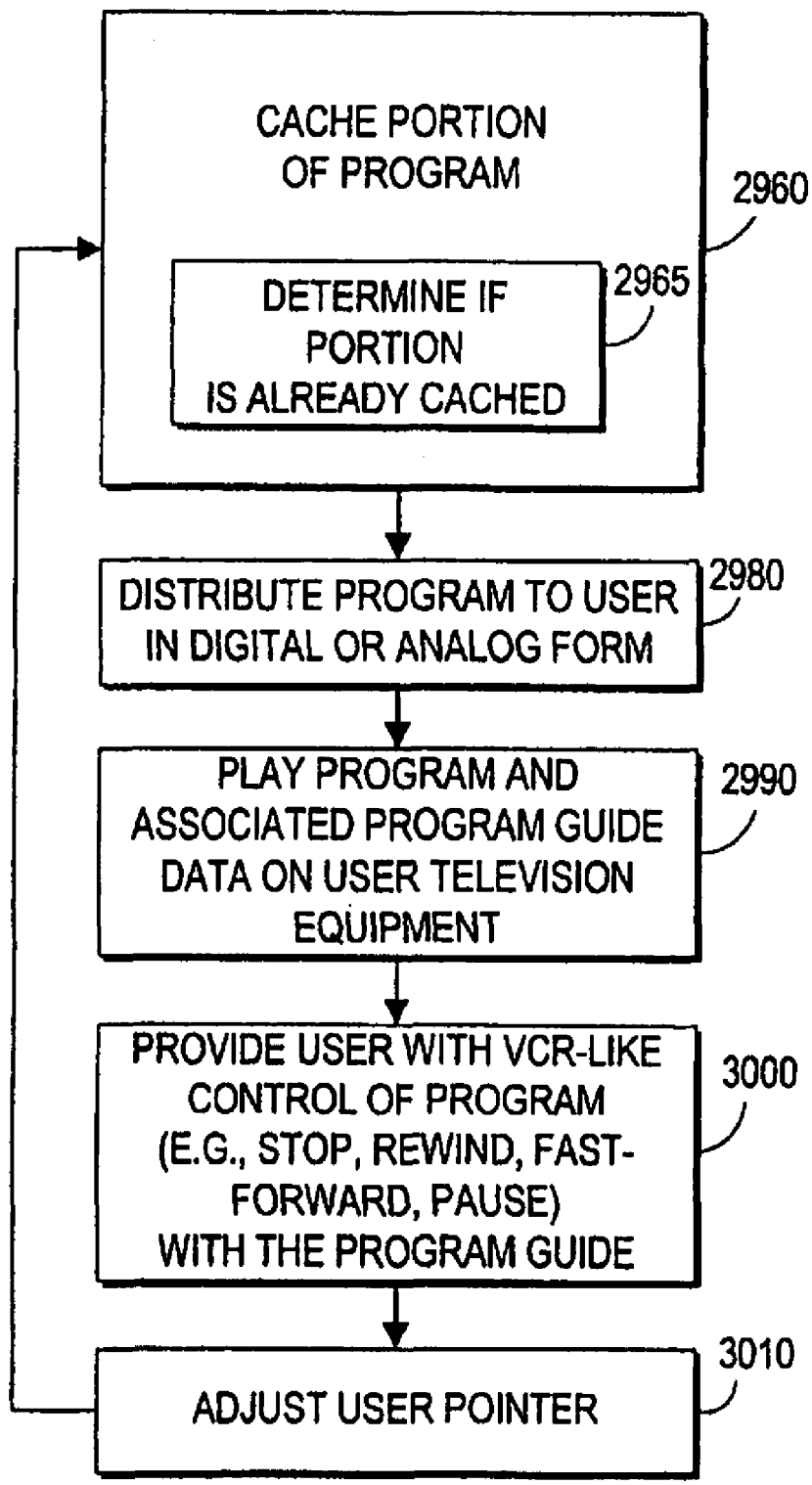
FIG. 29 is a somewhat more detailed flowchart of illustrative steps involved in playing back programs and associated program guide data from the remote media server of FIGS. 2a-2e or the local media server of FIG. 7 in accordance with the present invention.

FIG. 29 is a somewhat more detailed flowchart of illustrative steps involved in playing back programs from remote media server 24 and local media server 29. At step 2960, a portion of a program selected for playback is cached by remote media server 24 or local media server 29. It may be desirable, for example, to cache the entire program if system resources permit. Step 2960 may also include step 2965 at which remote media server 24 or local media server 29 determines whether the portion of the program has already been cached (i.e., for another user). If so, an additional copy may not be needed.

At step 2980, remote media server 24 or local media server 29 distributes the program to user television equipment 22 for playback. The programs and their associated program guide data are played back on user television equipment 22 or PC 231 at step 2990. Programs and program guide data may be distributed and played back using any suitable approach. For example, programs and program guide data may be played back by media server 24 and distributed to user television equipment 22 for viewing in real-time. If programs and program guide data are distributed as digital data stream, user television equipment 22 may decode the data stream in real time. Such on-demand programs and program guide data may be distributed and played back according to preferences that were set up by the user. In a second suitable approach, programs and program guide data are distributed as one or more digital files or as a digital data stream, and are stored by user television equipment 22 for playback. In a third suitable approach, programs and program guide data are played back by remote media server 24 and distributed according to a schedule over an analog or digital channel using a suitable near-video-on-demand (NVOD) approach. In still another suitable approach, remote media server 24 may record programs and program guide data on physical media, such as a DVD or videocassette, that are sent to the user. Any combination of these approaches, or any other suitable approach, may also be used.

At step 3000, the program guide provides the user with VCR-like control of the program. The program guide may display an overlay, such as overlay 141 of FIG. 22, to indicate to a user when the user has stopped, paused, rewound, or fast-forwarded the program. At step 3010, remote media server 24 or local media server 29 may adjust the user pointer within a program portion, or may move the pointer to the next program portion. User pointers may be advanced, for example, as a program is played back normally, or when a program is being controlled such as when it is being fast-forwarded. At a suitable point before a user pointer is adjusted beyond the beginning or end of a program portion, the previous or next program portion may be cached (step 2960). Program guide data may be presented and represented so that it tracks the program being controlled by the user using the interactive television program guide.

Figure 30:
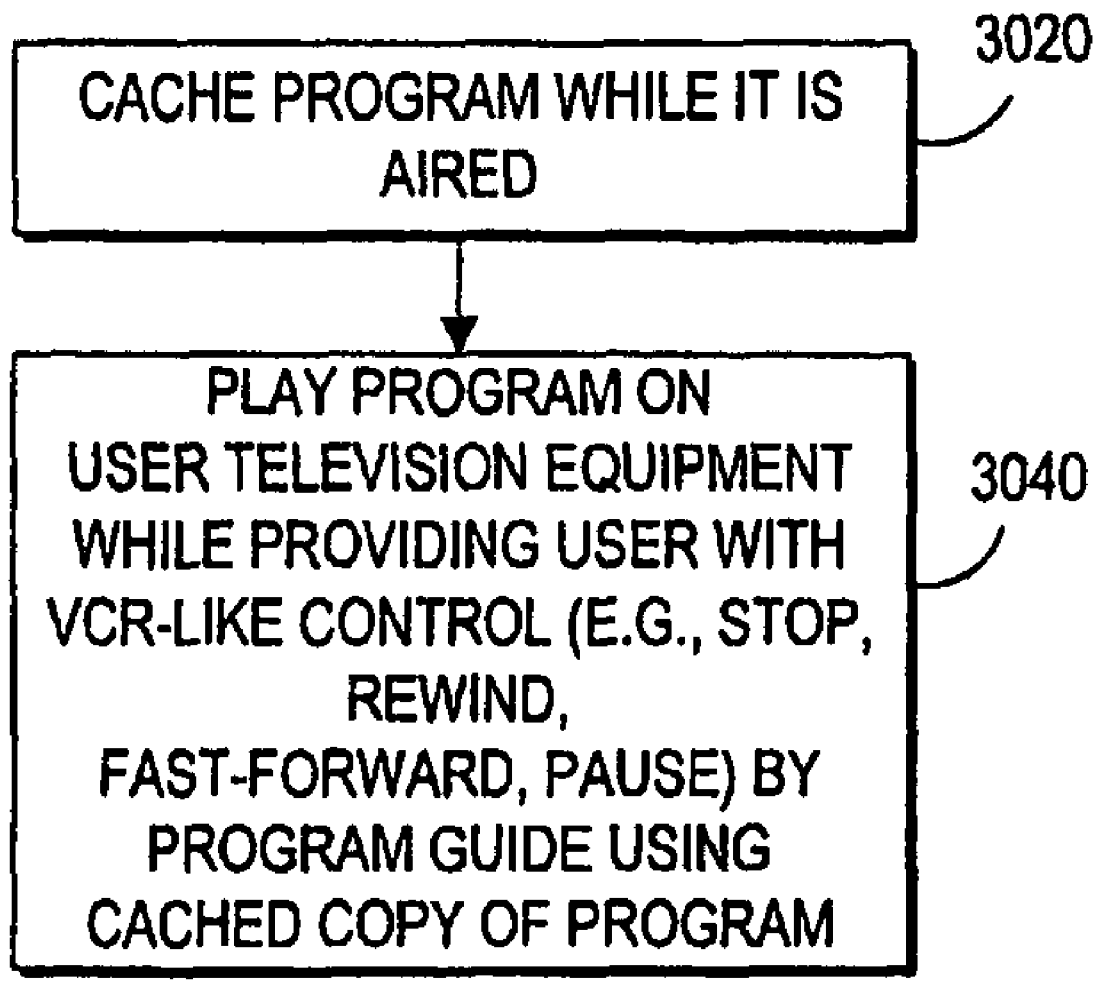
FIG. 30 is a flowchart of illustrative steps involved in providing a user with access to real-time cached copies of programs in accordance with the present invention.

FIG. 30 is a flowchart of illustrative steps involved in providing the user with access to real-time cached copies of programs. At step 3020, remote media server 24 or local media server 29 caches a program while it is being aired. Step 3020 may be performed by remote media server 24 or local media server 29 automatically, or may be performed when a user indicates a desire to cache a program in real-time (e.g., by pressing a "PAUSE" key on remote control 40 while watching a program). At step 3040, the program is played on user television equipment 22 while the user is provided with VCR-like control of the program. When the user indicates a desire to perform a VCR-like function, the program guide may issue a request to remote media server 24 or local media server 29 to adjust the user pointer to the user's viewing position in the cached copy. When the user is finished viewing the cached copy, such as when the program is over, when the user fast-forwards to the end, or when the user presses the stop key, the program guide may issue a delete request to remote media server 24 or local media server 29 to delete it, or it may be deleted automatically.

Figure 31:
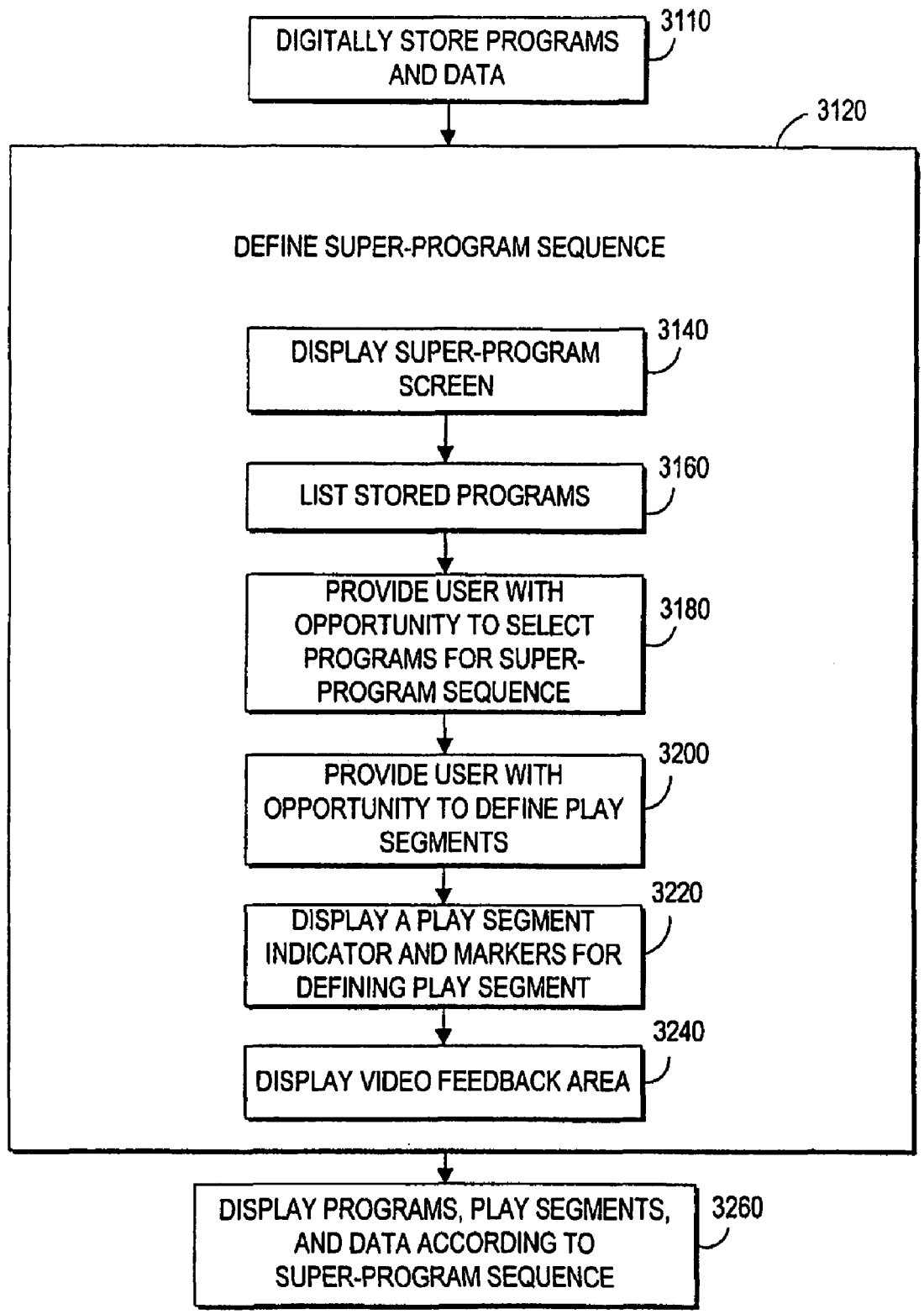
FIG. 31 is a flowchart of illustrative steps involved in providing a user with the opportunity to define and play back super-programs in accordance with the present invention.

Steps involved in providing the super-program feature of the present invention are set forth in FIG. 31. The program guide records programs and associated program guide data on remote media server 24, local media server 29, or digital storage device 49 at step 3110. At step 3120, the super-program sequence is defined. This may include displaying a super-program screen, such as super-program screen 130 of FIGS. 25a and 25b, on display device 45 as set forth in step 3140. Recorded programs are listed by the program guide on display device 45 at step 3160, and the program guide provides a user with an opportunity to select the listed programs at step 3180. At step 3200, the program guide provides the user with an opportunity to define play segments. The program guide may display a play segment indicator and marker for defining the play segment, as indicated by step 3220. At step 3240, the program guide displays a video feedback area on display device 45. The program guide displays the programs, play segments, and associated program data which are part of the super-program sequence on display device 45 according to the super-program sequence at step 3260.

The foregoing is merely illustrative of the principles of this invention and various modifications can be made by those skilled in the art without departing from the scope and spirit of the invention.

What is claimed is:

1. A method for use in an interactive television program guide system in which television programs are recorded and played back on-demand by a remote media server for a number of users, the method comprising:

providing a user with an opportunity to indicate at least one program for recording by the remote media server;

providing the user with an opportunity to indicate a desire to access a directory of program listings associated with programs recorded by the remote media server, wherein the programs were recorded in response to the user indicating a desire to record the programs with the remote media server;

providing the directory of program listings associated with the programs recorded by the remote media server in response to the user indicating the desire to access the directory of program listings;

generating a record request in response to a user indicating a desire to record a program on-demand with the remote media server;

consolidating multiple record requests for the program into a single job; and recording a single copy of the program for multiple users according to the single job.

2. An interactive television program guide system in which television programs are recorded and played back on-demand by a remote media server for a number of users, the system comprising:

interactive program guide television equipment on which an interactive television program guide is implemented, wherein the interactive television program guide is configured to:

provide a user with an opportunity to indicate at least one program for recording by the remote media server;

provide the user with an opportunity to indicate a desire to access a directory of program listings associated with programs recorded by the remote media server, wherein the programs were recorded in response to the user indicating a desire to record the programs with the remote media server;

provide the directory of program listings in response to the user indicating the desire to view the directory of program listings;

generate a record request in response to a user indicating a desire to record a program on-demand with the remote media server; and the remote media server:
  comprises a consolidator configured to consolidate multiple record requests for the program into a single job; and
  is further configured to record a single copy of a program for multiple users according to the single job.

3. A method for use in an interactive television program guide system in which television programs are recorded and played back on-demand by a remote media server for a number of users, the method comprising:

receiving a first record request in response to a first user indicating a desire to record a program on-demand with the remote media server;

receiving a second record request in response to a second user indicating a desire to record the program on-demand with the remote media server;

consolidating the first and second record requests for the program into a single job; and recording a single copy of the program for the first user and second user according to the single job.

4. An interactive television program guide system in which television programs are recorded and played back on-demand by a remote media server for a number of users, the system comprising:

a remote media server comprising a consolidator configured to:
  consolidate multiple record requests for a program into a single job; and
  record a single copy of the program for multiple users according to the single job.

* * * * *